(12) United States Patent
Niioka et al.

(10) Patent No.: US 9,541,765 B2
(45) Date of Patent: Jan. 10, 2017

(54) IMAGE DISPLAY DEVICE, INCLUDING A BLACK MATRIX, CAPABLE OF DISPLAYING IMAGES IN A PLURALITY OF VIEW POINTS FOR SUPPRESSING A PROBLEM ORIGINATING FROM A LIGHT BLOCKING PORTION ARRANGED IN A PIXEL APERTURE OR A STRUCTURAL OBJECT AND ACCOMPLISHING A HIGH APERTURE RATIO

(71) Applicant: NLT Technologies, Ltd., Kawasaki-shi, Kanagawa (JP)

(72) Inventors: Shinya Niioka, Kanagawa (JP); Koji Shigemura, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 14/828,748

(22) Filed: Aug. 18, 2015

(65) Prior Publication Data

US 2015/0355472 A1   Dec. 10, 2015

Related U.S. Application Data

(62) Division of application No. 13/156,949, filed on Jun. 9, 2011, now Pat. No. 9,188,823.

(30) Foreign Application Priority Data

Jun. 11, 2010 (JP) ................................ 2010-134526
Mar. 16, 2011 (JP) ................................ 2011-058574

(51) Int. Cl.
  *G02B 27/22* (2006.01)
  *G02B 3/00* (2006.01)
  (Continued)

(52) U.S. Cl.
  CPC ......... *G02B 27/2214* (2013.01); *G02B 3/0006* (2013.01); *G02F 1/133526* (2013.01); *G02F 1/134309* (2013.01); *G02F 1/136213* (2013.01); *G02F 1/136286* (2013.01); *G02F 2201/122* (2013.01)

(58) Field of Classification Search
  CPC .................................................. G02B 27/2214
  See application file for complete search history.

(56) References Cited

U.S. PATENT DOCUMENTS 6,118,584 A * 9/2000 Van Berkel ........ H04N 13/0404
                                                              348/54
6,724,452 B1 * 4/2004 Takeda .............. G02F 1/133707
                                                              349/130

(Continued)

FOREIGN PATENT DOCUMENTS

CN       101866644 A    10/2010
JP       2002-333870 A  11/2002

(Continued)

OTHER PUBLICATIONS

Nikkei Electronics, Jan. 6, 2003, pp. 26-27, vol. 838.
Chinese Office Action issued Jun. 26, 2014 in Chinese Patent Application No. 201110164491.X.

*Primary Examiner* — Adam R Giesy
*Assistant Examiner* — Karin Kiyabu
(74) *Attorney, Agent, or Firm* — Sughrue Mion, PLLC

(57) ABSTRACT

An image display device includes a display element having a unit of display comprising sub pixels displaying images for first and second view points, and an optical unit that distributes light emitted from respective sub pixels into different first directions. When a region surrounded a black matrix in the sub pixel is defined as an aperture, the sub pixels form a base unit that is an adjoining pixel pair including two sub pixels arranged with a data line therebetween. When virtual lines evenly dividing a width of the sub pixel in the first direction into K+1 pieces are presumed, K number of storage capacitor lines are arranged across at least one (Continued)

virtual line in the aperture. In the adjoining pixel pair, the K number of storage capacitor lines of one sub pixel are nonparallel to the K number of storage capacitor lines of the other sub pixel.

10 Claims, 47 Drawing Sheets

(51) Int. Cl.
    *G02F 1/1343*     (2006.01)
    *G02F 1/1362*     (2006.01)
    *G02F 1/1335*     (2006.01)

(56) References Cited

U.S. PATENT DOCUMENTS

| | | |
|---|---|---|
| 2004/0263756 A1 | 12/2004 | Tak et al. |
| 2005/0259323 A1* | 11/2005 | Fukushima ........ G02B 27/2214 359/462 |
| 2006/0050385 A1 | 3/2006 | Uehara et al. |
| 2009/0096943 A1 | 4/2009 | Uehara et al. |
| 2009/0096948 A1* | 4/2009 | Yokoyama ........ G02F 1/136213 349/39 |
| 2009/0168167 A1* | 7/2009 | Hiroya ............... G02B 27/2214 359/477 |
| 2010/0265284 A1 | 10/2010 | Satou et al. |
| 2012/0268481 A1* | 10/2012 | Niioka ............... H04N 13/0415 345/619 |
| 2013/0076723 A1* | 3/2013 | Niioka ................ G09G 3/3648 345/212 |

FOREIGN PATENT DOCUMENTS

| | | |
|---|---|---|
| JP | 2005-208567 A | 8/2005 |
| JP | 2009-098311 A | 5/2009 |
| JP | 2012063556 A * | 3/2012 |

* cited by examiner

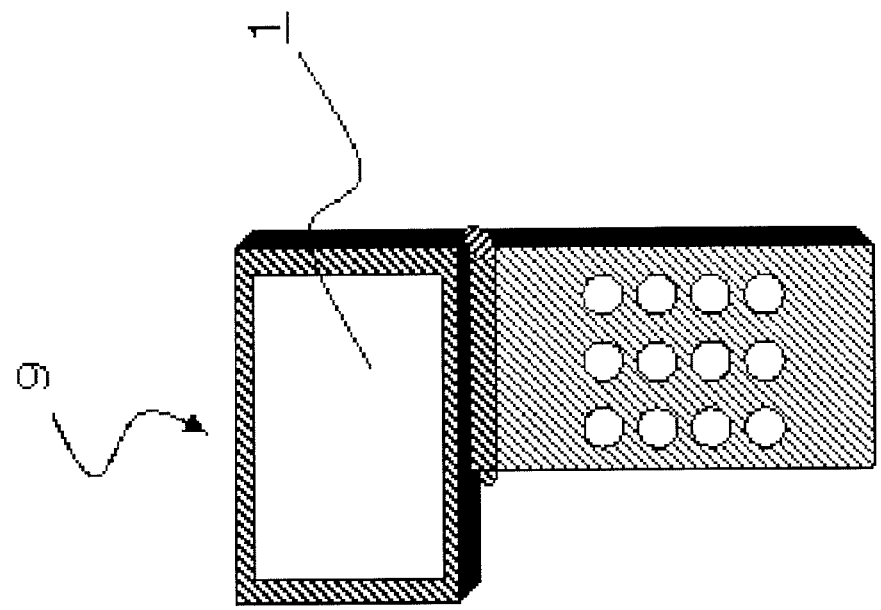
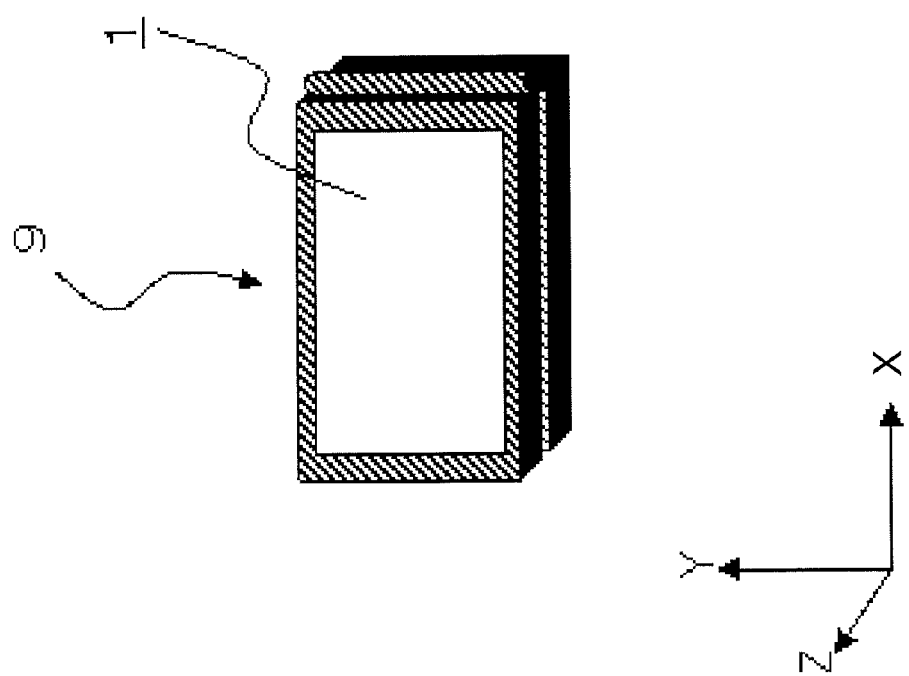
Fig.8

Fig.10

|  | G1 | G2 | G3 | G4 | G5 | G6 | G7 |
|---|---|---|---|---|---|---|---|
| D1 | + | − | + | − | + | − | + |
| D2 | − | + | − | + | − | + | − |
| D3 | + | − | + | − | + | − | + |
| D4 | − | + | − | + | − | + | − |
| D5 | + | − | + | − | + | − | + |
| D6 | − | + | − | + | − | + | − |
| D7 | + | − | + | − | + | − | + |
| D8 | − | + | − | + | − | + | − |
| D9 | + | − | + | − | + | − | + |
| D10 | − | + | − | + | − | + | − |
| D11 | + | − | + | − | + | − | + |
| D12 | − | + | − | + | − | + | − |
| D13 | + | − | + | − | + | − | + |

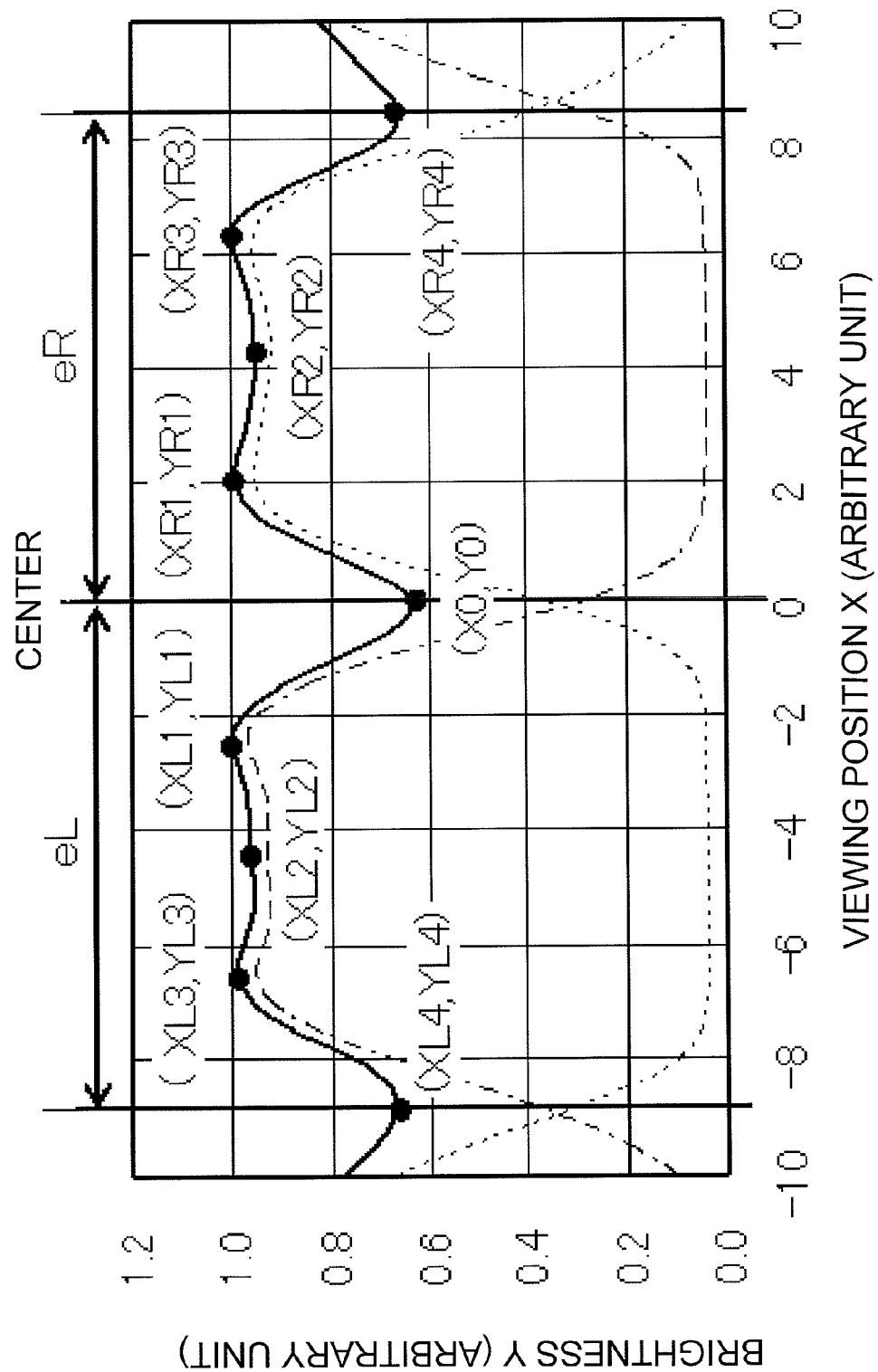

Fig.15

| | θ1 (θ1') | APERTURE RATIO | VOLATILITY OF VERTICAL APERTURE YA | VOLATILITY OF VERTICAL APERTURE YB | DEFOCUS WIDTH RATIO | 3D MOIRE (CENTER) | | 3D MOIRE (RIGHT AND LEFT) | | SUBJECTIVE EVALUATION |
|---|---|---|---|---|---|---|---|---|---|---|
| | | | | | | $\Delta Yc$ | $\Delta Yc/\Delta Xc$ | $\Delta Ys$ | $\Delta Ys/\Delta Xs$ | |
| PIXEL1 | 30 | 1 | 20% | 20% | 1 | 19.0% | 0.04 | 19.2% | 0.02 | ○ |
| | | | | | 1.1 | 9.5% | 0.02 | 9.5% | 0.01 | ◎ |
| PIXEL2 | 45 | 1.04 | 20% | 24% | 1 | 19.4% | 0.04 | 23.6% | 0.03 | △ |
| | | | | | 1.1 | 9.7% | 0.02 | 12.0% | 0.02 | ◎ |
| PIXEL3 | 60 | 1.06 | 20% | 35% | 1 | 19.5% | 0.04 | 33.3% | 0.06 | △ |
| | | | | | 1.1 | 9.7% | 0.02 | 16.6% | 0.03 | ○ |
| PIXEL4 | 90 | 1.07 | 20% | 100% | 1 | 20.0% | 0.04 | 80% | 0.10 | × |
| | | | | | 1.1 | 10.0% | 0.02 | 39% | 0.05 | △ |

◎ DISPLAY LEVEL HAVING NO 3D MOIRE VISUALLY RECOGNIZED AND HAVING NO STRANGENESS
○ DISPLAY LEVEL HAVING 3D MOIRE SLIGHTLY RECOGNIZED BUT NO STRANGENESS
△ DISPLAY LEVEL WITH NO STRANGENESS AS LONG AS STEREOSCOPIC DISPLAY IS VIEWED WITHIN OPTIMIZED VIEWING RANGE
× DISPLAY LEVEL WHERE STRANGENESS BY 3D MOIRE IS LARGE AND VISIBILITY IS REDUCED

Fig.34

|     | G1 | G2 | G3 | G4 | G5 | G6 | G7 |
|-----|----|----|----|----|----|----|----|
| D1  | +  | −  | +  | −  | +  | −  | +  |
| D2  | −  | +  | −  | +  | −  | +  | −  |
| D3  | −  | +  | −  | +  | −  | +  | −  |
| D4  | +  | −  | +  | −  | +  | −  | +  |
| D5  | +  | −  | +  | −  | +  | −  | +  |
| D6  | −  | +  | −  | +  | −  | +  | −  |
| D7  | −  | +  | −  | +  | −  | +  | −  |
| D8  | +  | −  | +  | −  | +  | −  | +  |
| D9  | +  | −  | +  | −  | +  | −  | +  |
| D10 | −  | +  | −  | +  | −  | +  | −  |
| D11 | −  | +  | −  | +  | −  | +  | −  |
| D12 | +  | −  | +  | −  | +  | −  | +  |
| D13 | +  | −  | +  | −  | +  | −  | +  |

IMAGE DISPLAY DEVICE, INCLUDING A BLACK MATRIX, CAPABLE OF DISPLAYING IMAGES IN A PLURALITY OF VIEW POINTS FOR SUPPRESSING A PROBLEM ORIGINATING FROM A LIGHT BLOCKING PORTION ARRANGED IN A PIXEL APERTURE OR A STRUCTURAL OBJECT AND ACCOMPLISHING A HIGH APERTURE RATIO

INCORPORATION BY REFERENCE

This application is a divisional of U.S. patent application Ser. No. 13/156,949, filed Jun. 9, 2011, which claims priority from Japanese Patent Application No. 2010-134526 filed on Jun. 11, 2010, and Japanese Patent Application No. 2011-58574 filed on Mar. 16, 2011, the contents of all of which are incorporated herein by reference.

TECHNICAL FIELD

The present invention relates to an image display device that displays images different from each other toward a plurality of view points, driving method of image display device, and terminal device.

BACKGROUND ART

Recently, reduction in size of a display device and accomplishment of high-definition display capability thereof are advanced together with advancement of cellular phones and information terminals. On the other hand, a display device which has a new added value is getting attention, such as a display device that allows a viewer to view different images depending on a position where the viewer watches the display device, i.e., a display device that provides images different from each other toward a plurality of view points, and a display device which produces a parallax image based on those images different from each other and which provides a stereoscopic image to the viewer.

A conventionally known scheme of providing images different from each other toward a plurality of view points synthesizes pieces of image data for respective view points, displays those pieces of image data on a display unit, separates the displayed synthetic images by optical separating unit including a lens, a barrier (a light blocking plate) with slits, and provides images to respective view points. The principle of image separation is based on restriction of pixels viewable depending on a view-point direction using the optical unit, such as a barrier with slits or a lens. Examples of image separating unit are a parallax barrier which is a barrier with multiple stripe-like slits, and a lenticular lens having cylindrical lenses which have a lens effect in a direction.

A stereoscopic display device having optical image separating unit is appropriate for mounting on a portable device since it does not need the use of a special eyeglass so that there is no burden of attaching the eyeglass. In practice, a portable device on which a stereoscopic display device including a liquid crystal panel and a parallax barrier is mounted is already available on the market.

According to the above-explained scheme, i.e., the display device that provides images different from each other toward a plurality of view points using optical separating unit, when the view-point position of a viewer moves and an image to be viewed is changed, a boundary between the image and another image appears darkly in some cases. This phenomenon originates from non-display regions (a light blocking unit, so-called a black matrix in general in the case of a liquid crystal panel) between a pixel and a pixel for view points being viewed. The above-explained phenomenon inherent to the movement of the view point of the viewer does not occur in the case of general display devices having no optical separating unit. Hence, the viewer may feel strangeness or reduction of the display quality from the above-explained phenomenon that occurs on a multi-view-point display device or a stereoscopic display device having the optical separating unit.

This phenomenon is called 3D moire in general. 3D moire is periodical varying of brightness (may be the varying of color in some cases) originating from different visions displayed on different angular directions. 3D moire is luminance angular fluctuation and does not become a problem depending on a view position. However, when fluctuation of brightness in the angular direction is large, undesirable effect for stereoscopic viewing may occur, so that it is desirable to set the brightness fluctuation to be equal to or smaller than a predetermined value.

Unexamined Japanese Patent Application KOKAI Publication No. 2005-208567 discloses a display device which has respective shapes and layouts of the pixel electrodes and light blocking unit of the display unit devised in order to overcome the problem originating from the optical separating unit and the light blocking unit, and which suppresses a reduction of the display quality.

FIG. 47 is a plan view showing the display unit of the display device disclosed in Unexamined Japanese Patent Application KOKAI Publication No. 2005-208567 (hereinafter, referred to as a Patent Literature 1). As shown in FIG. 47, an aperture 1075 is an opening of a sub pixel which is the minimum unit of an image display. As shown in FIG. 47, the layout of the apertures 1075 is defined by a vertical direction 1011 and a horizontal direction 1012. The shape of each aperture 1075 is hexagonal defined by a trapezoid symmetrical in the vertical direction 1011 and a rectangle having the same long side length as that of the bottom of the trapezoid which are arranged so that the bottom of the trapezoid and the long side of the rectangle contact with each other. Moreover, image separating unit comprises a lenticular lens having cylindrical lenses 1003a whose lengthwise direction is the vertical direction 1011 arranged in the horizontal direction 1012. The cylindrical lens 1003a has no lens effect in the lengthwise direction, but has the lens effect only in the short direction. That is, the lens effect acts on the horizontal direction 1012. Hence, lights emitted from the apertures 1075 of a sub pixel 1041 and of a sub pixel 1042 adjoining to each other in the horizontal direction 1012 are directed to directions different from each other.

The inclined side of the aperture 1075 is inclined in a different direction from the vertical direction 1011. A pair of sides having the same angle formed between the direction in which the inclined side runs and the vertical direction 1011 pass through the center of the aperture 1075, and are arranged so as to be axisymmetrical to a line parallel to the vertical direction 1011. Furthermore, the apertures 1075 adjoining to each other in the vertical direction 1011 are arranged so as to be axisymmetrical to a line running in the horizontal direction 1012. As a result, in the horizontal direction 1012, the position of the end of the aperture 1075 of the display panel and the position of the optical axis of the cylindrical lens 1003a differ from each other in the vertical direction 1011.

Hence, the aperture width in the vertical direction 1011 is substantially constant at the inclined portion regardless of the position in the horizontal direction 1012 when the apertures 1075 of the sub pixel 1041 and of the sub pixel 1042 are combined together.

That is, when it is presumed that a display-panel cut plane is present in the vertical direction 1011 that is orthogonal to the arrangement direction of the cylindrical lenses 1003a at an arbitrary point in the horizontal direction 1012, the display device of the Patent Literature 1 has the ratio of the light blocking portion (a wiring 1070 and the light blocking unit 1076) and the aperture substantially constant. Hence, when the viewer moves the view point in the horizontal direction 1012 that is the direction in which the images are separated, and the viewing direction changes, the ratio of the light blocking portion to be viewed is substantially constant. That is, the viewer does not occasionally view only the light blocking portion in a specific direction, and no display appears darkly. Accordingly, the display device of the Patent Literature 1 can suppress a reduction of the display quality originating from a light blocking region.

Moreover, Unexamined Japanese Patent Application KOKAI Publication No. 2009-98311 discloses a pixel structure suitable for the display device of the Patent Literature 1.

FIG. 46 shows a pixel disclosed in Unexamined Japanese Patent Application KOKAI Publication No. 2009-98311 (hereinafter, referred to as Patent Literature 2) and divided into four pieces. A gate line G and a storage capacitor line CS are formed on the same layer as that of a gate electrode of a pixel thin-film transistor 4TFT. Moreover, a storage capacitor 4CS is formed between a silicon layer 4SI and the storage capacitor line CS. As mentioned above, the silicon layer 4SI is connected to a data line D through a contact hole 4CONT, but another contact hole 4CONT provided in a pixel 4 other than the portion of the pixel thin-film transistor 4TFT is for connecting the silicon layer 4SI in the storage capacitor 4CS and a pixel electrode 4PIX.

The storage capacitor line CS is arranged in the extending direction of the gate line G, i.e., is connected to the storage capacitors 4CS of respective pixels adjoining to each other in the X axis direction. In respective pixels adjoining to each other in the X axis direction, positions of the pixel thin-film transistors 4TFT in the Y axis direction differ from each other, so that the storage capacitor line CS is bent and arranged in order to connect those transistors. Like the pixel thin-film transistor 4TFT, the storage capacitor 4CS is arranged at the upper-bottom side of a display region in a substantially trapezoidal shape in each pixel. Accordingly, the storage capacitor 4CS can be effectively arranged between upper-bottoms of respective pixels configuring an adjoining pixel pairs 4PAIR, thereby further improving the aperture ratio.

An intersection between the storage capacitor line CS and the data line D is arranged at a trapezoid inclining portion so that the storage capacitor line CS and the data line D are along with each other. It is preferable to reduce wirings arranged so as to be along the image separating direction as much as possible, and the above-explained display device has the data line D only. This further improves the image quality. This is because when the storage capacitor line CS is arranged along the image separating direction, the image of the storage capacitor line CS is enlarged by the image separating unit, resulting in a remarkable deterioration of the display quality. That is, the display device of the Patent Literature 2 has the gate line G and the storage capacitor line CS running in the image separating direction and formed on the same layer in order to suppress an image deterioration originating from the image separating unit and the storage capacitor line CS while reducing the number of processes.

Patent Literature 2 discloses a technique of forming a scanning line and a capacitor line through the same process in order to reduce the number of production process of the liquid crystal display device. In particular, there is a large demand of cost reduction for general small display devices, and it is desirable to configure a pixel array with the number of layers as small as possible.

Moreover, there is a demand for the display unit of the display device to increase the so-called aperture ratio which is defined by area ratio between the aperture contributing to the display brightness and the light blocking portion in order to make the pixel pitch finer so as to improve the high-definition display capacity and to improve the display brightness.

However, in order to accomplish the high-definition display of an image, a large number of pixels are arranged in a screen region which is originally small, so that it is necessary to make the size of a pixel finer. That is, how to reduce the pixel size is a technical issue. However, pixels with a finer size are almost realized together with the advancement of the microfabrication of semiconductor technologies.

As explained above, there is a tendency that pixels become finer, but it is not always enabled to reduce the size of electrical and electronic circuits, such as a switching device and an auxiliary capacitor for driving the liquid crystal in order to modulate light in proportion to the refinement of the pixel. This is because the switching device and the auxiliary capacitor are formed on a substrate like a semiconductor substrate or a glass substrate through the microfabrication technique, but there is a limit for realizable line width due to the limit of the semiconductor process. Moreover, even if finer process is technically possible, it results in the cost increase for a time from the standpoint of plant investment.

Liquid crystal display devices have a problem that because of the above-explained limit for refinement, a region where light is blocked increases, i.e., the aperture ratio decreases, and the light use efficiency of the whole display device decreases. There is a tradeoff relationship that when it is attempted to improve the image quality by refinement of the pixel, the light use efficiency decreases. Accordingly, there is a technical issue to realize a high-image-quality and highly efficient image display device and to realize a high-definition image simultaneously.

In particular, in the case of a small display device, because of the above-explained limit together with refinement, the ratio of wirings occupying the area of a pixel and that of a contact-hole area are extremely large, and the reduction of the aperture ratio is remarkable. It is necessary for the refined pixel to reduce the number of wirings in the pixel and that of the contact holes as much as possible.

Moreover, as is disclosed in "NIKKEI Electronics, Jan. 6, 2003, volume 838, p. 26 to 27" (hereinafter, referred to as a Non-patent Literature 1), recently, the applying field of the stereoscopic image display device and the application thereof become wide. As an example, a configuration in which image separation is performed in the direction in which the data line runs may be employed depending on the application of the display device. However, the inventor of the present invention found out that the high aperture ratio and the high image quality cannot be accomplished even if the pixel structure disclosed in Patent Literature 2 is designed as the above-explained configuration while maintaining the aperture shape and the light-blocking shape of the pixel disclosed in Patent Literature 1.

What the inventor of the present invention found will be explained below in more detail. As explained above, since the direction in which the gate line runs and the image separating direction are consistent according to the conventional technologies, the running direction of the storage capacitor line formed on the same layer as that of the gate line can be drawn in the same direction as the image separating direction so as not to interfere with the image separating unit. Likewise, when the pixel structure disclosed in Patent Literature 2 is applied to a display device that separates images in a direction in which the data line runs, it is necessary to draw the storage capacitor line formed of the same material as that of the data line in the image separating direction.

However, in order to protect the data line from any damage inherent to process conditions at the time of forming a switching device, in general, the data line is often formed in a process step after the formation of the gate line, i.e., on the substrate, the data line is formed on the upper layer of the gate line. As a result, it is necessary to form the storage capacitor line so that the capacitor is formed via an interlayer film having a small relative electric permittivity per unit area, and to set the area of the storage capacitor large. This results in an insufficient aperture ratio, and thus the transmissivity decreases.

Moreover, like Patent Literature 2, if the storage capacitor 4CS is formed between the silicon layer 4SI and the storage capacitor electrode formed of the same layer as that of the gate line, it becomes possible to form a capacitor via an interlayer film having a large relative electric permittivity per unit area, so that the area of the storage capacitor can be reduced. In this case, however, it is necessary to newly provide a contact hole that connects the storage capacitor electrode to the storage capacitor line, so that a sufficient pixel aperture ratio cannot be obtained, and thus the transmissivity decreases.

Moreover, according to the pixel structure of the display device disclosed in Patent Literature 2, the storage capacitor line on the same layer as that of the gate electrode is drawn so as to traverse the periphery of the switching device (TFT) in the image separating direction, so that the width in the Y axis direction of the light blocking portion located at the upper bottom of the substantially trapezoid becomes one that is obtained by adding the line width of the storage capacitor line and the line drawing space to the area of the TFT. The width of the upper bottom of the substantially trapezoid in the Y axis direction cannot be reduced without the change in a process rule, so that the width of the light blocking portion in the Y axis direction covering the upper bottom of the substantially trapezoid becomes large relative to the width of the aperture region in the Y axis direction in the case of pixels with a narrow pitch. When the image of the light blocking portion covering the upper bottom of the substantially trapezoid is enlarged by the image separating unit, it is visually recognized as a darkened spot or stripe on the display unit by the viewer, and thus the display quality decreases.

In this specification, the periodical varying of brightness (may be the varying of color in some cases), in particular, a luminance angular fluctuation originating from displaying of different images in different angular directions is defined as a "3D moire". Moreover, a mixing of an image for another view point and leaking of an image to an image for a given view point are defined as "3D crosstalk".

In general, a stripe pattern produced by an interference of structural objects having different periods is called a "moire stripe". The moire stripe is an interference stripe produced depending on the periodicity of the structural object and the pitch thereof, and the 3D moire is a brightness varying produced due to the imaging characteristic of the image separating unit. Accordingly, the 3D moire and the moire stripe are distinguished in this specification.

The 3D moire does not become a problem depending on a view position, but when the fluctuation in brightness in the angular direction is large, an undesirable effect for stereoscopic viewing may occur, so that it is desirable to set the brightness fluctuation to be equal to or smaller than a predetermined value.

SUMMARY

The present invention has been made in view of the above-explained circumstance, and it is an exemplary object of the present invention to suppress a problem originating from a light blocking portion arranged in a pixel aperture or a structural object in an image display device that is capable of displaying respective images in a plurality of view points, and to accomplish a high aperture ratio.

In order to achieve the above-explained exemplary object, a first exemplary aspect of the present invention provides an image display device including: a display element including a plurality of units of display each including at least a sub pixel that displays an image for a first view point and a sub pixel that displays an image for a second view point; and an optical unit that distributes lights emitted from respective sub pixels of the unit of display into different directions, in which when it is defined that a direction in which light is distributed is a first direction, a direction orthogonal to the first direction is a second direction, and a region surrounded by a data line, a gate line and a storage capacitor electrode in the sub pixel is an aperture, an arrangement of the sub pixels in the display unit is formed by a base unit that is an adjoining pixel pair including two sub pixels arranged with a data line being present therebetween, the adjoining pixel pairs are arranged along the second direction so as to adjoin to each other, the two sub pixels have respective switching elements commonly connected to the data line present between the two sub pixels and controlled by different gate lines, one electrode of the switching element forms the storage capacitor electrode and a capacitor, the storage capacitor electrode is arranged at least at a boundary region between the sub pixels of the adjoining pixel pair, and when it is presumed that there are virtual lines each parallel to the second direction and evenly dividing a width of the sub pixel in the first direction into K+1 pieces, K number of storage capacitor lines electrically connected to the storage capacitor electrode are each arranged so as to go over at least one of the virtual lines.

In order to achieve the above-explained exemplary object, a second exemplary aspect of the present invention provides an image display device including: a display element including a plurality of units of display each including at least a sub pixel that displays an image for a first view point and a sub pixel that displays an image for a second view point; and an optical unit that distributes lights emitted from respective sub pixels of the unit of display into different directions, in which when it is defined that a direction in which light is distributed is a first direction, a direction orthogonal to the first direction is a second direction, and a region surrounded by a black matrix in the sub pixel is an aperture, an arrangement of the sub pixels in the display unit is formed by a base unit that is an adjoining pixel pair including two sub pixels arranged with a data line being present therebetween, the adjoining pixel pairs are arranged along the second direction so as to adjoin to each other, the two sub pixels have respective switching elements commonly connected to the data line present between the two sub pixels and controlled by different gate lines, one electrode of the switching element forms a storage capacitor electrode and a capacitor, the storage capacitor electrode being arranged at least at a boundary region between the sub pixels of the adjoining pixel pair, and when it is presumed that there are virtual lines each parallel to the second direction and evenly dividing a width of the sub pixel in the first direction into K+1 pieces, K number of storage capacitor lines electrically connected to the storage capacitor electrode are each arranged so as to go over at least one of the virtual lines.

In order to achieve the above-explained exemplary object, a third exemplary aspect of the present invention provides a driving method of an image display device of the first exemplary aspect of the present invention, including steps of: scanning the gate line one by one; inverting a voltage polarity of each pixel for each gate line; and inverting the polarity of display data transmitted through each data line for each data line.

In order to achieve the above-explained exemplary object, a fourth exemplary aspect of the present invention provides a terminal device that includes the image display device of the first aspect of the present invention.

According to such a configuration, the data line, the gate line, the storage capacitor electrode, and the switching element are efficiently arranged in the sub pixel, so that the aperture ratio can be improved.

Moreover, the adjoining pixel pair formed by a connection relationship between the switching element and the sub pixel is a base unit for driving, and the storage capacitor electrode of the adjoining pixel pair is electrically connected to a region sheared by respective sub pixels configuring the adjoining pixel pair. Hence, the potential fluctuation of the storage capacitor electrode in the adjoining pixel pair can be reduced, thereby suppressing a flicker and a crosstalk.

Furthermore, in the sub pixel, the storage capacitor line electrically connected to the storage capacitor electrode is arranged so as to go over the aperture, and further the virtual line, and runs in a different direction of the image separating direction. Accordingly, the brightness distribution in a direction in which light is distributed, i.e., 3D moire originating from the storage capacitor line can be suppressed.

BRIEF DESCRIPTION OF THE DRAWINGS

The exemplary object and other objects and advantages of the present invention will become more apparent upon reading of the following detailed description and the accompanying drawings in which:

FIG. 8 is a perspective view showing the portable device on which the image display device according to the first exemplary embodiment of the present invention is mounted;

FIG. 10 is a table showing a polarity of dot inversion driving input into a data line in the image display device according to the first exemplary embodiment of the present invention;

FIG. 14 is a graph showing an illustrative brightness distribution in the image display device according to the first exemplary embodiment of the present invention;

FIG. 15 is a table showing an evaluation result for the image display device according to the first exemplary embodiment of the present invention;

FIG. 34 is a table showing a polarity of inversion driving input into a data line in the image display device according to the ninth exemplary embodiment of the present invention;

EXEMPLARY EMBODIMENTS

An image display device according to the exemplary embodiments of the present invention will be explained in detail with reference to the accompanying drawings.

<First Exemplary Embodiment>

First, an explanation will be given of an image display device, a display panel of the image display device, and a driving method thereof according to a first exemplary embodiment of the present invention.

Figure 1:
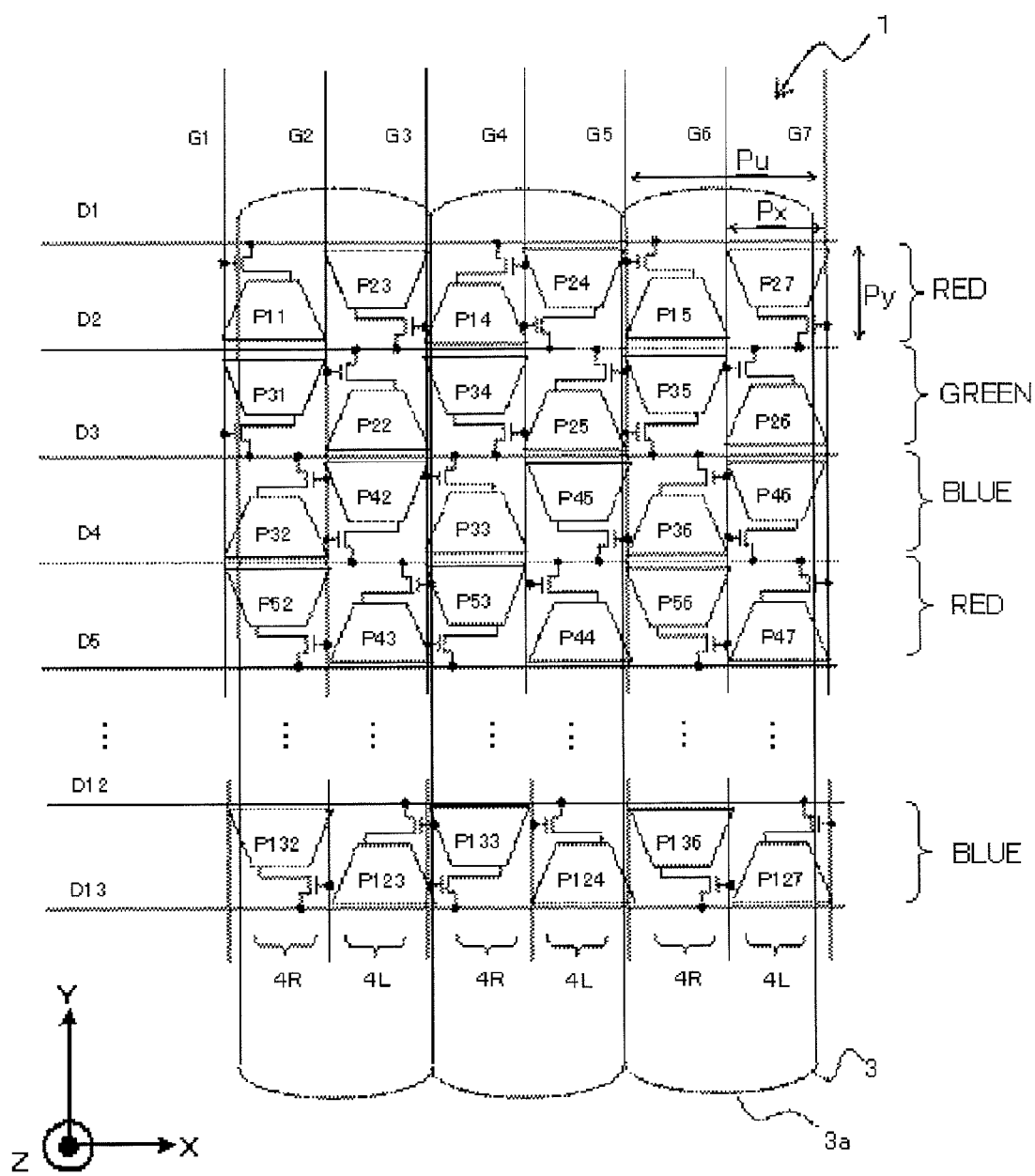
FIG. 1 is a plan view of an image display device according to a first exemplary embodiment of the present invention.
Figure 2:
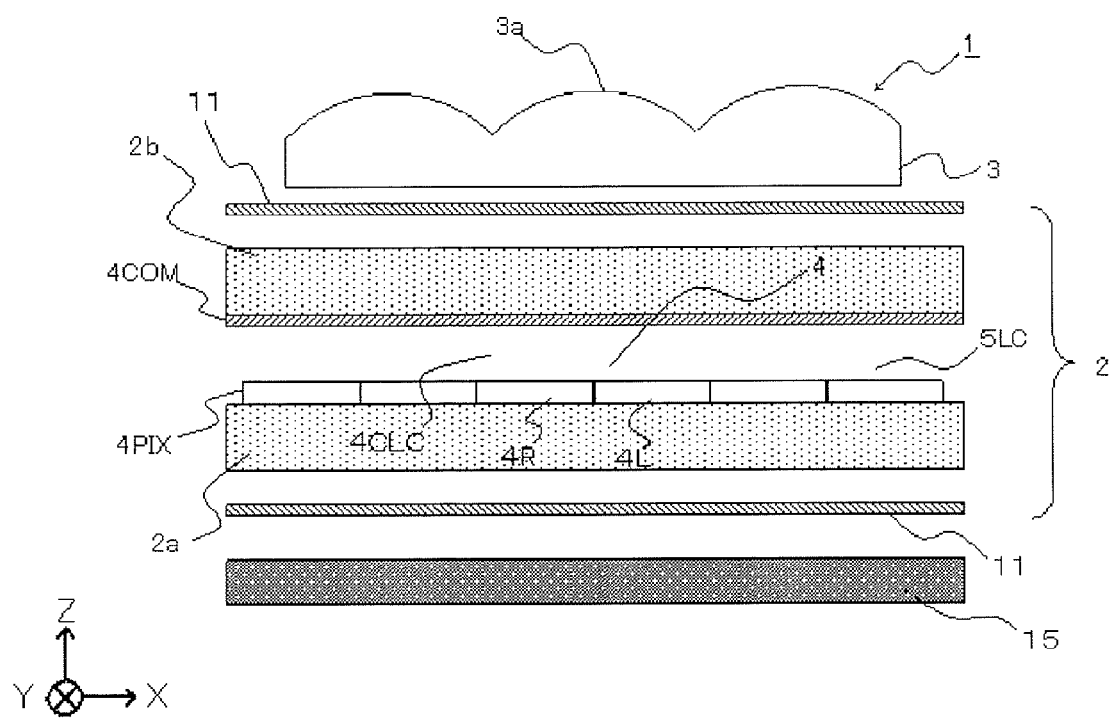
FIG. 2 is a cross-sectional view of the image display device according to the first exemplary embodiment of the present invention.

As shown in FIGS. 1 and 2, an image display device 1 of this exemplary embodiment is an image display device for a stereoscopic display including a display panel 2 that uses liquid crystal molecules as electrooptic elements, and a lenticular lens 3. The lenticular lens 3 is arranged at the display-face-side of the display panel 2, i.e., at a side toward a viewer.

The display panel 2 is for stereoscopic display with two view points and includes pixels of displaying an image for a first view point and pixels of displaying an image for a second view point. In the present exemplary embodiment, the pixels for the first view point are left-eye pixels 4L, and the pixels for the second view point are right-eye pixels 4R. That is, the display panel 2 has pixel pairs each of which is a "unit of display" including a left-eye pixel 4L and a right-eye pixel 4R and the pixel pairs are arranged in a matrix pattern. In the present exemplary embodiment, the left-eye pixel 4L and the right-eye pixel 4R are collectively referred to as a pixel 4.

As shown in FIG. 2, the lenticular lens 3 is a lens array having multiple cylindrical lenses 3a arranged in a one-dimensional alignment manner. The cylindrical lens 3a is a one-dimensional lens having a convex portion in a hog-backed shape. The direction in which the lenticular lens 3 extends, i.e., the lengthwise direction is orthogonal to the arrangement direction in a display surface. The cylindrical lens 3a has no lens effect in the extending direction, but has the lens effect only in the arrangement direction that is the orthogonal direction. Hence, the lenticular lens 3 can serve as a one-dimensional lens array that has the lens effect only in the direction in which the cylindrical lenses 3a are arranged. The arrangement direction of the cylindrical lenses 3a is set to be a direction in which the left-eye pixels 4L and the right-eye pixels 4R are alternately arranged. The cylindrical lenses 3a are each disposed so as to correspond to the above-explained unit of display. In the present exemplary embodiment, when an explanation will be focusingly given of a pixel configuring the unit of display, such a pixel is referred to as a "sub pixel".

As explained above, the cylindrical lens 3a has the lens effect only in the direction orthogonal to the extending direction. In the present exemplary embodiment, the direction in which the lens effect acts is consistent with the direction in which the left-eye pixels 4L and the right-eye pixels 4R are alternately arranged. As a result, the cylindrical lenses 3a function as light beam separating unit which is capable of separating light from the left-eye pixel 4L and light from the right-eye pixel 4R in different directions. Accordingly, the lenticular lens 3 can separate an image displayed by the left-eye pixel 4L for each unit of display and an image displayed by the right-eye pixel 4R for each unit of display in different directions. That is, the lenticular lens 3 is an optical member that functions as image separating unit and image distributing unit. The focal distance of the cylindrical lens 3a is set to be a distance between the principal point of the cylindrical lens 3a, i.e., the vertex of the lens and a pixel surface, i.e., a surface where the left-eye pixel 4L or the right-eye pixel 4R is arranged.

In the present specification, an X, Y, and Z Cartesian coordinate system is defined as below. In the direction in which the left-eye pixels 4L and the right-eye pixels 4R are alternately arranged, a direction from the right-eye pixel 4R to the left-eye pixel 4L in a unit of display is defined as +X direction, and the opposite direction thereof is defined as −X direction. The +X direction and the −X direction are collectively referred to as an X axis direction. Moreover, the lengthwise direction of the cylindrical lens 3a is defined as a Y axis direction. Furthermore, the direction orthogonal to both X axis direction and Y axis direction is defined as a Z axis direction, and in the Z axis direction, a direction from the surface where the left-eye pixel 4L or the right-eye pixel 4R is arranged to the lenticular lens 3 is defined as +Z direction, and the opposite direction thereof is defined as −Z direction. The +Z direction is directed ahead, i.e., toward a user, and the user views the surface of the display panel 2 at +Z side. The +Y direction is a direction in which the right-hand coordinate system is established. That is, when the thumb of a right hand of a human is directed to the +X direction and the index finger is directed to the +Y direction, the middle finger is directed to the +Z direction.

When the X, Y, and Z Cartesian coordinate system is defined as explained above, the arrangement direction of the cylindrical lenses 3a is the X axis direction, and an image for the left eye and an image for the right eye are separated along the X axis direction. Moreover, units of display each including the left-eye pixel 4L and the right-eye pixel 4R are arranged on a line in the Y axis direction. The arrangement cycle of the pixel pairs in the X axis direction is substantially equal to the arrangement cycle of the cylindrical lenses 3a. A cylindrical lens 3a corresponds to a line where the units of display are arranged in the Y axis direction.

In the present exemplary embodiment, a pixel is defined by three units of display, and respective units of display are red, green, and blue. Color filters of respective colors: red; green; and blue extend in the X axis direction, and red, green, and blue color filters are repeatedly arranged in a stripe-like pattern in the Y axis direction. The order of colors of the color filter is not limited to this configuration. Moreover, the kinds of colors are not limited to this configuration, and color filters with M number of colors equal to or larger than three colors may be repeatedly arranged in a stripe-like pattern. In the present exemplary embodiment, the color filters and a black matrix are provided on the surface of an opposing substrate 2b at a liquid-crystal-layer-5LC side.

As shown in FIG. 2, the display panel 2 has a TFT substrate 2a and the opposing substrate 2b arranged so as to have a tiny space therebetween, and the liquid crystal layer 5LC is arranged in that space. The liquid crystal layer 5LC is set to be in, for example, a transparent TN mode. The present invention is not limited to this configuration, and other liquid crystal modes can be applied. The TFT substrate 2a is arranged at the −Z direction side of the display panel 2, and the opposing substrate 2b is arranged at the +Z direction side. That is, the lenticular lens 3 is arranged at the further +Z side of the opposing substrate 2b. Moreover, polarization plates 11 are pasted at the +Z side of the TFT substrate 2a and at −Z side of the opposing substrate 2b.

The display panel 2 shown in FIG. 2 is an active-matrix type display panel including TFTs (Thin Film Transistors). The TFT functions as a switch that supplies a display signal to each pixel, and a gate signal that flows through a gate line G connected to the gate of each switch controls the switch. As shown in FIG. 1, gate lines G1 to G7 that run in the column direction, i.e., the Y axis direction are arranged on a surface of the TFT substrate 2a at the liquid-crystal-layer-5LC side, i.e., a surface at the +Z direction side. Hereinafter, the gate lines G1 to G7 are collectively referred to as a gate line G. Furthermore, data lines D1 to D13 that run in the row direction, i.e., the X axis direction are arranged on the same surface of the TFT substrate 2a. Hereinafter, the data lines D1 to D13 are collectively referred to as a data line D.

The data line D supplies a display data signal to the TFT. In the present exemplary embodiment, the gate lines G are bent but run in the Y axis direction through several bending, and arranged in the X axis direction. Moreover, the data lines D are bent but run in the X axis direction through several bending, and are arranged in the Y axis direction. A pixel (the left-eye pixel 4L or the right-eye pixel 4R) is arranged in the vicinity of the intersection between the gate line G and the data line D.

In FIG. 1, in order to clarify the connection relationship of each pixel to the gate line G and the data line D, for example, a pixel connected to the data line D3 and the gate line G2 is denoted as P32. That is, the number following a letter P is the number of the data line D, and the number following the former number is the number of the gate line G.

Figure 3:
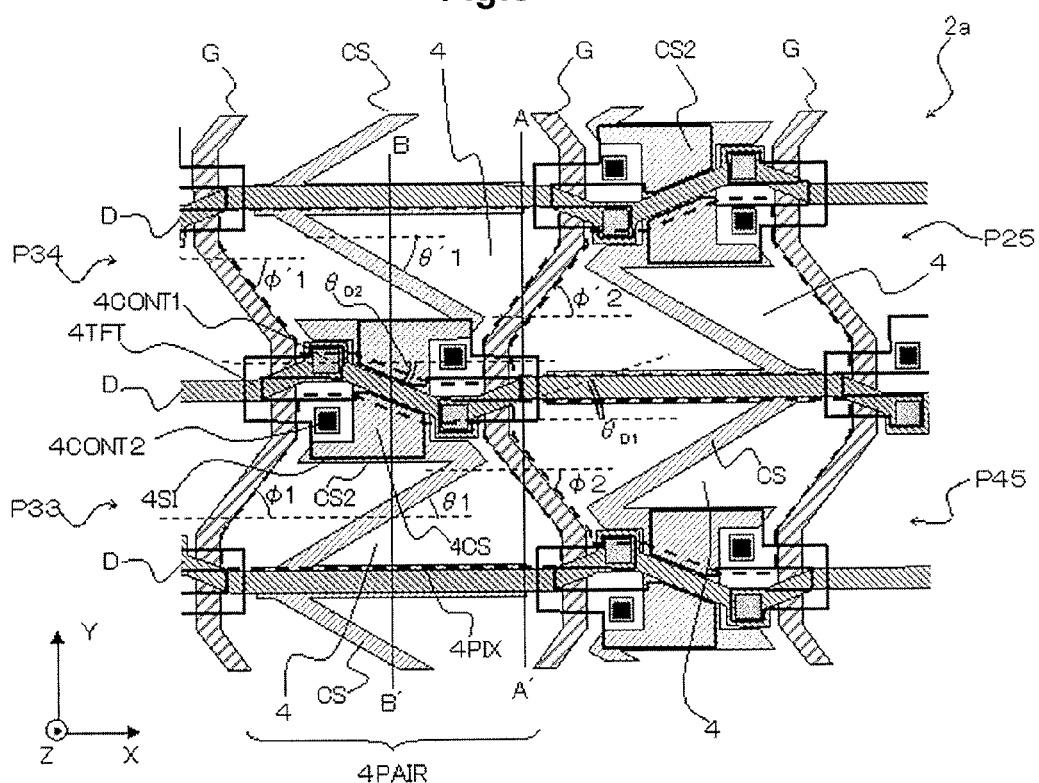
FIG. 3 is a plan view showing structures of some pixels on a TFT substrate side of the image display device according to the first exemplary embodiment of the present invention.
Figure 4:
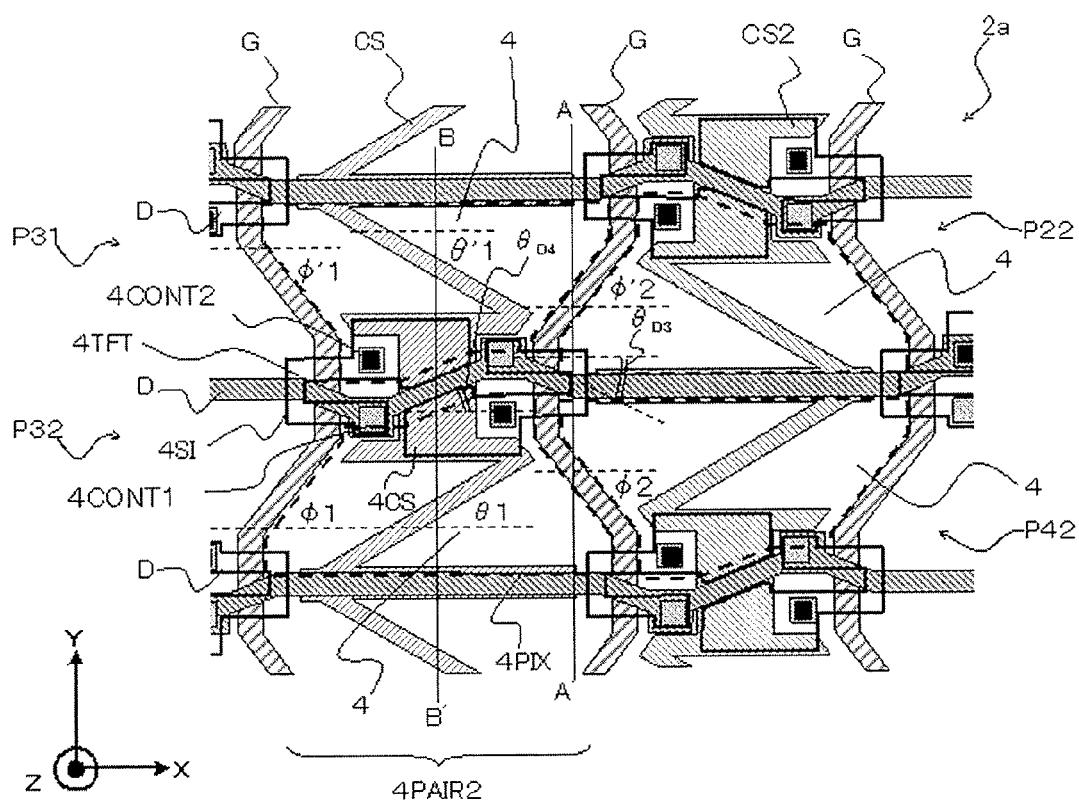
FIG. 4 is a plan view showing structures of another some pixels on the TFT substrate side of the image display device according to the first exemplary embodiment of the present invention.

As shown in FIGS. 3 and 4 in an enlarged manner, a region surrounded by the data line D and the gate line G is the pixel 4 where a pixel electrode 4PIX, a pixel thin-film transistor 4TFT, a storage capacitor line CS, and a storage capacitor electrode CS2 are arranged.

Note that FIG. 3 is an enlarged view of the pixels P34, P33, P25, and P45, and FIG. 4 is an enlarged view of the pixels P31, P32, P22, and P42.

The pixel thin-film transistor 4TFT is a MOS thin-film transistor, has either one of the source electrode or the drain electrode connected to the data line D through a contact hole 4CONT1, and has another connected to the pixel electrode 4PIX and one electrode of the storage capacitor 4CS through the contact hole 4CONT2. In the present exemplary embodiment, the electrode connected to the pixel electrode 4PIX is referred to as a source electrode, and the electrode connected to the data line D is referred to as a drain electrode. The gate electrode of the pixel thin-film transistor 4TFT is connected to the gate line G. Another electrode of the storage capacitor 4CS is connected to the storage capacitor electrode CS2. Furthermore, an opposing electrode 4COM is formed on the opposing substrate 2b at the liquid-crystal-layer-5LC side, and a pixel capacitor 4CLC is formed between the opposing electrode 4COM and the pixel electrode 4PIX. The storage capacitor line CS and the storage capacitor electrode CS2 are formed on the same layer, and are electrically connected together.

In FIGS. 3 and 4, respective contours of the contact hole 4CONT1, the contact hole 4CONT2, the pixel electrode 4PIX, and a silicon layer 4SI are indicated by a gray color, a black color, a dashed line, and a thick line, respectively. The hatching in each figure is for distinguishing each structural element, and does not mean a cross section.

In FIG. 1, in order to clarify the connection relationship of each pixel to the gate line G and the data line D, the pixel thin-film transistor 4TFT and the pixel electrode 4PIX shown in FIGS. 3 and 4 are extracted and shown. In FIGS. 3 and 4, respective sizes and scales of structural elements are changed appropriately in order to maintain the visibility of the figure.

In the present exemplary embodiment, a region surrounded by the gate line G and the data line D is referred to as an "aperture". The storage capacitor line CS is arranged so as to pass all the way through and traverse the aperture. In particular, the storage capacitor line CS is inclined and arranged in a different direction from the data line D and the gate line G at the center of the aperture. That is, regarding respective directions in which the storage capacitor line CS, the data line D, and the gate line G run in a sub pixel, the storage capacitor line CS, the data line D, and the gate line G run and are arranged in different directions, respectively.

As shown in FIG. 2, in the display panel 2, the column of the right-eye pixels 4R and the column of the left-eye pixels 4L are alternately arranged in the image separating direction, i.e., the X axis direction, the pixels each being a trapezoidal aperture. The aperture of the right-eye pixel 4R and that of the left-eye pixel 4L form an aperture region where those apertures do not overlap in the Y axis direction.

A pixel is a square having sub pixels three columns by two rows. When a pitch of a pixel is Pu, a pitch of a sub pixel in the X axis direction is Px, and a pitch of the sub pixel in the Y axis direction is Py, the following relational expression is satisfied.

$$Pu=2 \times Px=3 \times Py \qquad (1)$$

Figure 5:
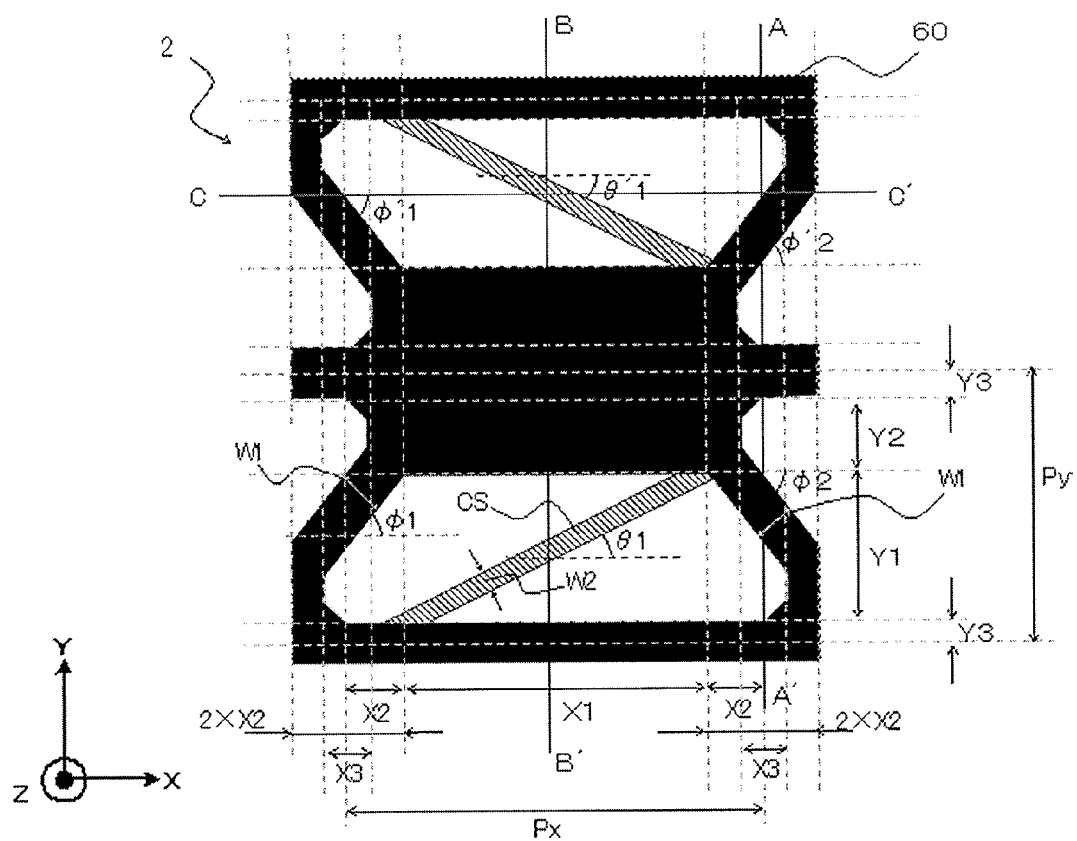
FIG. 5 is a plan view showing a pixel of the image display device according to the first exemplary embodiment of the present invention.

As shown in FIG. 5, black matrixes 60 which are light blocking portions covering respective pixels other than the aperture are provided on the opposing substrate 2b at the liquid-crystal-layer-5LC side. The black matrix 60 covers the pixel thin-film transistor 4TFT, the gate line G, the data line D, and the storage capacitor electrode CS2, and is opened in substantially trapezoidal shape. In the present exemplary embodiment, a term "light blocking portion" is used, but this is not particularly limited to the black matrix 60, and is a portion which blocks off light. Hence, the black matrix 60 may not be provided on the data line D or the gate line G, and may cover only pixel thin-film transistor 4TFT and storage capacitor electrode CS2. In this case, the data line D and the gate line G serve as the light blocking portion.

When expressions "up" and "down" or "low" on an XY plane are used in this specification, an "up" or "down" direction is a parallel direction to the Y axis direction, and the "up" side is the +Y direction, and the "down" or "low" side is the −Y direction. As explained above, the sub pixel can be regarded as being in a trapezoidal shape because of the shape of the light blocking portion, so that in the following explanation, such sub pixel is referred to as a substantially trapezoidal pixel, and the longer side is defined as a lower bottom, and the shorter side is defined as an upper bottom. The shape of the aperture is not limited to the trapezoidal shape, and can be a parallelogram, a polygon, an ellipse, a semicircle, etc.

As shown in FIG. 5, the length of the upper bottom in the aperture of the substantially trapezoidal pixel is indicated by a reference symbol X1. Moreover, the length of the inclined side of the substantially trapezoidal pixel from the center of the light blocking portion to an intersection with the upper bottom of the substantially trapezoidal pixel in the X axis direction is indicated by a reference symbol X2. Then, the width in the X direction of the substantially trapezoidal pixel in the inclined-side region is 2×X2. Moreover, in an adjoining pixel in the X axis direction, the width of a region where respective apertures of the substantially trapezoidal pixels overlap each other in the X axis direction is indicated by a reference symbol X3. Furthermore, the aperture width in the Y direction of the aperture of the substantially trapezoidal pixel is indicated by a reference symbol Y1. The width in the Y direction of the light blocking portion at the upper bottom of the substantially trapezoidal pixel is Y2, and the width in the Y direction of the light blocking line arranged at the lower bottom of the substantially trapezoidal pixel is 2×Y3. Accordingly, based on the pitch Px of the sub pixel in the X axis direction, the pitch Py in the Y axis direction, and the relationship between the light blocking portion of the substantially trapezoidal pixel and the aperture, the following relational expression is satisfied.

$$Px=X1+2 \times X2 \qquad (2)$$

$$Py=Y1+Y2+2 \times Y3 \qquad (3)$$

The pixel thin-film transistor 4TFT is a poly-silicon thin-film transistor using polycrystal silicon as a semiconductor. An example of the polycrystal silicon is a p-type semiconductor containing a tiny amount of boron. That is, the pixel thin-film transistor 4TFT is a PMOS thin-film transistor in which the source electrode and the drain electrode electrically conducted when the potential of the gate electrode becomes a low level relative to the potential of the source electrode or the drain electrode. The present invention is not limited to this type of transistor, and an NMOS thin-film transistor can be used likewise.

The poly-silicon layer of the poly-silicon thin-film transistor is formed by, for example, forming a silicon oxide layer on the TFT substrate 2a, by forming an amorphous silicon layer thereon, and by causing the amorphous silicon layer to be polycrystalline. Example techniques of causing the amorphous silicon layer to be polycrystalline are thermal annealing and laser annealing. In particular, in the case of the laser annealing using laser like excimer laser, it is possible to heat only the silicon layer and to cause such silicon layer to be polycrystalline while limiting the temperature rise of a glass substrate at a minimum. Accordingly, when the laser annealing is applied, it becomes possible to use an alkali-free glass having a low melting point. Hence, the cost can be reduced, so that the poly-silicon thin-film transistor is widely used and called a low-temperature poly-silicon. In the present exemplary embodiment, the scanning direction of excimer laser to a glass substrate is set in the Y axis direction. An amorphous silicon thin-film transistor can be realized by skipping an annealing step.

Next, a silicon oxide layer that will be a gate insulation layer is formed on the poly-silicon layer, and is patterned as needed. In this process, it is preferable to dope ions in regions other than the portion to be used as the semiconductor layer of the silicon thin-film in order to make such regions conductive. An example scheme of patterning is optical patterning that uses a photosensitive resist. In an example case, after the photosensitive resist is subjected to spin coating, light is partially emitted from an exposure device like a stepper, and the film of photosensitive resist is left at only portion where a pattern should be formed through a developing process. Thereafter, the silicon layer at the region where no photosensitive resist film is left is eliminated by dry etching, etc., and the photosensitive resist film is peeled at last.

Next, an amorphous silicon layer and a tungsten silicide layer are formed, and those layers are patterned in order to form a gate electrode, etc. At this time, a gate line to be connected to the gate electrode, a storage capacitor electrode, and a storage capacitor line may also be formed as well. Next, a silicon oxide layer and a nitride silicon layer are formed and patterned as needed, and an aluminum layer and a titanium layer are formed in order to form a source electrode and a drain electrode. At this time, a data line may also be formed simultaneously.

Next, a nitride silicon layer is formed and is patterned as needed, and a transparent conductive film like ITO (Indium Tin Oxide) is formed and patterned, thereby forming a pixel electrode. Through those processes, a pixel structure with a thin-film transistor can be formed. A circuit that drives the gate line, the data line, and the storage capacitor line can be formed simultaneously using this thin-film transistor.

Figure 6:
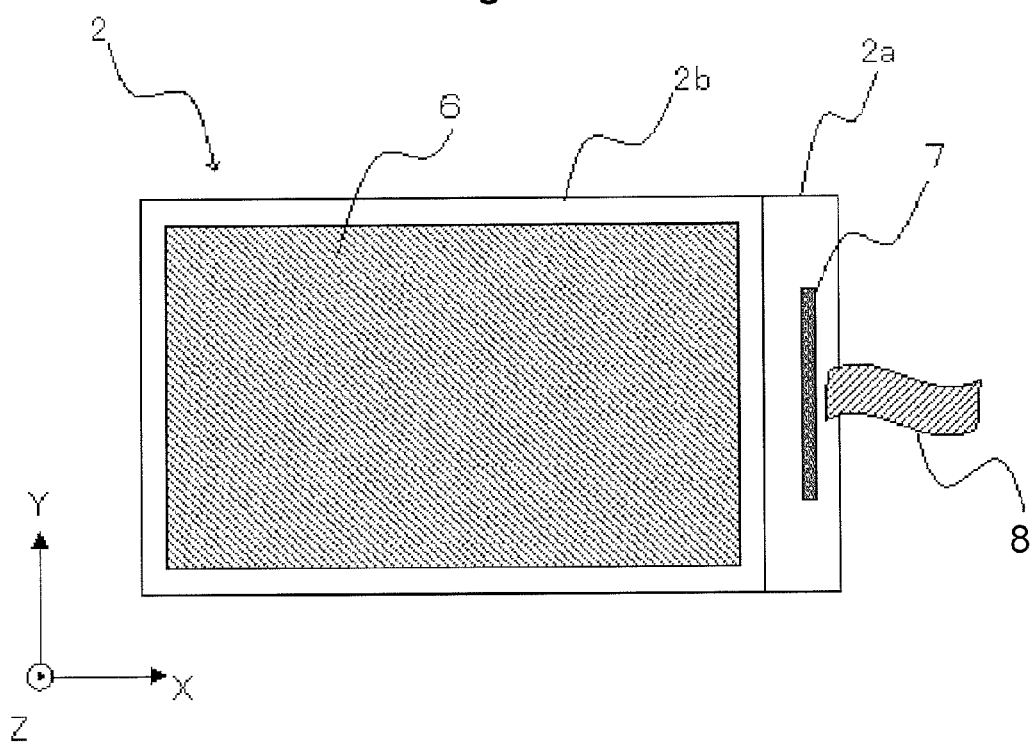
FIG. 6 is a plan view showing a display panel according to the first exemplary embodiment of the present invention.

As shown in FIG. 6, the display panel 2 is provided with a driver IC 7 that controls the short side of the TFT substrate 2a with a video signal. The output pins of the driver IC 7 are connected to respective data lines D of a display unit 6. In general, the pitch of the output pins of the driver IC 7 is narrower than that of the data lines D. Accordingly, wirings running from the output pins of the driver IC 7 to respective data lines D need to spread. Hence, it is necessary that the driver IC 7 is apart from the display unit (the unit that displays an image) 6 by a certain distance. The less the number of the data lines D, the shorter the distance from the display unit 6 to the driver IC 7 can be if the pitch of the output pins is same. As shown in FIG. 6, when the display unit 6 is a landscape (horizontally long), the number of data lines D can be reduced if the data lines D are arranged in the horizontal direction, i.e., the short side in the X axis direction in comparison with a case in which the data lines D are arranged in the vertical direction, i.e., the long side in the Y axis direction. Accordingly, arrangement of the data lines D in the horizontal direction enables the size reduction of the frame of the display panel 2. Moreover, by reducing the number of data lines, the load to the driver IC 7 can be reduced.

In the present exemplary embodiment, a gate driver circuit that successively scans the gate lines G is formed on the TFT substrate 2a simultaneously with the pixel thin-film transistor 4TFT. Accordingly, the frame width of the display panel 2 at the long side can be reduced. By arranging the driver IC 7 at the short side and by integrating the gate driver circuit at the long side, respective sides of the frame of the display panel 2 can be reduced. Furthermore, by reducing the size of the frame, the size of the display panel 2 can be reduced. Accordingly, the number of display panels 2 obtained from a mother substrate is increased, thereby reducing the cost of each display panel 2. Still further, by integrally forming the pixel and the gate driver circuit on the TFT substrate 2a, the number of parts of the driver circuit can be reduced, resulting in a cost reduction and little energy consumption.

FIGS. 3 and 4 show a pixel divided into four pieces. In the present exemplary embodiment, the gate lines G, the storage capacitor lines CS, and the storage capacitor electrodes CS2 are formed on the same layer as that of the gate electrode of the pixel thin-film transistor 4TFT. Moreover, the storage capacitors 4CS are formed between the silicon layer 4SI and respective storage capacitor electrodes CS2. As explained above, the silicon layer 4SI is connected to the data lines D through the contact holes 4CONT1, and respective another contact holes 4CONT2 in respective pixels 4 provided at the pixel-electrode-4PIX side are for electrically connecting the silicon layer 4SI in respective storage capacitors 4CS and respective pixel electrodes 4PIX.

In the following explanation, an expression "adjoining pixel pair" is used. This means that two pixels between data lines D are in a state in which those two pixels are connected to the data line D arranged between such pixels. That is, a data potential of a video signal is supplied to the pixels configuring the adjoining pixel pair through the data line D arranged therebetween. As shown in FIGS. 3 and 4, the two pixels P34 and P33 arranged side by side in the left of the Y axis direction configure an adjoining pixel pair 4PAIR and the two pixels P31 and P32 configure an adjoining pixel pair 4PAIR2.

Furthermore, respective pixels configuring the adjoining pixel pairs 4PAIR and 4PAIR2 are controlled to perform a switching operation through different gate lines G. In the adjoining pixel pair 4PAIR in the −X direction in FIG. 3, the pixel 4 at the −Y direction side is controlled by the gate line G arranged at −X direction side, and the pixel 4 at the +Y direction side is controlled by the gate line G arranged at +X direction side.

The adjoining pixel pair 4PAIR adjoining in the direction in which the data line D runs, i.e., the X axis direction are not connected to the common data line D, but are connected to different data lines D. This is because the adjoining pixel pair 4PAIR adjoins in the X axis direction in a state in which pixels are shifted by one pixel in the Y axis direction. Such an arrangement enables to reduce the number of necessary wirings at a minimum, so that the aperture ratio can be improved.

With reference to FIG. 1, the arrangement relationship of pixels will be confirmed. First, an explanation focusing on an adjoining pixel pair configured by the pixels P31 and P32 will be given. In order to simplify the explanation, this adjoining pixel pair will be denoted as an adjoining pixel pair (P31, P32). An adjoining pixel pair (P23, P22) and an adjoining pixel pair (P42, P43) adjoin to the adjoining pixel pair (P31, P32) in the +X direction. The adjoining pixel pair (P22, P23) has the data line D2 as the common data line. An expression "common data line" means that respective pixels of the adjoining pixel pair are connected to the common data line arranged therebetween and a data potential supplied through the common data line is written in respective pixels at a predetermined timing. The adjoining pixel pair (P31, P32) has the data line D3 as the common data line, so that it can be expressed that the adjoining pixel pairs (P31, P32) and (P22, P23) have the common data lines which are different from each other. Note that respective common data lines adjoin to each other.

Another adjoining pixel pair (P42, P43) adjoins to the adjoining pixel (P31, P32) in +X direction. Likewise, those adjoining pixel pairs have common data lines D which are different from each other.

Furthermore, an adjoining pixel pair (P34, P33) is arranged relative to the adjoining pixel pair (P23, P22) or the adjoining pixel pair (P42, P43) in the +X direction. Like the adjoining pixel pair (P31, P32), the adjoining pixel pair (P34, P33) has the data line D3 as the common data line. That is, an adjoining pixel pair having the same data line as the common data line is arranged for each pixel column. In other words, the data line connected to the adjoining pixel pair configuring the right-eye pixel 4R is not connected to the adjoining pixel pair configuring the left-eye pixel 4L.

In the adjoining pixel pair (P22, P23) configured by the pixels P22 and P23, the pixel P22 located at the −Y direction side relative to the common data line D2 is controlled by the gate line G2 located at −X direction side, and the pixel P23 located at +Y direction side relative to the data line D2 is controlled by the gate line G3 located at +X direction side. That is, the adjoining pixel pair has respective pixels arranged up and down so as to sandwich the common data line therebetween, and the upper pixel is connected to the right gate line.

Conversely, in the adjoining pixel pair (P31, P32) configured by the pixels P31 and P32, the pixel P32 located at −Y direction side relative to the common data line D3 is controlled by the gate line G2 located at +X direction side, and the pixel P31 located at +Y direction side relative to the data line D3 is controlled by the gate line G1 located at −X direction side. That is, the adjoining pixel pair has respective pixels arranged up and down so as to sandwich the common data line therebetween, and the upper pixel is connected to the left gate line. In the pixel columns adjoining in +X direction, the adjoining pixel pair having the upper pixel controlled by the left gate line is arranged at −Y side relative to the adjoining data line. As a result, the same kind of adjoining pixel pairs are arranged in an inclined direction. In other words, the display panel 2 of the present exemplary embodiment comprises the adjoining pixel pairs each having an upper pixel connected to the left gate line and the adjoining pixel pairs each having an upper pixel connected to the right gate line.

The pixel layout shown in FIG. 3 corresponds to, in FIG. 1, a relationship between the adjoining pixel pair (P34, P33) and the sub pixels P25, and P45 adjoining in the +X direction. Moreover, the pixel layout shown in FIG. 4 corresponds to, for example, in FIG. 1, a relationship between the adjoining pixel pair (P31, P32) and the sub pixels P22, and P42. The pixel array of the TFT substrate 2a in the display panel 2 of the present exemplary embodiment is formed by arranging the pixels shown in FIGS. 3 and 4 alternately in the X direction and in the Y direction.

Moreover, the display region in each pixel, i.e., the region used for a display is formed in a substantially trapezoidal shape. The shape of the pixel electrode 4PIX is also in a substantially trapezoidal shape corresponding to the shape of the display region. The adjoining pixel pair can be expressed such that two pixels having substantially trapezoidal display regions are arranged so as to join respective upper bottoms of the trapezoids. The pixel thin-film transistor 4TFT is arranged at the upper bottom side of the display region in a substantially trapezoidal shape, and is arranged between respective upper bottoms of the pixels configuring the adjoining pixel pairs 4PAIR and 4PAIR2.

The storage capacitor line CS is arranged so as to electrically connect respective storage capacitor electrodes CS2 of sub pixels adjoining in the running direction of the gate line G, i.e., the Y axis direction. The storage capacitor electrode CS2 is arranged at the upper bottom side of the display region in a substantially trapezoidal shape in each sub pixel like the pixel thin-film transistor 4TFT. The storage capacitor electrode CS2 is arranged along a virtual line B-B' that is a center line of the sub pixel, and is formed in an axisymmetrical shape relative to the B-B' line. Hence, regions forming the storage capacitors 4CS can be efficiently arranged between respective upper bottoms of sub pixels configuring the adjoining pixel pairs 4PAIR, and 4PAIR2, thereby further improving the aperture ratio.

The pixel thin-film transistors 4TFT provided at respective adjoining pixel pairs 4PAIR, and 4PAIR2 each employ a double-gate structure formed in a rectangular shape with a side being opened, and are arranged so that respective opened sides face with each other. The storage capacitor electrode CS2 is formed between the pixel thin-film transistors 4TFT of a double-gate structure so as to face with each other, and the storage capacitor 4CS is formed between the silicon layer 4SI provided at each sub pixel and the storage capacitor electrode CS2.

Respective channels of the pixel thin-film transistors 4TFT in the adjoining pixel pairs 4PAIR and 4PAIR2 are arranged so as to be parallel to the image separating direction, i.e., the X axis direction. The data line D is arranged so as to be bent at the upper layer of the pixel thin-film transistor 4TFT and inclined in a different direction from the image separating direction, i.e., the X axis direction at the upper layer of the channel region. Moreover, the data line D is arranged so as to be inclined in a different direction from the image separating direction on the storage capacitor electrode CS2. As explained above, the data line D runs in the X axis direction through several bending at the upper layers of the pixel thin-film transistor 4TFT and the storage capacitor electrode CS2 both arranged at the upper bottom of a trapezoid. Bending of the data line D at the upper bottom of the trapezoid enables efficient arrangement of the data line D, so that the aperture ratio can be improved. Moreover, since the channel of the pixel thin-film transistor 4TFT is arranged so as to be parallel to the X axis direction, the transistor characteristics of respective adjoining pixel pairs can be uniform by setting the scanning direction of laser annealing in the Y axis direction which is for making the poly-silicon layer crystallized.

The storage capacitor line CS is electrically connected to the storage capacitor electrode CS2. Hence, the storage capacitor electrodes CS2 of respective pixels configuring the adjoining pixel pairs 4PAIR and 4PAIR2 have the same potential. Since the substantially trapezoidal pixels in the adjoining pixel pairs 4PAIR and 4PAIR2 are joined together so that respective upper bottoms of the trapezoids face with each other, the area for forming the storage capacitor 4CS can be efficiently secured by providing the common storage capacitor electrode CS2. Accordingly, the aperture ratio can be increased in comparison with conventional technologies, and the transmissivity can be increased.

Figure 7:
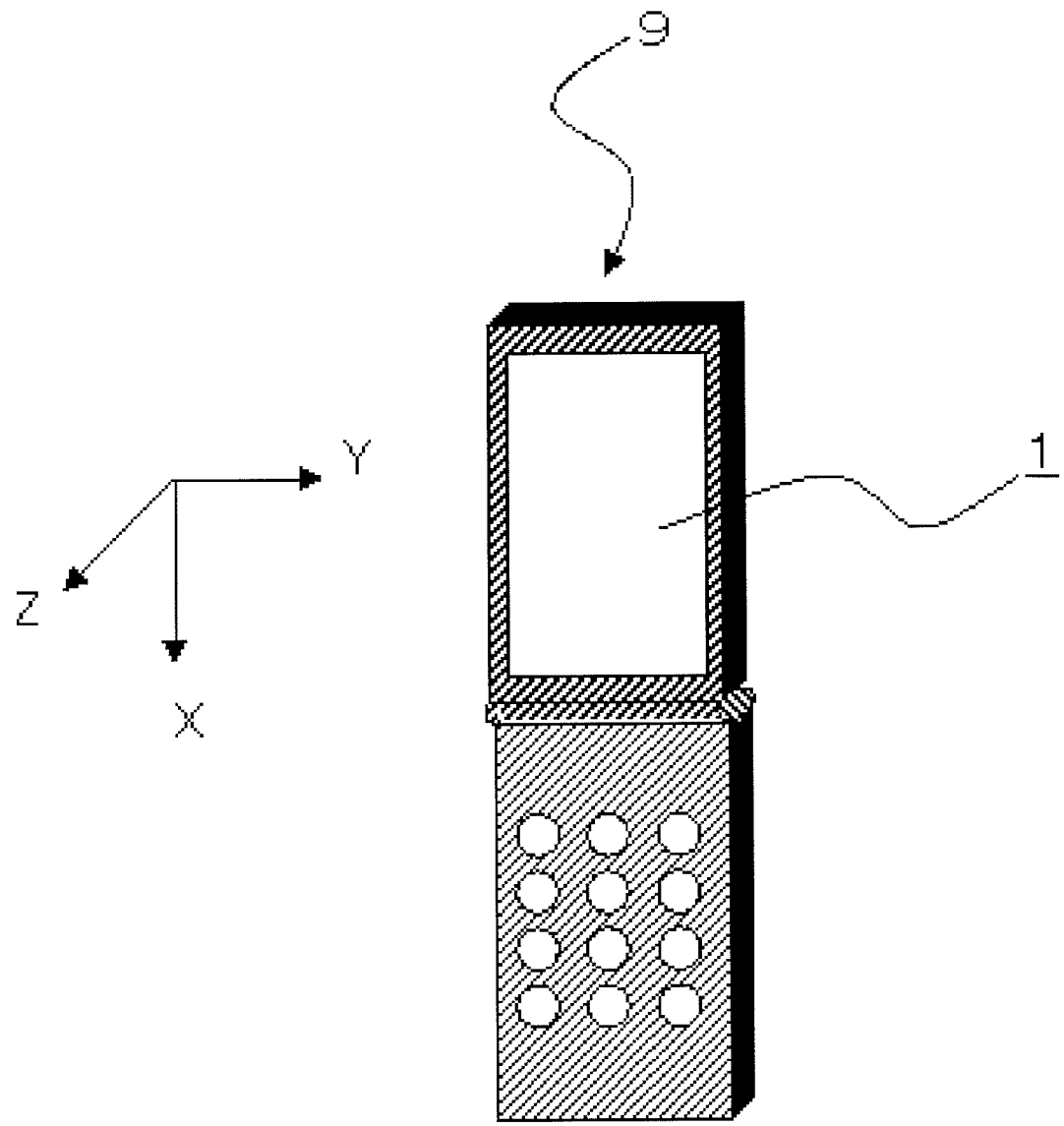
FIG. 7 is a perspective view showing a portable device on which the image display device according to the first exemplary embodiment of the present invention is mounted.

As shown in FIGS. 7 and 8, the terminal device according to the present exemplary embodiment is a cellular phone 9. The above-explained image display device 1 is mounted on the cellular phone 9. As shown in FIG. 7, the X axis direction of the image display device 1 is the vertical direction of the screen of the cellular phone 9, and the Y axis direction of the image display device 1 is the horizontal direction of the screen of the cellular phone 9. As shown in FIG. 8, the screen part of the cellular phone 9 is provided with a hinge including a rotating shaft, and is freely rotatable. Hence, the image separating direction (the X axis direction) can be set to be substantially parallel to a line interconnecting both eyes of the viewer when in use. Moreover, since the display panel 2 has a narrow frame, the image display device 1 can be suitably applied to the portable device without deteriorating the functions and designs requisite for the portable device.

Next, an explanation will be given of the pixel structure according to the present exemplary embodiment and the effect thereof.

In the plural-view-point display device, in order to accomplish improvements of the aperture ratio and image quality, it is necessary to make the vertical aperture ratio maximum while maintaining the vertical aperture ratio substantially constant regardless of the position in the horizontal direction. The aperture ratio in the Y axis direction, i.e., the vertical aperture ratio is defined as follow. The vertical aperture ratio is a value obtained by dividing, by the pixel pitch in the Y axis direction, the total width of the aperture in the Y axis direction when the pixel is cut using a line segment running in a direction (the Y axis direction) orthogonal to the image separating direction (in the present exemplary embodiment, the X axis direction) of the image separating unit. In the plural-view-point display device, in order to accomplish improvements of the aperture ratio and the image quality, it is necessary to make the vertical aperture ratio maximum while maintaining the vertical aperture ratio substantially constant regardless of the image separating direction.

First, regarding the arrangement of the gate line G and the data line D, it is preferable that the gate line G and the data line D should be arranged around each pixel. This enables reduction of a dead space between wirings and improvement of the aperture ratio. In other words, it is preferable to avoid an arrangement in which respective gate lines G or respective data lines D adjoin to each other without a pixel intervening therebetween. This is because when the same kinds of wirings adjoin to each other, it is necessary to make the wirings spaced apart in order to suppress any short-circuiting, and such a space becomes a dead space that reduces the aperture ratio.

In particular, in the case of the stereoscopic image display device, at least the image separating direction is set to be the horizontal direction of the display device.

The storage capacitor line CS is bent from the layout direction of the storage capacitor line CS and is inclined in a different direction from the image separating direction in order to make the vertical aperture ratio constant regardless of the image separating direction. The inclined angle of the storage capacitor line CS is set to be an angle which makes the rate of apertures substantially constant.

A storage capacitor line CS is arranged in a sub pixel, and is arranged so as to traverse the virtual line B-B' passing through the center of the sub pixel. The virtual line B-B' is parallel to the Y axis direction and divides the sub pixel into two pieces in the X axis direction of the sub pixel. The outline of the sub pixel is substantially trapezoidal having an axisymmetrical axis to the Y axis, so that the virtual line B-B' is also an axisymmetrical axis of the outline of the sub pixel, and passes through the weighted center of the sub pixel.

The inclination angle of each wiring is defined in such a way that the direction counterclockwise around the +X direction as the 0-degree axis is positive. As shown in FIGS. 3, 4, and 5, the gate line G is inclined in a different direction from the image separating direction in each sub pixel, and in the pixel in which the upper bottoms of the adjoining pixel pairs 4PAIR and 4PAIR2 are directed to the +Y direction, the gate line G at the −X side has an inclination angle that is $\phi 1$, and the gate line G at the +X axis side has an inclination angle that is $\phi 2 = -\phi 1$. Moreover, in the pixel in which the upper bottoms are directed to −Y direction, the gate line G at the −X direction side has an inclination angle that is $\phi'1 = -\phi 1$, and the gate line G at the +X side has an inclination angle that is $\phi'2 = \phi 1$.

The storage capacitor line CS is inclined in a different direction from the image separating direction in each sub pixel, and in the pixel in which respective upper bottoms of the adjoining pixel pairs 4PAIR and 4PAIR2 are directed to the +Y direction, an inclination angle is $\theta 1$. Moreover, in the pixel in which the upper bottoms are directed to −Y direction, an inclination angle is $\phi'1 = -\theta 1$. That is, a relationship that $\theta = |f'1|$ is satisfied.

Furthermore, it is necessary to bend the gate line G from the arrangement direction of the gate line G in order to make the vertical aperture ratio constant regardless of the position of the image separating direction. Examples of the restriction for the vertical aperture ratio are the structure of the inclined portion of bending, the structure between the lower bottoms of the trapezoidal apertures, and the structure between the upper bottoms thereof. More specifically, as is indicated by a line A-A' in FIG. 3, in a vertical line that cuts the inclined portion, the width of the inclined portion of the gate line G in the Y axis direction and the width of the lower bottom of the trapezoid in the Y axis direction affect the vertical aperture ratio. Moreover, as is indicated by the line B-B', in a vertical line that cuts the TFT portion, the widths of the upper bottom and the lower bottom in the Y axis direction and the width of the inclined portion of the storage capacitor line CS affect the vertical aperture ratio.

As shown in FIG. 5, what is common to both A-A' line and B-B' line is a light blocking width in the Y axis direction at the lower bottom of the substantially trapezoidal pixel. Hence, an explanation will be given of a structure that minimizes the light blocking width of the lower bottom in the Y axis direction. It is necessary to arrange at least one data line D at the light blocking portion located at the lower bottom. In order to minimize the light blocking width of the lower bottom in the Y axis direction, it is preferable that only the data line D1 should be the structural object. For example, when a thin-film transistor is arranged at the lower bottom, the width of the lower bottom in the Y axis direction increases by what corresponds to such a transistor, so that it is not preferable. In particular, in the line A-A', lower bottoms are arranged so as to overlap with each other, the increase of the width of the lower bottom in the Y axis direction largely affects. Hence, it is preferable to avoid arranging a structural object at the lower bottom of the substantially trapezoidal pixel as much as possible. Accordingly, it becomes possible to reduce the number of processes while reducing the width of the lower bottom in the Y axis direction.

Next, an explanation will be given of the width of the inclined portion in the Y axis direction and across the line A-A'. Wirings are bent at the inclined portion, so that the width in the Y axis direction increases by what corresponds to the bending. For example, when an inclination angle relative to the X axis is $\phi = |\phi 1| = |\phi'1| = |\phi 2| = |\phi'2|$, and when the width of the inclined portion is W1, the width of the inclined portion in the Y axis direction is W1/cos $\phi$. When, for example, $\phi$ is 60 degrees, the width of the inclined portion in the Y axis direction becomes twice as much as the width of the inclined portion. The width of the inclined portion in the Y axis direction is affected by 1/cos $\phi$ times of the width W1 of the inclined portion, and it is very important to reduce the width of the inclined portion.

In order to reduce the width of the inclined portion, it is preferable not to arrange any structural object at the inclined portion as much as possible. When, for example, a thin-film transistor is arranged at the inclined portion, the width increases by what corresponds to such a transistor, and the width increases by 1/cos $\phi$ times in the Y axis direction, so that it is not preferable. However, as explained above, it is necessary to arrange at least one gate line G in the sub pixel.

Finally, an explanation will be given of the width of the upper bottom in the Y axis direction in the line B-B'. As explained above, because it is difficult to arrange a thin-film transistor at the lower bottom and at the inclined portion, it is necessary to arrange the thin-film transistor at the upper bottom. Moreover, arrangement that reduces the width of the upper bottom in the Y axis direction is important. As is apparent from FIGS. 3 and 4, the structural object that has the longest width in the Y axis direction at the upper bottom is the image pixel thin-film transistor 4TFT. Accordingly, it is important to reduce the width of the pixel thin-film transistor 4TFT in the Y axis direction, i.e., the length thereof in the Y axis direction.

As shown in FIG. 5, a vertical aperture ratio A in the line A-A' and a vertical aperture ratio B in the line B-B' can be expressed by following formulae (4) and (5).

$$A = (Y1 + Y2 - W1/\cos \phi)/(Y1 + Y2 + 2 \times Y3) \quad (4)$$

$$B = (Y1 - W2/\cos \phi)/(Y1 + Y2 + 2 \times Y3) \quad (5)$$

The inclination angle of the storage capacitor line CS is set to be the same angle in the unit of display, and is set to be a different angle in the adjoining pixel pair. Moreover, the storage capacitor line CS is bent in a different direction sub pixel by sub pixel arranged side by side in the Y axis direction, and the inclination angles are dispersed relative to the Y axis direction. Furthermore, the storage capacitor line CS is parallel to the X axis direction.

Since the inclination angle of the gate line G and that of the storage capacitor line CS are different from each other, the period of moire stripes generated originating from the layout cycle of the lenses and the layout cycle of the wirings can be dispersed in each direction, so that the moire stripes are not likely to be visually recognized, thereby improving the display quality.

Moreover, the inclined portions of the storage capacitor lines CS are not parallel in the adjoining pixels in the Y axis direction, i.e., the adjoining pixel pairs 4PAIR and 4PAIR2, but are parallel to each other in the adjoining pixels in the X axis direction, i.e., the pixels that are units of display. The storage capacitor lines CS are dispersed in the Y axis direction.

As shown in FIGS. 3 and 4, the gate line G is arranged at a boundary between the adjoining pixels in the X axis direction, and respective ends of pixel electrodes of adjoining pixels are proximate to each other in the vicinity of the inclined portion of the gate line G. Hence, in the vicinity of the inclined portion of the gate line G, because of the effect of a magnetic field generated by the pixel electrode 4PIX and the gate line G, the orientation of the liquid crystal molecules is disturbed and a disclination is likely to occur. Accordingly, the contrast may be reduced because of light leaking from the backlight. In particular, in the case of the stereoscopic display element having image separating unit, local leaking of light in the pixel is enlarged, and is visually recognized as the varying in the brightness, resulting in the reduction of the display quality. Accordingly, it is desirable to provide a light blocking layer in the vicinity of the inclined portion of the gate line G in order to reduce light leaking. In the present exemplary embodiment, the upper layer of the gate line G is covered by the black matrix 60 provided on the opposing substrate 2b in order to block light. It is desirable to provide the black matrix 60 so as to be widened in consideration of the margin for miss-overlapping of the TFT substrate 2a and the opposing substrate 2b.

A wiring material provided at the TFT-substrate-2a side may be appropriately used in order to block light instead of the black matrix 60. When a light blocking portion is provided at the TFT-substrate-2a side, it can be patterned on the substrate with a high degree of accuracy, so that the line width of the light blocking layer can be set small, and thus the aperture ratio can be increased. In particular, by reducing the line width of the light blocking layer, 3D moire generated at the boundary between the right and left separated images can be reduced, thereby improving the display quality of a stereoscopic image.

Because the inclined portion of the gate line G is covered by the black matrix 60, the vertical aperture ratio may be affected by the overlapping precision of the TFT substrate 2a and the opposing substrate 2b and vary. It is desirable to design the fluctuation of the vertical aperture ratio originating from the overlapping precision to be set within the range of ±10%.

In the present exemplary embodiment, the storage capacitor line CS arranged at the aperture is covered by the pixel electrode 4PIX. Accordingly, an electric field generated by the storage capacitor line CS is completely blocked, so that entering of an electric field into the liquid crystal layer 5LC can be suppressed. Hence, no light leakage originating from the disturbance of the liquid crystal orientation occurs at the upper layer of the storage capacitor line CS, and it is not necessary to provide the black matrix 60. Accordingly, the aperture ratio can be increased.

In order to prevent external light entering into the display panel 2 from being reflected by the storage capacitor line CS and to suppress a reduction of the image quality, it is desirable to reduce the area of the storage capacitor line CS traversing the aperture as much as possible. Moreover, it is desirable that the surface of the storage capacitor line CS should be low-reflective as much as possible. A low-reflective film may be formed on the storage capacitor line CS. Hence, as shown in FIG. 5, it is desirable that a width W2 of the storage capacitor line CS should be smaller than the inclined light-blocking-portion width W1 of the gate line , and a following relationship should be satisfied.

$$W1>W2 \qquad (6)$$

Moreover, in order to increase the aperture ratio in a desired pixel, it is desirable that a light-blocking-portion width Y2 of the upper bottom of the substantially trapezoidal pixel should be smaller than a width Y1 of the trapezoidal aperture in the Y axis direction, and a following relationship should be satisfied.

$$Y1>Y2 \qquad (7)$$

As shown in FIG. 3, in the present exemplary embodiment, the inclination angle of the gate line G and that of the storage capacitor line CS differ from each other. In the case of the pixels of the adjoining pixel pairs 4PAIR and 4PAIR2 where the upper bottom is directed to the +Y direction, an inclination angle $\theta 1$ of the storage capacitor line CS passing through the pixel aperture is set to be smaller than an inclination angle $\phi 1$ of the gate line G. The gate line G is arranged at the center of the unit of display, and largely affects the separation performance of right and left images. In particular, the larger the inclination angle of the gate line G is, the larger a region X3 where right and left images are mixed becomes, and 3D crosstalk increases, so that it is difficult to increase the inclination angle of the gate line G. In particular, as shown in FIG. 5, when the width of the region where right and left images are mixed is X3, it is desirable that the aperture region in the region with the width X3 should be equal to or less than 10% of a pixel aperture area. Conversely, the inclination angle $\theta 1$ of the storage capacitor line CS does not largely affect 3D crosstalk, and can be smaller than the inclination angle $\phi 1$ of the gate line G. In order to make the fluctuation of the vertical aperture ratio in the X axis direction gradual as much as possible, it is desirable that the inclination angle of the storage capacitor line CS should be small. Hence, a following relationship should be satisfied.

$$\theta 1 < \phi 1 \qquad (8)$$

By reducing the inclination angle of the storage capacitor line CS, the storage capacitor line CS can intersect with the gate line G at an end of the light blocking portion, which can be deemed as a light blocking wiring portion successively bent in the X axis direction. This enables reduction of the varying of the brightness generated due to the enlargement effect by the image separating unit.

Moreover, in order to reduce 3D crosstalk, it is desirable that a length X1 of the upper bottom of the substantially trapezoidal pixel in the aperture should be larger than a length X2 in the X direction from the center point of the inclined side of the substantially trapezoidal pixel to the intersection with the upper bottom. In this case, a following relationship should be satisfied.

$$X1 > X2 \quad (9)$$

Furthermore, in order to reduce 3D crosstalk and to increase the aperture ratio, it is desirable that the length X1 of the upper bottom of the substantially trapezoidal pixel in the aperture should be longer than a value twice as much as the width X2 in the inclined region of the substantially trapezoidal pixel in the X axis direction, i.e., 2×X2. Moreover, it is desirable that the length X1 should be longer than a width X3 of a region where the apertures of the substantially trapezoidal pixels in the adjoining pixels in the X axis direction overlap in the X axis direction. Hence, a following relationship should be satisfied.

$$X1 > (2 \times X2) > X3 \quad (10)$$

In general, it is most efficient when the storage capacitor line CS is arranged in the vicinity of the thin-film transistor from the standpoint of formation of the storage capacitor 4CS. This is because the storage capacitor 4CS is formed between the electrode connected to the drain electrode of the pixel thin-film transistor 4TFT and the electrode connected to the storage capacitor line CS. In particular, in the present exemplary embodiment, the storage capacitor electrode CS2 is provided between the pixel thin-film transistors 4TFT controlling respective sub pixels of the adjoining pixel pair 4PAIR, and the adjoining pixel pairs 4PAIR and 4PAIR2 have the common storage capacitor electrode CS2, so that the region for forming the storage capacitor 4CS is efficiently laid out, thereby improving the aperture ratio.

Moreover, in the present exemplary embodiment, the pixel thin-film transistor 4TFT for controlling each pixel of the adjoining pixel pair employs a double-gate structure, and the channel of the pixel thin-film transistor 4TFT is arranged so as to be parallel to the X axis direction. The source electrode of each pixel thin-film transistor 4TFT is electrically connected to each pixel electrode through the contact hole 4CONT2 so as to control each pixel at +Y side or at −Y side. The contact hole 4CONT2 is provided at a side of each pixel electrode to be controlled, so that contact holes are efficiently arranged. According to this structure, each drain electrode connected to the data line D is not parallel to the X axis direction, so that it is necessary to bend the data line D in order to connect it to the drain electrode. As shown in FIGS. 3 and 4, in the present exemplary embodiment, the data line D at the upper layer of the storage capacitor electrode CS2 is arranged and inclined in a different direction from the image separating direction, and respective drain electrodes of the pixel thin-film transistors 4TFT provided in the adjoining pixel pair are electrically connected at the shortest distance. The connection between the drain electrode and the data line D employing a wiring layout structure having the data line D inclined can be applied to all adjoining pixel pairs, so that the uniformity of a writing condition to each pixel can be ensured.

In the present exemplary embodiment, the double-gate layout was explained, but the present invention is not limited to this type of layout, and the pixel thin-film transistor 4TFT may employ a single-gate structure, or a triple-gate structure. By employing a multi-gate structure like the double-gate structure or the triple-gate structure, optical leak current when the thin-film transistor is in an off state can be reduced, and thus a deterioration of the TFT characteristic by light emitted from the backlight or the exterior of the image display device can be suppressed. Accordingly, flicker, noises, and crosstalk can be suppressed, and the high-quality image display device can be provided. In particular, the thin-film transistor using poly-silicon has a small resistance between the source and the drain in comparison with a thin-film transistor using amorphous silicon, so that application of the above-explained multi-gate structure is noticeably effective. Moreover, it is effective to obtain lightness by increasing the brightness of the backlight from a high-definition pixel.

The pixel thin-film transistors 4 TFT at the upper bottoms of the substantially trapezoidal pixels control the pixel at +Y side and the pixel at −Y side, respectively, which adjoin in the Y axis direction. Accordingly, at the intersection between the storage capacitor electrode CS2 and the data line D, the data line D is arranged and inclined in a different direction from the image separating direction. The data line D inclined at the upper layer of the storage capacitor electrode CS2 is arranged at an angle θD2 from the image separating direction in FIG. 3, and at an angle θD4 from the image separating direction in FIG. 4 so as to connect the pixel thin-film transistors 4TFT for driving respective pixels in the adjoining pixel pair. The data line D arranged at the upper layer of the storage capacitor electrode CS2 is arranged and inclined in a different direction from the image separating direction, so that an unprofitable space is reduced, but can be used as a space for the storage capacitor 4CS.

The silicon thin-film portion of the pixel thin-film transistor 4TFT is stacked on the data line D. The data line D is arranged and inclined in a different direction from the image separating direction at the upper layer of the silicon thin-film portion. For example, in FIG. 3, an angle between the data line D and the X axis direction at the upper layer of the silicon thin-film is θD1, and in FIG. 4, an angle between the data line D and the X axis direction at the upper layer of the silicon thin-film is θD3.

Regarding the pixel thin-film transistor 4TFT, the data line D, and the contact holes 4CONT1 and 4CONT2 at the upper bottom of the trapezoid, the relationship among those is symmetrical about a point around the center point of the data line D provided on the storage capacitor electrode CS2. Such layout of the transistor and that of data line D minimize the layout area, and thus the aperture ratio of the pixel is increased.

A light blocking layer and a color filter may be arranged at the TFT-substrate-2a side. This improves the overlapping precision, so that the width of the light blocking layer can be reduced and the aperture ratio can be increased. Moreover, by reducing the width of the light blocking layer covering the gate line G, 3D moire can be reduced, and thus the display quality can be improved.

Figure 9:
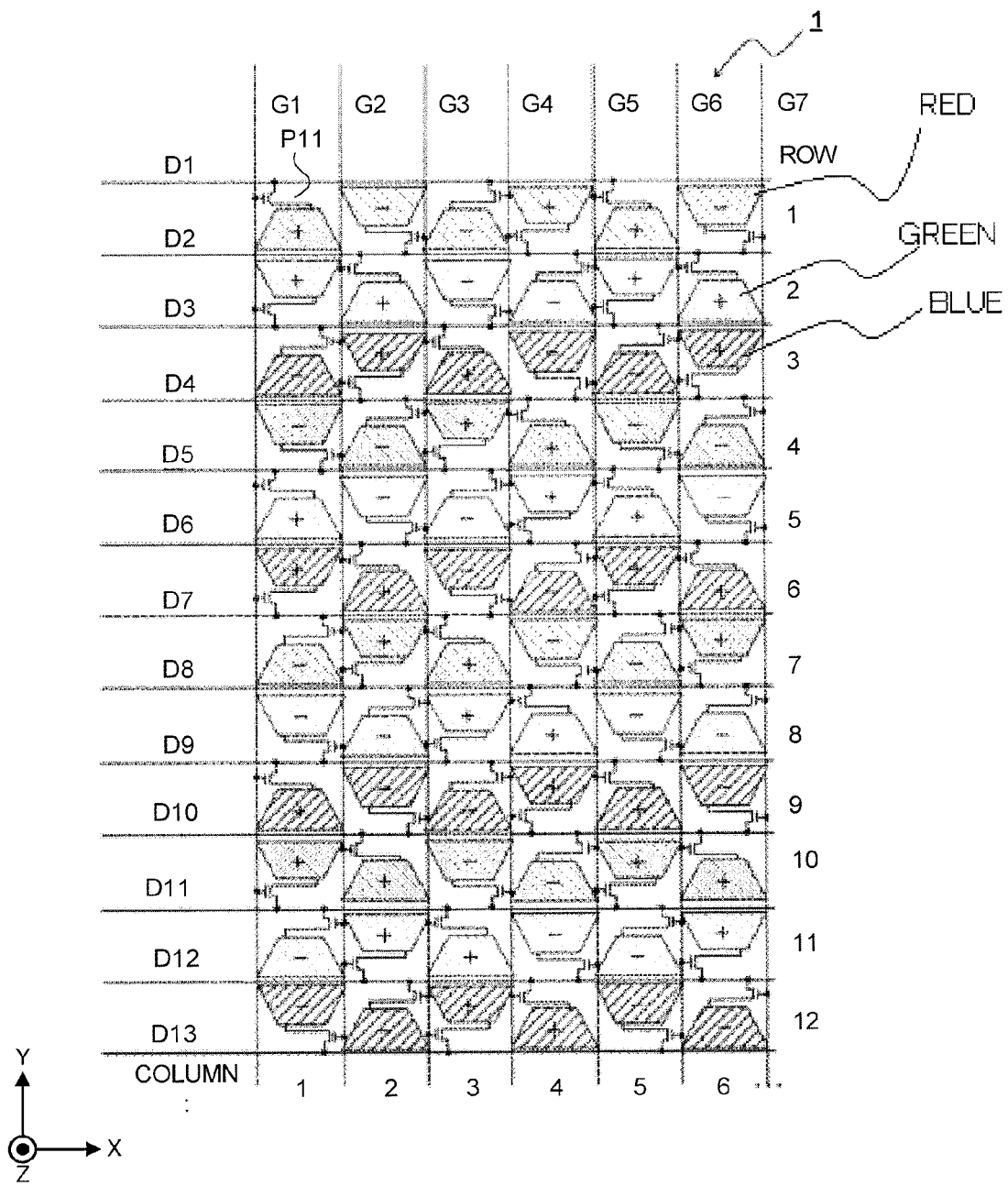
FIG. 9 is an exemplary diagram showing polarities of respective pixels (pixel electrodes) in the image display device according to the first exemplary embodiment of the present invention.

Next, a driving method of the image display device 1 employing the above-explained configuration according to the present exemplary embodiment, i.e., a display operation will be explained. FIG. 9 is a plan view showing polarities of respective pixels in the image display device 1 of the present exemplary embodiment. In the present exemplary embodiment, the image display device 1 is driven through a dot inversion driving. As shown in FIG. 10, the dot inversion driving is a driving technique that causes the polarity of display data transmitted for each data line to be inverted relative to a reference potential, causes the polarity of display data transmitted through each data line for each gate line to be inverted, and causes the polarity of display data to be inverted for each frame. The dot inversion driving is called a 1H1V inversion driving. This is because the polarity is inverted for each data line arranged in a horizontal direction (an H direction) and for each gate line arranged in a vertical direction (a V direction).

The explanation will be given in detail with reference to FIG. 9 which shows the polarities of respective pixels realized in a frame as a result of a dot inversion driving. First, when the gate line G1 is selected, display data with a positive polarity is transmitted to the data line D1, and a voltage with a positive polarity is written in the pixel P11. Moreover, display data with a negative polarity is transmitted to the data line D2. Likewise, pieces of display data with a positive polarity are transmitted to the data lines D3, D5, D7, D9, D11, and D13, respectively, and pieces of display data with a negative polarity are transmitted to the data lines D4, D6, D8, D10, and D12, respectively. Next, when the gate line G2 is selected, respective polarities of all data lines are inverted. That is, pieces of display data with a negative polarity are transmitted to the data lines D1, D3, D5, D7, D9, D11, and D13, respectively, and pieces of display data with a positive polarity are transmitted to the data lines D2, D4, D6, D8, D10, and D12, respectively. Likewise, when the gate lines G3, G5, and G7 are selected, respectively, the same state is applied like when the gate line G1 is selected, and when the gate line G4 is selected, the same state is applied like when the gate line G2 is selected. When this frame ends, in the next frame, polarity inversion is further performed. That is, when the gate lines G1, G3, G5, and G7 are selected, respectively, pieces of display data with a negative polarity are transmitted to the data lines D1, D3, D5, D7, D9, D11, and D13, respectively, and pieces of display data with a positive polarity are transmitted to the data lines D2, D4, D6, D8, D10, and D12, respectively. Moreover, when the gate lines G2, G4, and G6 are selected, respectively, pieces of display data with a positive polarity are transmitted to the data lines D1, D3, D5, D7, D9, D11, and D13, respectively, and pieces of display data with a negative polarity are transmitted to the data lines D2, D4, D6, D8, D10, and D12, respectively.

As shown in FIG. 9, a pixel group configured by the right-eye pixels 4R has a polarity distribution that brings about a two-line dot inversion (2H1V dot inversion) effect. The same is true of a pixel group configured by the left-eye pixels 4L. Hence, the polarity distribution of an image visually recognized by one eye is viewed as if the polarity is inverted for each two data lines arranged in the horizontal direction (the H direction) or for each gate line arranged in the vertical direction (the V direction).

The basic sets of the polarity distribution according to the present exemplary embodiment are four pixels in the X axis direction and four pixels in the Y axis direction, a total of 16 pixels.

In the present exemplary embodiment, when display data is written in each pixel, a potential change in the storage capacitor line CS can be suppressed. This is because the storage capacitor electrode CS2 common to the adjoining pixel pairs 4PAIR and 4PAIR2 is connected to not only a pixel where the display data with a positive polarity is written during successive two gate selection cycles but also a pixel where the display data with a negative polarity is written. Hence, it is possible to suppress a fluctuation of the potential of the storage capacitor line CS toward a polarity at one side, and crosstalk occurring in the direction in which the storage capacitor line CS runs is reduced, thereby accomplishing a high-quality display. The configuration of the present exemplary embodiment accomplishes a two-line dot inversion effect and the potential-fluctuation suppression effect of each storage capacitor line CS through a general dot inversion driving, and causes respective polarities of pixels having trapezoidal apertures adjoining at respective bottom sides to be same. Accordingly, a high-quality display is enabled at a low cost.

An example of the reference potential in the dot inversion driving is the potential of the common electrode to the pixel electrode 4PIX. In a precise sense, however, a DC offset is applied to the common electrode potential in order to reduce the effect of the feed-through by the thin-film transistor, and is different from the reference potential.

Figure 11:
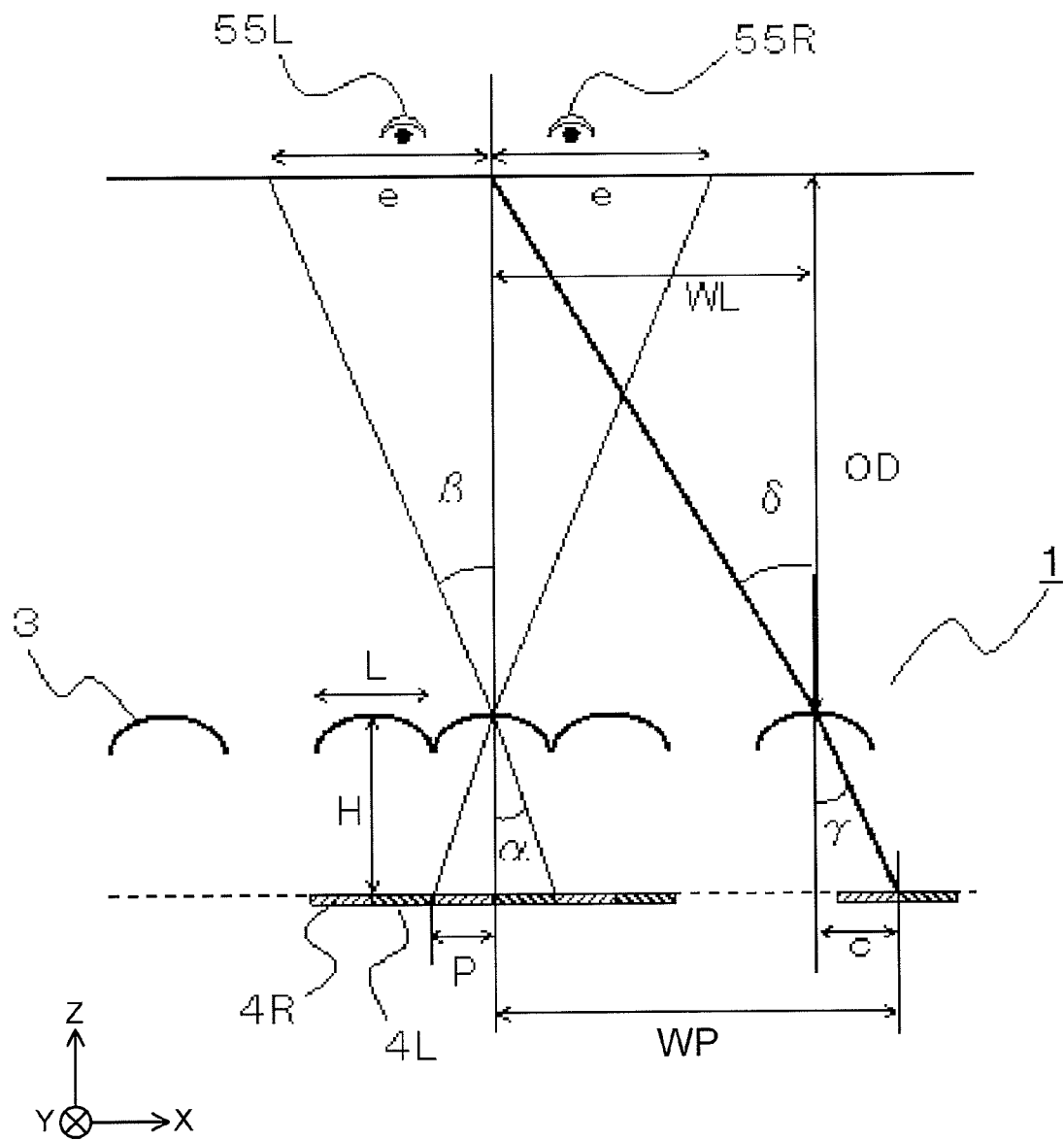
FIG. 11 is a cross-sectional view showing an optical model when a lenticular lens is used.

A detailed explanation will be given of a condition in which the lenticular lens 3 serves as image distributing unit. In the present exemplary embodiment, it is necessary for the image distributing unit to distribute light emitted from respective pixels into different directions along a first direction in which the left-eye pixels 4L and the right-eye pixels 4R are arranged, i.e., the X axis direction. Accordingly, an explanation will be given of a case in which the image distributing effect is maximized with reference to FIG. 11 at first.

It is presumed that a distance between the principal point of the lenticular lens 3, i.e., the vertex thereof and a pixel is H, the refractive index of the lenticular lens 3 is n, and the lens pitch is L. That is, in the present exemplary embodiment, a pitch Px of each left-eye pixel 4L or the right-eye pixel 4R in the X axis direction is P. The arrangement pitch Pu of the unit of display that is each left-eye pixel 4L or right-eye pixel 4R in the image separating direction is 2P.

Moreover, it is presumed that a distance between the lenticular lens 3 and the viewer is an optimum viewing distance OD, and the period of an enlarged projection image of an image in the optimum viewing distance OD, i.e., respective cycles of the widths of the projection images by the left-eye pixel 4L and the right-eye pixel 4R on a virtual plane parallel to the lens and distant from the lens by the optimum viewing distance OD are e. Furthermore, it is presumed that a distance from the center of the cylindrical lens 3a located at the center of the lenticular lens 3 to the center of the cylindrical lens 3a located at an end of the lenticular lens 3 in the X axis direction is WL, and a distance between the center of the unit of display that is the left-eye pixel 4L or the right-eye pixel 4R located at the center of the display panel 2 and the center of the unit of display located at an end of the display panel 2 in the X axis direction is WP. Furthermore, it is presumed that a light incident angle and a light outgoing angle of the cylindrical lens 3a located at the center of the lenticular lens 3 are $\alpha$ and $\beta$, respectively, and a light incident angle and a light outgoing angle of the cylindrical lens 3a located at an end of the lenticular lens 3 in the X axis direction are $\gamma$ and $\delta$, respectively. Still further, it is presumed that a difference between the distance WL and the distance WP is C and the number of sub pixels included in a region with the distance WP is 2m.

The arrangement pitch L of the cylindrical lenses 3a and the arrangement pitch Pu of the sub pixels relate to each other, so that either one of the pitches is set in accordance with another pitch. In general, the lenticular lens 3 is often designed in accordance with the display panel, the arrangement pitch P of the pixels is taken as a constant. Moreover, the refractive index n is set by selecting the material of the lenticular lens 3. In contrast, the optimum viewing distance OD between the lens and the viewer and the period e of the pixel enlarged projection image in the optimum viewing distance OD are set to be desirable values. Based on those values, a distance H between the vertex of the lens and the pixel and a lens pitch L are set. Following formulae are satisfied based on the Snell's law and a geometric relationship.

$$n \times \sin \alpha = \sin \beta \quad (11)$$

$$OD \times \tan \beta = e \quad (12)$$

$$H \times \tan \alpha = P \quad (13)$$

$$n \times \sin \gamma = \sin \delta \quad (14)$$

$$H \times \tan \gamma = C \quad (15)$$

$$OD \times \tan \delta = WL \quad (16)$$

$$WP - WL = C \quad (17)$$

$$WP = Pu \times m = 2 \times m \times P \quad (18)$$

$$WL = m \times L \quad (19)$$

An explanation will be given of a case in which the image distributing effect is maximized as explained above. This is a case in which the distance H between the vertex of the lenticular lens 3 and the pixel and a focal distance f of the lenticular lens 3 are set to be same. Hence, a following formula (20) is satisfied. When the curvature radius of the lens is r, the curvature radius r can be obtained from a following formula (21).

$$f = H \quad (20)$$

$$r = H \times (n-1)/n \quad (21)$$

The above-explained parameters are summarized below. That is, the arrangement pitch P of the pixels is set in accordance with the display panel 2, and the optimum viewing distance OD and the period e of the pixel enlarged projection image are set based on the setting of the image display device 1. The refractive index n is set based on the material of the lens, etc. The lens arrangement pitch L and the distance H between the lens and the pixel derived from the above-explained parameters are parameters for setting the position where light from each pixel is projected on a viewing plane. The curvature radius r of the lens is the parameter that changes the image distributing effect. That is, when the distance H between the lens and the pixel is a fixed value, if the curvature radius of lens is changed from an ideal value, right and left images are blurred and it becomes difficult to clearly separate those images. That is, it is appropriate if the range of the curvature radius that makes the separation effective is obtained.

Figure 12:
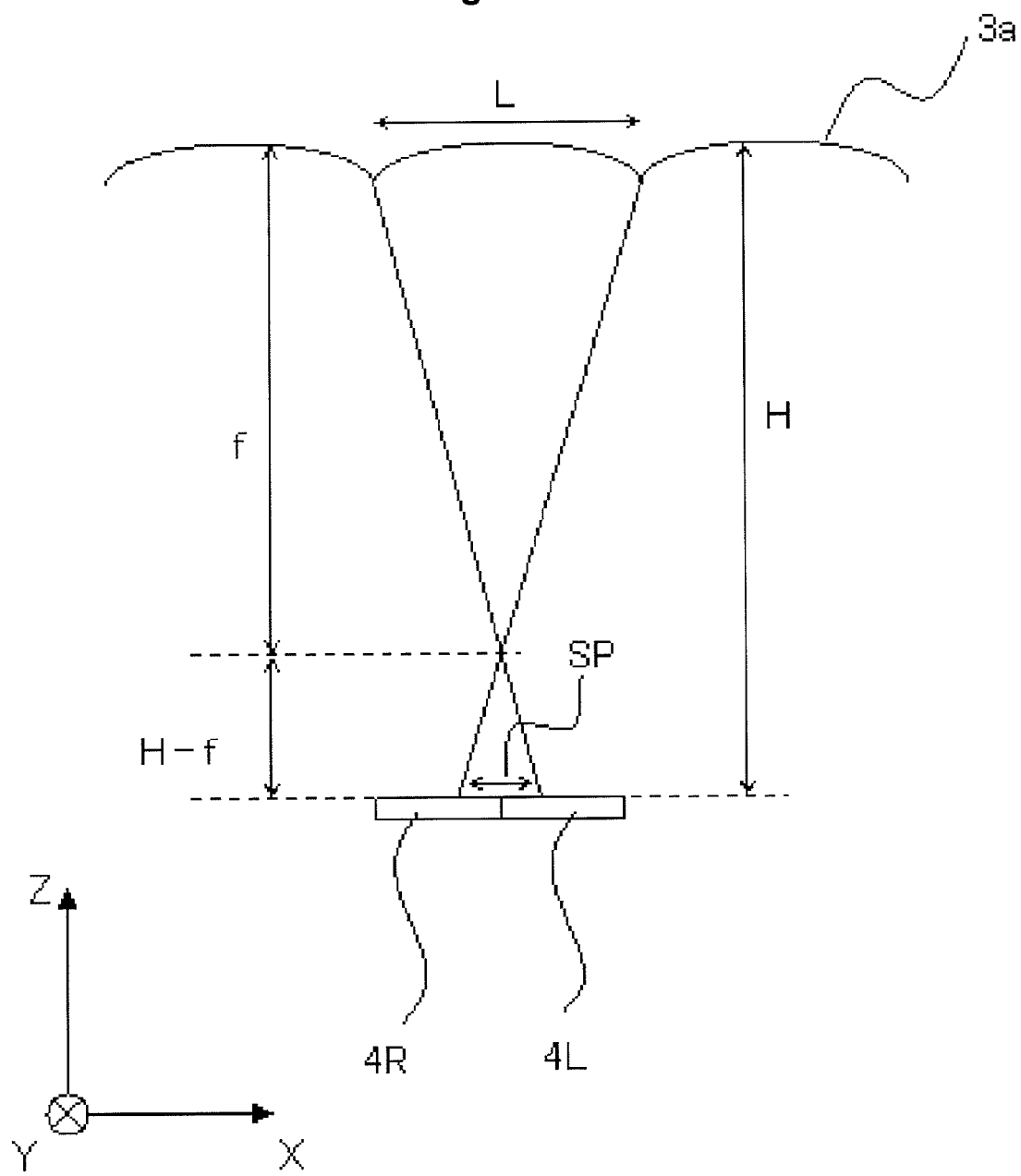
FIG. 12 is an optical model diagram showing a state in which a curvature radius is minimum in order to calculate an image separating condition of the lenticular lens.

First, the minimum value of the curvature radius range is calculated where the separating effect by the lens is effective. As shown in FIG. 12, in order to have the separating effect, a similar relationship should be satisfied between a triangle having the lens pitch L as a bottom side and the focal distance f as a height and a triangle having the sub pixel pitch P as a bottom side and H-f as a height. Hence, a following formula (22) is satisfied and the minimum value fmin of the focal distance can be obtained.

$$f\min = H \times L/(L+P) \quad (22)$$

Next, a curvature radius is calculated based on the focal distance. When the formula (21) is used, a minimum value rmin of the curvature radius can be obtained from a following formula (23).

$$r\min = H \times L \times (n-1)/(L+P)/n \quad (23)$$

Figure 13:
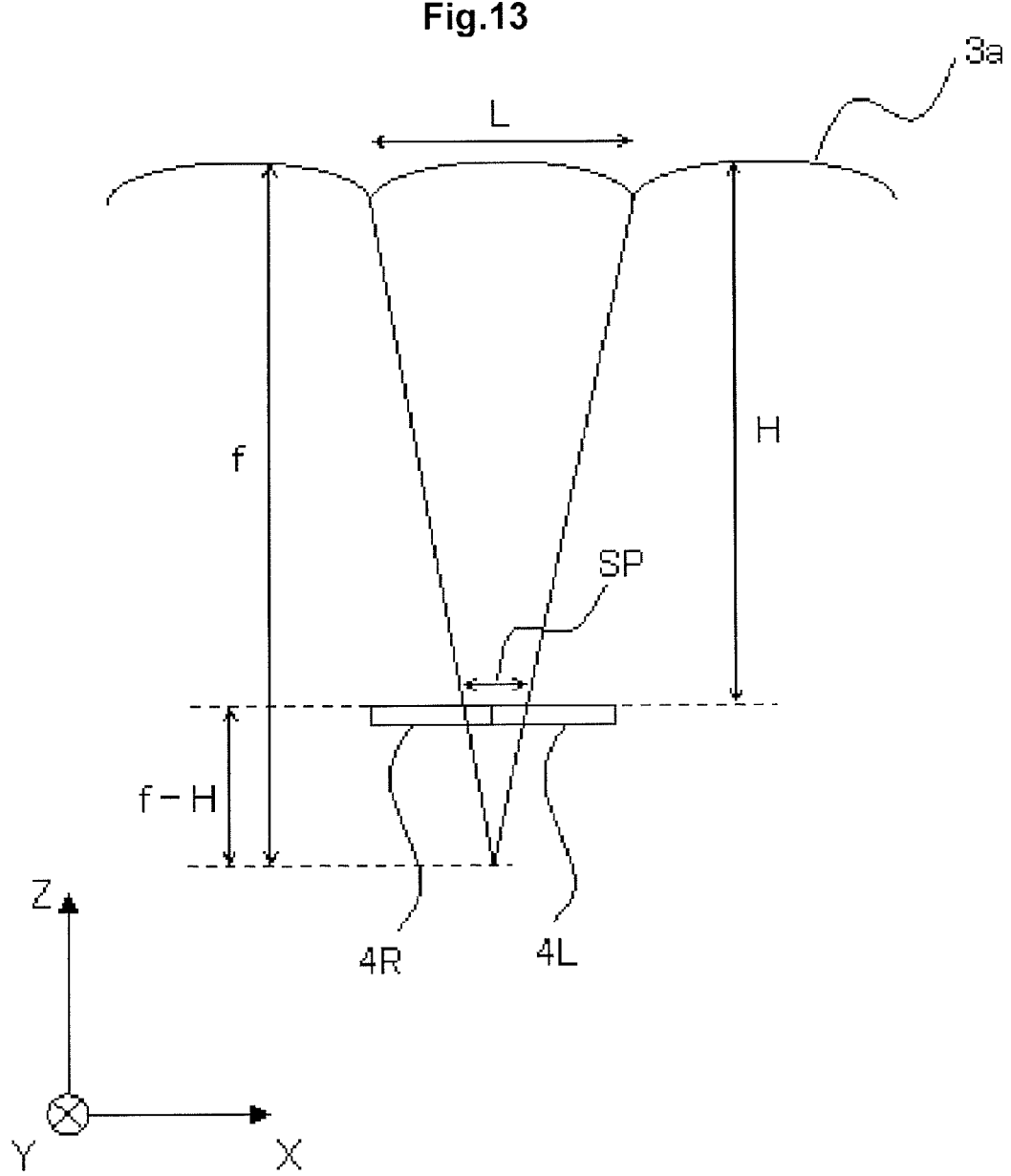
FIG. 13 is an optical model diagram showing a state in which the curvature radius is maximum in order to calculate the image separating condition of the lenticular lens.

Next, the maximum value of the curvature radius is calculated. As shown in FIG. 13, in order to have the separating effect by the lens, a similar relationship should be satisfied between a triangle having the lens pitch L as a bottom side and the focal distance f as a height and a triangle having the sub pixel pitch P as a bottom side and f-H as a height.

Hence, a following formula (24) is satisfied and a maximum value fmax of the focal distance can be obtained.

$$f\max = H \times L/(L-P) \quad (24)$$

Next, a curvature radius is calculated based on the focal distance. When the formula (21) is used, a maximum value rmax of the curvature radius can be obtained from a following formula (25).

$$r\max = H \times L \times (n-1)/(L-P)/n \quad (25)$$

Below is the summary of the above explanation. In order to cause the lens to bring out the image distributing effect, it is necessary that the lens curvature radius should be present within a range indicated by a following formula (26) derived from the formulae (23) and (25).

$$H \times L \times (n-1)/(L+P)/n \leq r \leq H \times L \times (n-1)/(L-P)/n \quad (26)$$

In the above explanation, the two-view-point stereoscopic image display device for a right-eye pixel and a left-eye pixel was explained, but the present invention is not limited to this type of image display device. For example, the present invention can be applied to an image display device for N number of view points. That is, according to the N number view point scheme, the pitch Pu of the unit of display and the sub pixel pitch P satisfy a relationship that is Pu=N×P. In this case, in the definition for the distance WP, the number of pixels included in the region with the distance WP may be changed from 2m to N×m.

According to the above-explained configuration of the present exemplary embodiment, in order to accomplish the further improvement of image quality, it is preferable that the vertical aperture ratio should be completely constant regardless of the position in the horizontal direction (i.e., the X axis direction). However, in particular, in the vicinity of the vertex of the inclined portion of the trapezoidal aperture, it is difficult to make the vertical aperture ratio completely constant because of a forming precision of the light blocking portion, etc. Hence, according to the present exemplary embodiment, as shown in FIGS. 12 and 13, the focal point of the lens is shifted from the pixel surface in order to reduce the effect originating from the forming precision of the light blocking portion, thereby accomplishing the improvement of the image quality.

A technique of setting blurred region by having the focal point of the lens shifted from the pixel surface as explained above, and of improving the image quality is referred to as a "defocus effect" below. Moreover, an effective region which can be blurred, i.e., a defocus width is referred to as a "spot size SP". In the present exemplary embodiment, a defocus width which can be blurred effectively in the image separating direction, i.e., the X axis direction is the spot size SP. The size of the spot size SP is set depending on a distance from the position of the lens focal point, and can be set by adjusting the sheet of lenticular lens and the thickness of the polarization plate 11 of the opposing substrate 2b.

When the width of the inclined side of the trapezoid in the X axis direction is WX1, as shown in FIG. 5, WX1=W1/sin φ1 is satisfied, and a length from the intersection between the inclined side of the trapezoidal aperture and the upper bottom thereof to the intersection between the inclined side and the lower bottom in the X axis direction is 2×X2.

It is preferable that the spot size SP when the focal point of the lens is shifted from the pixel surface should be within a range from equal to or larger than WX1 to equal to or smaller than 2×X2. When the spot size SP is WX1, it is the limit that can make the inclined region of the trapezoidal aperture compositely blurred, and it is preferable that the spot size SP should be set to be larger than such a limit. When the spot size is 2×X2, the region that can be blurred can be extended to the intersection between the inclined side of the trapezoidal aperture and the upper bottom thereof, and to the intersection between the inclined side and the lower bottom. However, if the region to be blurred is enlarged further, the separating performance of the lens decreases. Hence, when the separating performance of the lens is designed preferentially, it is preferable that the lens curvature factor should be within a range where a following formula (27) or (28) is satisfied.

$$H \times L \times (n-1)/(L+2 \times X2)/n \leq r \leq H \times L \times (n-1)/(L+WX2)/n \quad (27)$$

$$H \times L \times (n-1)/(L-WX2)/n \leq r \leq H \times L \times (n-1)/(L-2 \times X2)/n \quad (28)$$

In the present exemplary embodiment, when the width of the inclined storage capacitor line CS in the X axis direction is WX2, as shown in FIG. 5, WX2=W2/sinθ1 is satisfied. In order to make the intersection between the storage capacitor line CS and the inclined side of the trapezoid compositely blurred, it is preferable that the spot size SP should be within a range from equal to or larger than WX1 and to equal to or smaller than 2×(WX2+X2). When the spot size is WX1, it is the limit that can make the inclined region of the trapezoidal aperture compositely blurred, and it is preferable that the spot size SP should be set to be larger than such a limit. When the spot size is 2×(WX2+X2), the region that can be blurred can be extended to the intersection between the storage capacitor line CS and the light blocking portion. Accordingly, the effect originating from the forming precision of the storage capacitor line CS is reduced in order to accomplish the improvement of the image quality. It is especially effective when the effect originating from the forming precision of the storage capacitor line CS to the image quality is large. However, if the blurring level increases more, the level of 3D crosstalk increases and it is not preferable. Hence, it is preferable to set the lens curvature to be within a range where a following formula (29) or (30) is satisfied.

$$H \times L \times (n-1)/(L+2 \times WX2+2 \times X2)/n \leq r \leq H \times L \times (n-1)/(L+WX1)/n \quad (29)$$

$$H \times L \times (n-1)/(L-WX1)/n \leq r \leq H \times L \times (n-1)/(L-2 \times WX2-2 \times X2)/n \quad (30)$$

Next, a detailed explanation will be given of the effect of the pixel structure and that of the lens according to the present exemplary embodiment.

First, an explanation will be given of a definition of 3D moire in the present specification with reference to a graph. FIG. 14 is a graph showing a brightness distribution of the image display device 1 according to the present exemplary embodiment. A viewing position X in the horizontal direction indicates an angle of an image separating direction, and a direction vertical to a display plane, i.e., +Z axis direction is set to be 0. A brightness Y in the 30 vertical direction indicates a relative brightness when the maximum value in the brightness distribution in the angular direction is 1.

The −X side of the viewer position is a brightness distribution corresponding to an image output to the right-eye side, and the +X side is a brightness distribution corresponding to an image output to the left-eye side. A dotted line indicates a brightness distribution when an image is output by only one pixel between the right-eye pixel 4R and the left-eye pixel 4L, and a thick line indicates a brightness distribution when images are displayed by both pixels. Hence, the total of brightness distributions corresponding to respective view points indicated by the dotted line is equal to the brightness distribution indicated by the thick line.

The pixels according to the present exemplary embodiment are designed so that the vertical aperture ratio in the image separating direction becomes substantially constant, but the vertical aperture ratio does not completely become constant because of the forming precision through a TFT producing process and a panel producing process, and the brightness may vary locally relative to the viewer position X. In particular, when the overlapping of the TFT substrate 2a and the opposing substrate 2b is largely misaligned in the Y axis direction, the brightness is likely to vary which is affected by the black matrix 60 that blocks light through the gate line G. As shown in FIG. 14, a brightness fluctuation generated in the vicinity of (X0, Y0) is generated due to the light blocking portion of the gate line G, and brightness fluctuation in the vicinity of (XR2, YR2) and (XL2, YL2) is generated due to the storage capacitor line CS. Such brightness fluctuation is called 3D moire, and in the present specification, is defined as follows.

$$YC=(YL1+YR1)/2 \quad (31)$$

$$\Delta YC=(YC-Y0)/YC \quad (32)$$

$$\Delta YC/\Delta XC=\Delta YC/(XR1-XL1) \quad (33)$$

$$YL=(YL1+YL3)/2 \quad (34)$$

$$\Delta YL=(YL-YL2)/YL \quad (35)$$

$$\Delta YL/\Delta XL=\Delta YR/(XL1-XL3) \quad (36)$$

$$YR=(YR1+YR3)/2 \quad (37)$$

$$\Delta YR=(YR-YR2)/YR \quad (38)$$

$$\Delta YR/\Delta XR=\Delta YR/(XR3-XR1) \quad (39)$$

$$\Delta Ys=(\Delta YL+\Delta YR)/2 \quad (40)$$

$$\Delta Ys/\Delta Xs=(\Delta YL/\Delta XL+\Delta YR/\Delta XR)/2 \quad (41)$$

As shown in FIG. 14, a visually recognizable range eR of the right eye and a visually recognizable range eL of the left eye are defined as follows.

$$eR=XR4 \quad (42)$$

$$eL=-XL4 \quad (43)$$

Moreover, a following relationship is satisfied from FIG. 5.

$$(XR3-XR1):(XL1-XR1)=X1:2\times X2 \quad (44)$$

FIG. 15 is a table showing an evaluation result for the image display device 1. As shown in FIG. 15, the inventor of the present invention made samples with pixels having an inclination angle θ1 of the storage capacitor line CS set to be 30 degrees, 45 degrees, 60 degrees, and 90 degrees, respectively, and evaluated the optical characteristic of 3D moire at each pixel. As shown in FIG. 15, the inventor of the present invention found that if it is within a predetermined range of the brightness volatility, a stereoscopic image can be provided to a viewer without causing the viewer to feel strangeness from the test result. This will be explained in more detail below.

In the evaluation samples made on trial, the inclination angles φ1 and φ'1 of the gate lines G and the width W1 of the gate light blocking portion were constant. The storage capacitor lines CS were arranged so as to traverse the apertures of the sub pixels, and the inclination angle thereof was changed so that the storage capacitor lines CS passed through the center of the substantially trapezoidal apertures while the width W2 of the storage capacitor line CS being maintained at constant. Hence, the aperture ratio changed depending on the inclination angle θ1, and the aperture ratio became maximum at θ1=90 degrees.

Figure 16:
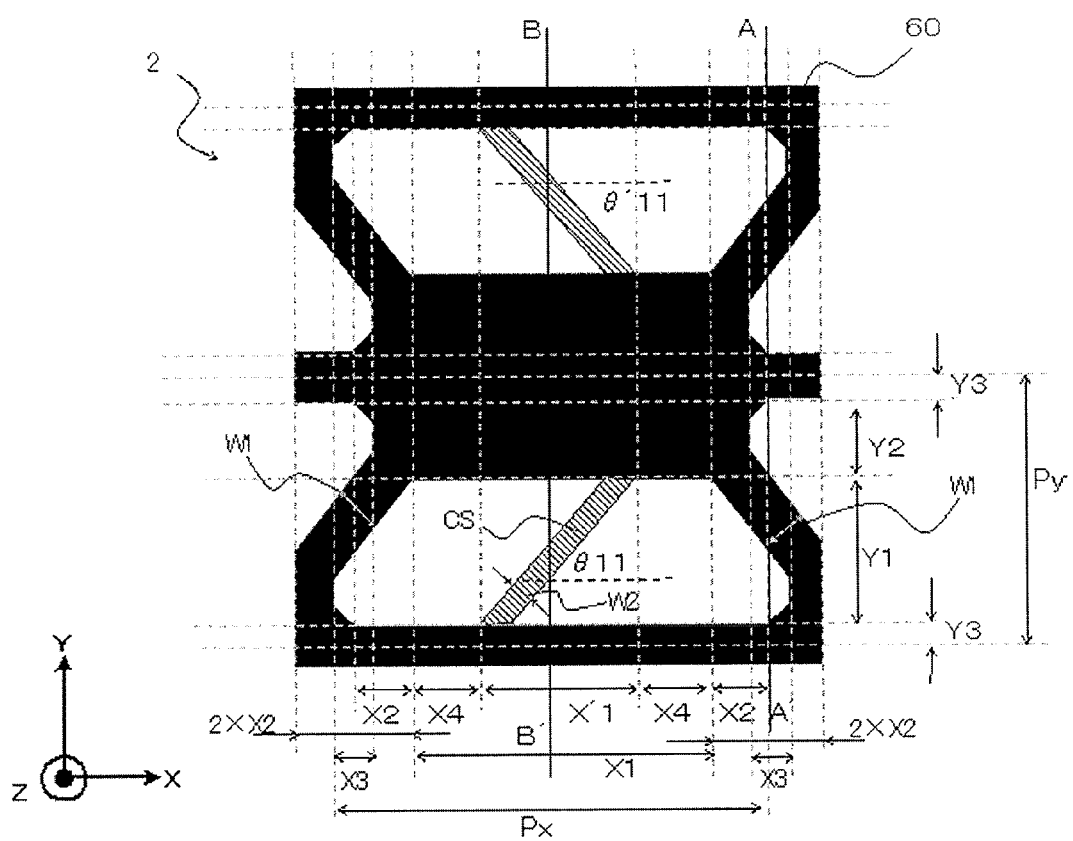
FIG. 16 is a plan view showing a pixel when the angle of a storage capacitor line of a display panel according to the first exemplary embodiment of the present invention is large.

FIG. 16 is a plan view exemplarily showing a pixel when the angle of the storage capacitor line CS is large. As shown in FIG. 16, an angle between the storage capacitor line CS and the image separating direction is |θ11|>|θ1|. When θ11 becomes larger than θ1 the intersection between the storage capacitor line CS and the light blocking portion becomes apart from the intersection between the inclined portion of the substantially trapezoidal pixel and the upper bottom, so that a region X'1 becomes small. Conversely, a region X4 where no inclined storage capacitor line CS is present is formed. Note that X1=X'1+2×X4. The vertical aperture ratio becomes maximum at the region X4. Because the width W2 of the storage capacitor line CS is constant, the larger θ11 becomes, the larger the size of the vertical aperture becomes, and the vertical aperture ratio of the storage capacitor line CS largely decreases. Hence, the vertical aperture ratio at the region X4 and the vertical aperture ratio at the region X'1 become inconstant, and the brightness distribution fluctuates depending on the difference in the vertical aperture ratio. A subjective evaluation was made for a brightness fluctuation generated due to the difference in the vertical aperture ratio.

Regarding the fluctuation of the vertical aperture ratio in the X axis direction from the pixel layout shown in FIGS. 5 and 16, the vertical aperture ratio becomes the minimum value in the line A-A' and the line B-B'. As shown in FIG. 14, inflection points (XL2, YL2) and (XR2, YR4) that are the minimum values in the brightness distribution correspond to the minimum value of the vertical aperture ratio in the line A-A' and the line B-B'. Moreover, as shown in FIG. 16, the width Y1 of the aperture in the region X4 in the Y axis direction is the maximum value of the size of the vertical aperture, and an inflection point where the brightness in the graph shown in FIG. 14 becomes maximum corresponds to the size of Yl. Accordingly, with reference to Y1 where the size of the vertical aperture becomes maximum, the size of the vertical aperture in the line A-A' and the line B-B' will be discussed. From FIG. 5, a volatility YA relative to Y1 of the vertical aperture in the line A-A' can be expressed as a following formula.

$$YA=(Y1+Y2-W1/\cos \phi)/Y1 \text{ (where } \phi=|11|=|\phi2|) \quad (45)$$

From FIG. 5, a volatility YB relative to Y1 of the vertical aperture in the line B-B' can be expressed by a following formula.

$$YB=(Y1-W2/\cos \theta)/Y1 \text{ (where } \theta=|\theta1|=|\theta2|) \quad (46)$$

From FIG. 15, the fluctuation of the vertical aperture ratio in the X axis direction is designed so as to be equal to or smaller than 35%, and desirably, equal to or smaller than 25%. In this case, following relational expressions are satisfied.

$$0.75<(Y1+Y2-W1/\cos \phi)/Y1<1.25 \quad (47)$$

$$0.75<(Y1-W2/\cos \theta)/Y1<1.25 \quad (48)$$

When 3D moire is 25% or so through the subjective evaluation shown in FIG. 15, a stereoscopic display can be viewed without a strangeness of 3D moire, so that the aperture ratio can be improved while maintaining the display quality by increasing the inclination angle of the storage capacitor line CS like the pixel shown in FIG. 16. When, however, the inclination angle θ is 90 degrees, 3D moire is likely to be visually recognized because the brightness distribution keenly varies, resulting in the deterioration of the display quality. Hence, it is necessary that the inclination angle θ1 of the storage capacitor line CS is an angle smaller than at least 90 degrees.

Moreover, regarding the pixel of the present exemplary embodiment, it is desirable that the width in the Y direction of the aperture shape of the substantially trapezoidal pixel should satisfy a following condition: (Y2+2×Y3)>Y1 in order to secure the desired aperture ratio and to meet the restriction of a forming process. At this time, because the aspect ratio of the sub pixel according to the present exemplary embodiment is Px:Py=3:2, it is necessary that the inclination angle is equal to or larger than 18.4 degrees constitutionally. Hence, it is desirable that the inclination angle of the storage capacitor line CS should be equal to or larger than 18.4 degrees but equal to or smaller than 60 degrees in consideration of the result of the subjective evaluation.

Furthermore, when the fluctuation of the vertical aperture ratio over the layout is equal to or larger than 20%, 3D moire can be reduced to substantially half because of the defocus effect, and the display quality can be improved. Hence, the restriction over the design can be relieved due to the defocus effect, and it is appropriate if the fluctuation of the vertical aperture ratio over the pixel layout should be equal to or less than 40% in consideration of the defocus effect. Accordingly, following relational expressions are satisfied.

$$0.6<(Y1-W2/\cos \theta)/Y1<1.4 \quad (49)$$

$$0.6<(Y1+Y2-W1/\cos \phi-W3)/Y1<1.4 \quad (50)$$

Moreover, when a stereoscopic image is viewed within the optimized viewing range, 3D moire generated at the center of a right-eye viewing range eR and the center of a left-eye viewing range eL is not likely to be got attention to unlike 3D moire generated with the center of both eyes (X0, Y0) being as a minimum value, so that it is desirable to set ΔYs to be smaller than ΔYc.

Moreover, it is desirable that a condition ΔYc/ΔXc>ΔYs/ΔXs should be satisfied in order to make 3D moire unnoticeable by maintaining the volatility of the brightness distribution gradual.

<Modified Example of First Exemplary Embodiment>

Next, an explanation will be given of a first modified example of the first exemplary embodiment.

Figure 17:
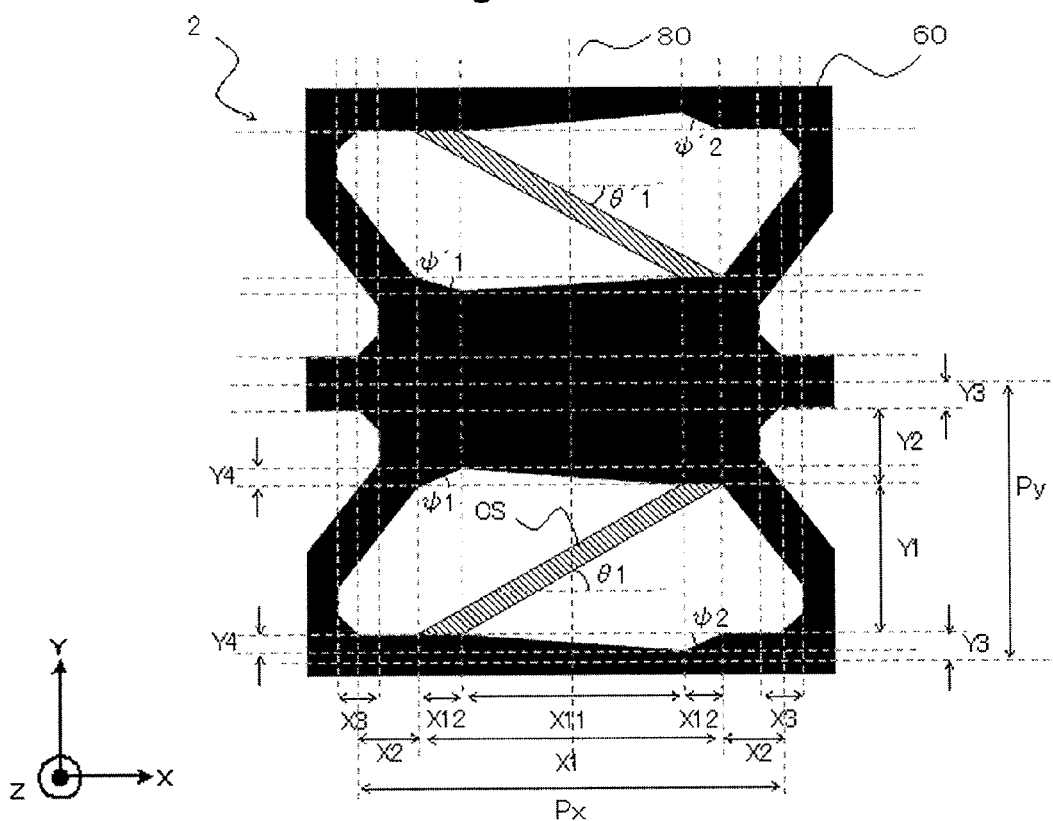
FIG. 17 is a plan view showing a pixel of a display panel according to a first modified example of the first exemplary embodiment of the present invention.

FIG. 17 is a plan view of a display panel 2 according to a first modified example of the first exemplary embodiment. As shown in FIG. 17, a storage capacitor line CS is arranged so as to traverse a pixel aperture, and an end of a black matrix 60 is inclined from the image separating direction at a location where the black matrix 60 contacts the storage capacitor line CS. The inclination angle of the black matrix 60 at a region X12 satisfies a condition in which |θ1|=|φ1|=|φ'1|=|φ2|=|φ'2|. Hence, the vertical aperture ratio in the X axis direction is made constant at a region X1, so that 3D moire originating from the storage capacitor line CS can be reduced.

The configuration and the operation other than the above-explained configuration and operation are same as those of the first exemplary embodiment.

Next, an explanation will be given of a second modified example of the first exemplary embodiment.

Figure 18:
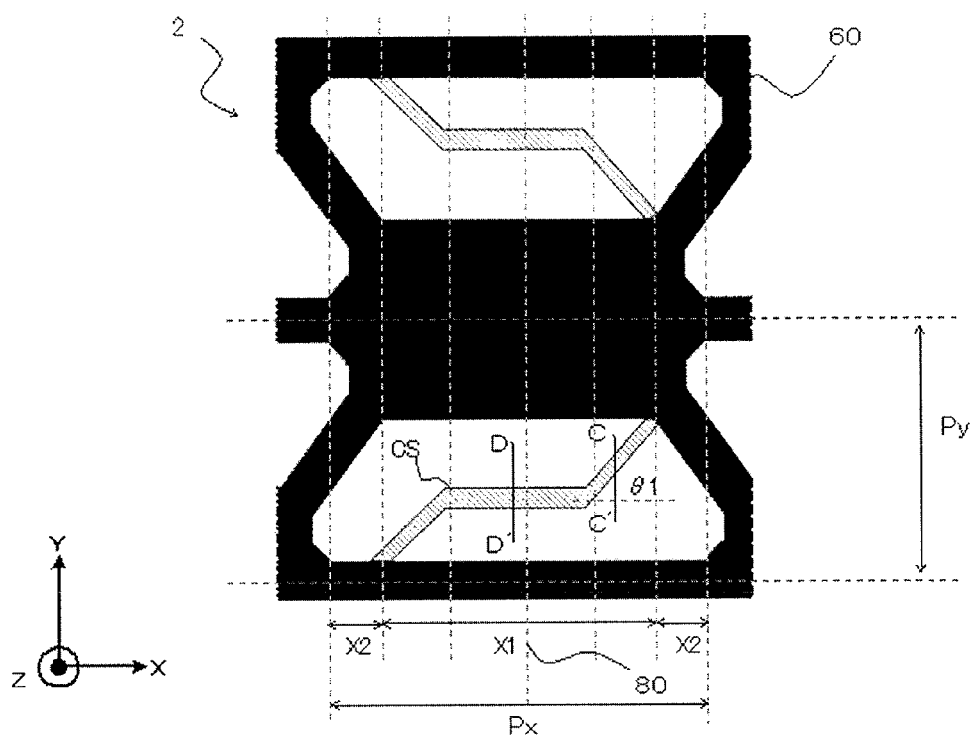
FIG. 18 is a plan view showing a pixel of a display panel according to a second modified example of the first exemplary embodiment of the present invention.

FIG. 18 is a plan view of a display panel 2 according to a second modified example of the first exemplary embodiment. As shown in FIG. 18, a storage capacitor line CS is arranged so as to traverse a pixel aperture, and is bent at the aperture. Moreover, the width of the inclined portion of the storage capacitor line CS in the Y axis direction along a line C-C' and the width of the storage capacitor line CS in the Y axis direction along a line D-D' are equal to each other, and a vertical aperture is substantially constant in the X axis direction.

The configuration and operation other than the above-explained configuration and operation are same as those of the first exemplary embodiment.

Next, a third modified example of the first exemplary embodiment will be explained.

Figure 19:
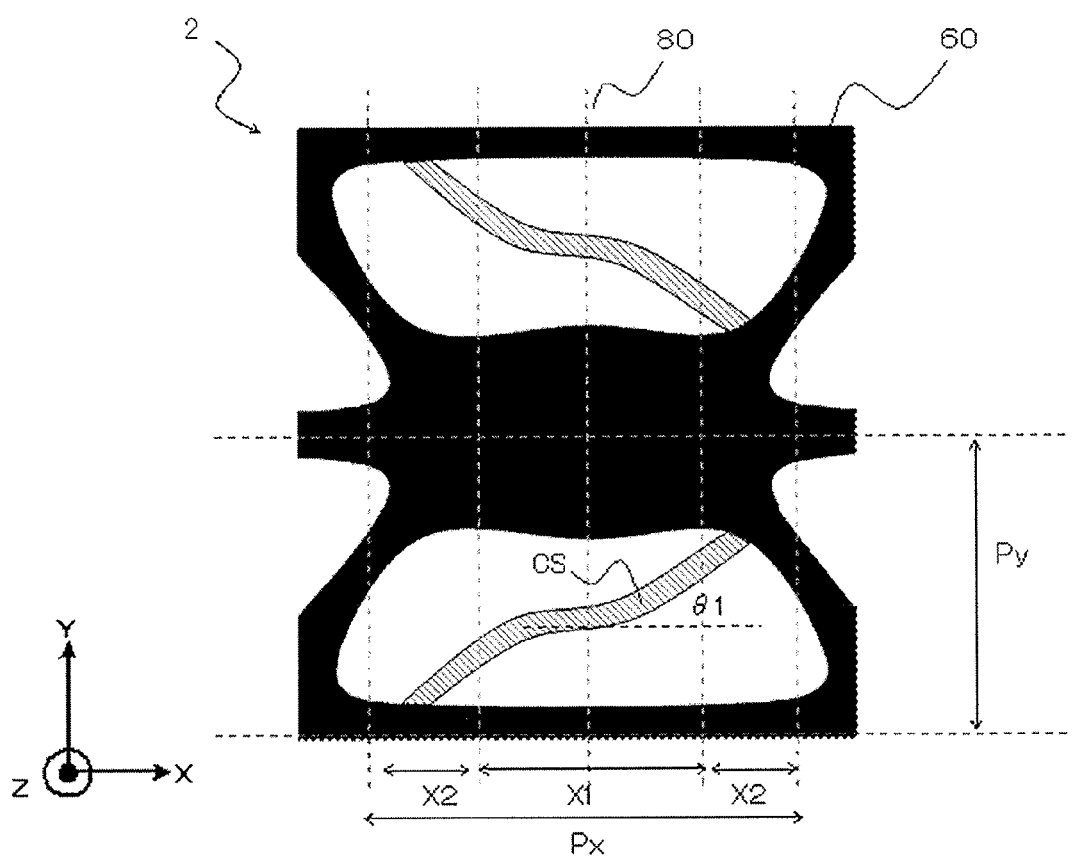
FIG. 19 is a plan view showing a pixel of a display panel according to a third modified example of the first exemplary embodiment of the present invention.

FIG. 19 is a plan view of a display panel 2 according to a third modified example of the first exemplary embodiment. As shown in FIG. 19, a storage capacitor line CS traverses a pixel aperture while successively changing an angle θ1 between the storage capacitor line CS and the image separation direction relative to the X axis direction. The storage capacitor line CS at least partially has a region that has a curvature. An aperture of a black matrix 60 has edges which have a curvature and which gradually curve and deform, thereby configuring an aperture of a substantially trapezoidal pixel. The fluctuation of the vertical aperture ratio gradually changes in accordance with the curvature, so that the fluctuation of the brightness distribution can be reduced. Accordingly, 3D moire is not likely to be visually recognized.

The configuration and operation other than the above-explained configuration and operation are same as those of the first exemplary embodiment.

Next, a fourth modified example of the first exemplary embodiment will be explained.

Figure 20:
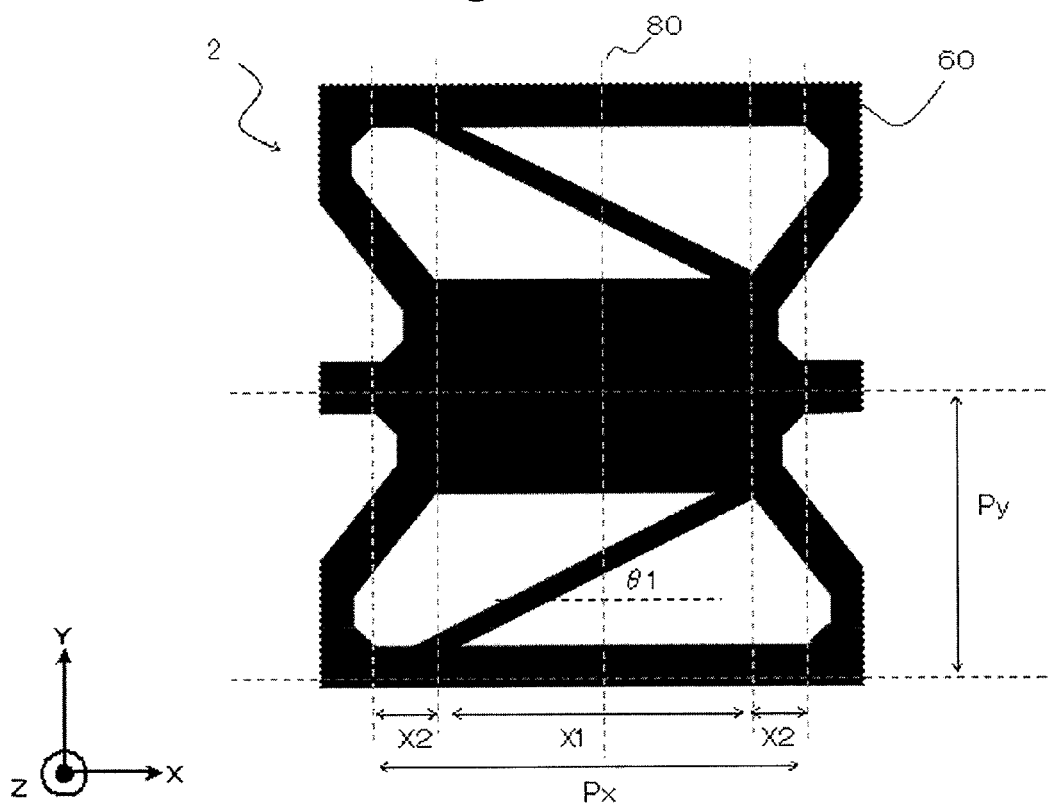
FIG. 20 is a plan view showing a pixel of a display panel according to a fourth modified example of the first exemplary embodiment of the present invention.

FIG. 20 is a plan view of a display panel 2 according to a fourth modified example of the first exemplary embodiment. As shown in FIG. 20, at least a part of a storage capacitor line CS traversing an aperture is covered by a black matrix 60. The black matrix 60 is provided at an opposing-substrate-2b side. Hence, reflection of incident light into the panel can be reduced, so that the visibility at a bright location like the exterior of a home can be improved.

The configuration and operation other than the above-explained configuration and operation are same as those of the first exemplary embodiment.

In the present exemplary embodiment, in order to facilitate understanding, the number of gate lines G and that of the data lines D are limited to the number at least necessary for explanation. However, the present invention is not limited to such number, and the numbers of those lines are not essential to the present invention.

In the present exemplary embodiment, the pixel thin-film transistor 4TFT becomes conductive between the source electrode and the drain electrode when the potential at the gate electrode becomes a low level relative to the potential of the source electrode or the drain electrode. Conversely, a so-called NMOS thin-film transistor may be used which becomes conductive when the potential at the gate electrode becomes a high level relative to the potential of the source electrode or the drain electrode.

In the present exemplary embodiment, the contact holes 4CONT1 and 4CONT2 of the pixel are arranged and shifted from the center of the pixel in the X axis direction. The view point of the viewer is very likely to arrange in the vicinity of the center of the pixel when enlarged projection is performed on the viewing plane by the image separating unit like the lens. When the contact holes 4CONT1 and 4CONT2 are arranged in the vicinity of the center of the pixel, the orientation of liquid crystal molecules are disturbed which may negatively affect a display operation. Accordingly, if the contact holes 4CONT1 and 4CONT2 are arranged in the vicinity of the center of the pixel, the display quality may be deteriorated at a location best for a viewing. Hence, like the present exemplary embodiment, by arranging the contact holes 4CONT1 and 4CONT2 so as to be shifted from the proximity of the center of the pixel, the improvement of the display quality is enabled. Moreover, when respective pixels configuring the adjoining pixel pair are arranged so as to be symmetrical about a point, it is possible to prevent respective X axis coordinates of the contact holes 4CONT1 and 4CONT2 from being coincident with each other. This prevents the plurality of contact holes 4CONT1 and 4CONT2 from having respective effects at the same location on the viewing plane redundantly, thereby improving the image quality.

In the present exemplary embodiment, the explanation was given of the case in which respective pixels of each of the adjoining pixel pairs 4PAIR and 4PAIR2 are arranged so as to be symmetrical about a point. This means that respective positions of the pixel thin-film transistors 4TFT of respective pixels configuring the adjoining pixel pairs 4PAIR and 4PAIR2 are symmetrical relative to the center line in the X axis direction of the adjoining pixel pairs 4PAIR and 4PAIR2. The present invention is not limited to this configuration, and for example, respective positions of the thin-film transistors 4TFT of respective pixels of the adjoining pixel pairs may be asymmetrical in the X axis direction. This allows respective pixels to have a change in the position of the thin-film transistor, so that the plurality of thin-film transistors are prevented from having redundant effects at the same position on the viewing plane, thereby improving the image quality.

In the present exemplary embodiment, the explanation was given of the case in which the light blocking layer that covers the pixel other than the aperture thereof may be formed inwardly of the opposing substrate 2b. The light blocking layer may cover a part of the aperture of the pixel, and an aperture formed by the light blocking layer and the aperture of the pixel may be in a similar shape. Moreover, the aperture formed by the light blocking layer may be smaller than the aperture of the pixel. This suppresses a change in the aperture shape even if the TFT substrate 2a and the opposing substrate 2b are misaligned, thereby improving the image quality.

The connection relationship among the gate line G, the data line D and the pixel in the present exemplary embodiment can be expressed as follows. That is, a pixel row sandwiched between any two of the plurality of data lines D has a pixel connected to one data line D through a pixel switch and another pixel connected to another data line D through a pixel switch alternately arranged, and a pixel column sandwiched between any two of the plurality of gate lines G has a pixel connected to one gate line D through a pixel switch and another pixel connected to another gate line G through a pixel switch alternately arranged. In order to employ such arrangement, it is preferable that the number of the data lines D arranged should be larger than the number of pixel rows by one. Likewise, it is preferable that the number of gate lines G arranged should be larger than the number of pixel columns by one.

The explanation was given of the case in which the lenticular lens 3 has a lens surface arranged on the +Z direction plane that is the direction toward the user. The present invention is, however, not limited to this configuration, and the lens surface may be arranged on the −Z direction plane that is the direction toward the display panel. In this case, a distance between the lens and the pixel can be reduced, so that this configuration is advantageous for high-definition imaging.

The unit of display may be formed in a square. The expression of forming in a square means that the pitch of the unit of display in the X axis direction is coincident with the pitch thereof in the Y axis direction. In other words, in a direction in which the units of display are repeatedly arranged, the pitch thereof remains same at all.

Figure 21:
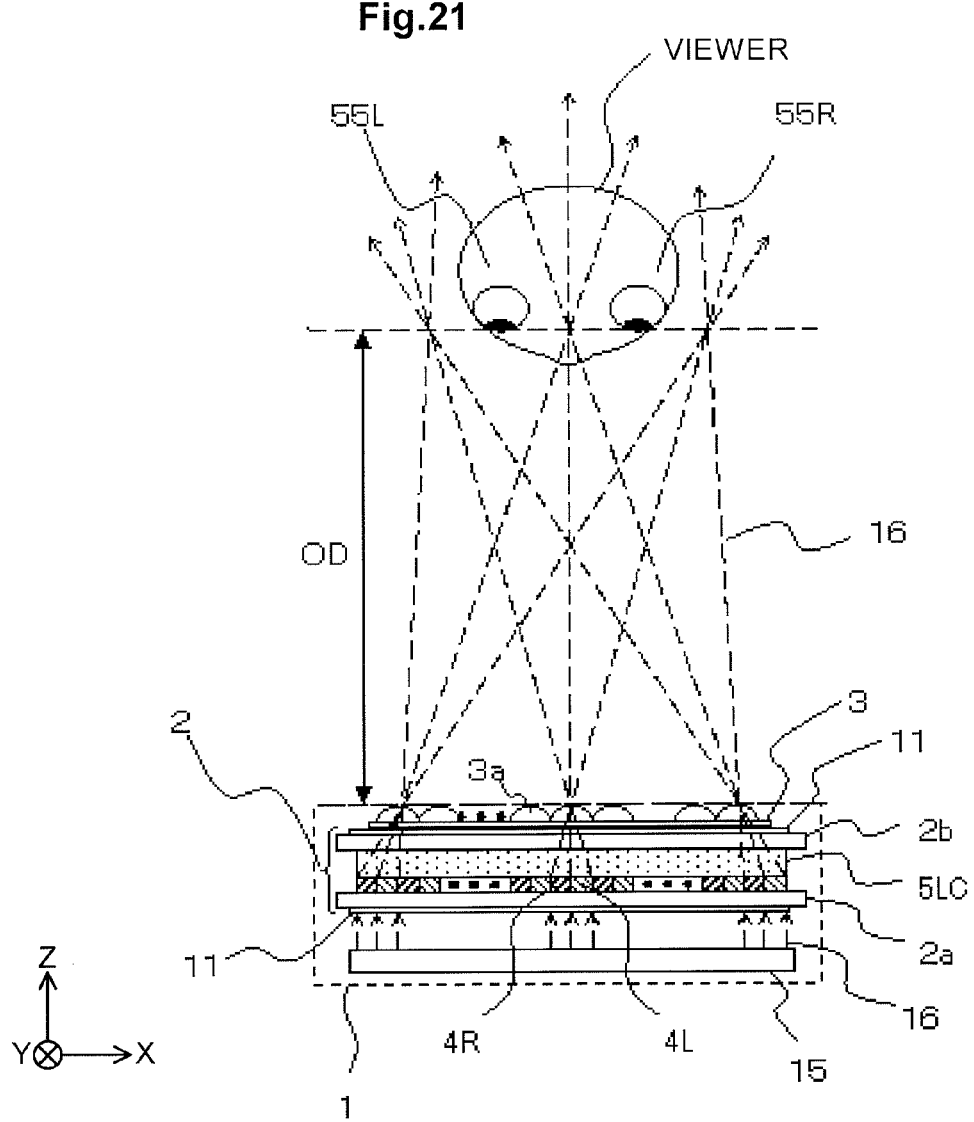
FIG. 21 is a conceptual diagram showing how lights are collected by the image display device according to the first exemplary embodiment of the present invention.

The above explanation was for a technique of setting a plurality of view points on a viewing plane and of causing pixels for respective view points to emit light toward respective set view points from all units of display of the display plane. This technique is called a light collecting technique because light for a certain view point is collected toward that view point. The light collecting technique is classified into the above-explained two-view-point type stereoscopic image display device and a multi-view-point type stereoscopic image display device having the number of view points increased more. FIG. 21 is a conceptual diagram showing a light collecting technique. The light collecting technique has a feature that light beam entering into the eye of the viewer is reproduced and displayed. The image display device 1 of the present exemplary embodiment can be effectively applied to the light collecting technique.

Figure 22:
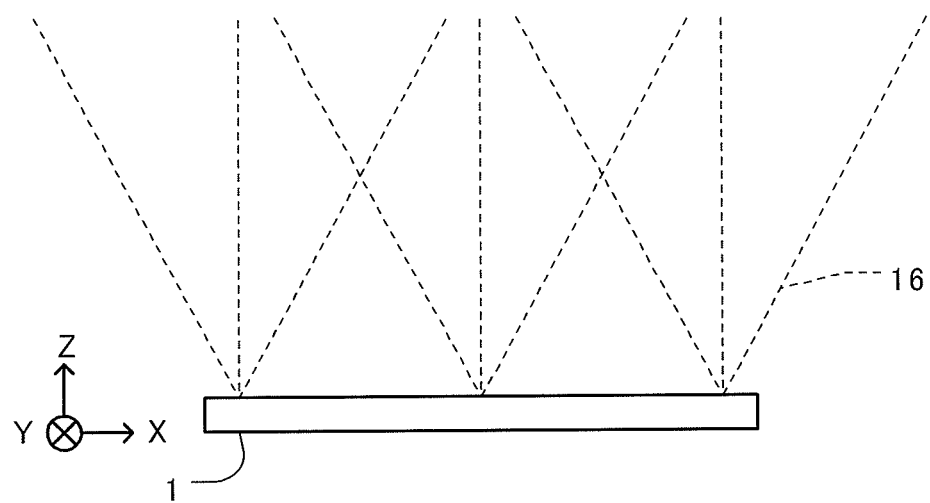
FIG. 22 is a conceptual diagram showing a spatial image scheme.

Furthermore, so-called spatial image technique, spatial image regenerating technique, spatial image reproducing technique, and spatial image forming technique are proposed. FIG. 22 is a conceptual diagram of a spatial image technique. Unlike the light collecting technique, the spatial image technique does not have a specific view point. However, what is different is that light emitted from a spatial object is reproduced and displayed. The spatial image technique is classified into stereoscopic image display devices through an integral photography technique, an integral videography technique, and an integral imaging technique. According to the spatial image technique, a viewer located at an arbitrary position does not view only an pixel for the same view point over the whole display plane. However, there are plural kinds of regions with a predetermined width formed by pixels for the same view point. The same effect as that of the light collecting technique can be obtained at each region, so that the image display device 1 of the present exemplary embodiment can be effectively applied to the spatial image technique.

In the above explanation, a term "view point" means a "position where the image display device is viewed (an observation position)" or a "point or a region where the eye of the viewer should be positioned", not a "point on a display region where the viewer pays attention (a viewing point)".

It is fine if the polarization plate 11 is not pasted on the liquid crystal display panel 2 mounted on the image display device 1 of the present exemplary embodiment but may be provided outside the lenticular lens 3. Moreover, the polarization plate 11 may be arranged at the viewer side relative to the lenticular lens 3. By changing the arrangement of the polarization plate 11, the distance H between the vertex of the lens and the pixel can be adjusted easily. This improves the degree of freedom for designing.

The image separating unit built in the image display device 1 of the present exemplary embodiment may be a parallax barrier having a transparent region and a non-transparent region arranged alternately. The parallax barrier may be an electrooptic element which can switch the region between the transparent region and the non-transparent region through liquid crystal molecules or an MEMS shutter. Moreover, when a GRIN (Gradient Index) lens is used as the electrooptic element using the liquid crystal, the image separating unit can have the same effect as that of the present invention.

In the present exemplary embodiment, the pixel for the first view point is the left-eye pixel 4L and the pixel for the second view point is the right-eye pixel 4R, but the present invention is not limited to this configuration. For example, the right-eye pixel 4R may be the pixel for the first view point and the left-eye pixel 4L may be the pixel for the second view point. This configuration allows a viewer to visually recognize a stereoscopic display like the original condition by changing the arrangement of pieces of image data even if the display panel 2 is rotated by 180 degrees. In particular, the portable device shown in FIG. 8 improves the operability by allowing the display screen to be rotatable, and it is necessary to provide information regardless of the direction of the display panel when the portable device is held by a hand.

The liquid crystal display panel 2 of the image display device 1 of the present exemplary embodiment is not limited to the liquid crystal driving scheme of the TN mode, and other liquid crystal driving modes can be applied. Examples of the liquid crystal driving modes in the horizontal electric field mode are an IPS (in-plain switching) scheme, an FFS (fringe field switching) scheme, and an AFFS (advanced fringe field switching) scheme. Moreover, in the case of the vertical orientation mode, examples are an MVA (multi-domain vertical alignment) scheme with a multi-domain so that a viewing angle dependency is reduced, a PVA (patterned vertical alignment) scheme, and an ASV (advanced super v) scheme. Furthermore, liquid crystal display panels of an OCB (optically compensated bend) scheme and a film compensation TN mode can be appropriately used.

The explanation was given of the case in which the display panel 2 of the present exemplary embodiment is a liquid crystal display panel utilizing the liquid crystal molecules as the electrooptic elements. The liquid crystal display panel is not limited to the transparent liquid crystal display panel, but can be a reflective liquid crystal display panel, a semitransparent liquid crystal display panel, a slightly reflective liquid crystal display panel having a larger ratio of a transparent region than that of a reflective region, and a slightly transparent liquid crystal display panel having a larger ratio of a reflective region than that of a transparent region, etc. Moreover, a TFT scheme can be appropriately applied as the display panel driving scheme. Thin-film transistors in the TFT scheme can be formed of not only an amorphous silicon, a low-temperature poly-silicon, a high-temperature poly-silicon, and a single-crystal silicon, but also an organic material like pentacene, a metal oxide like zinc oxide, or carbon nanotubes. Moreover, the image display device 1 of the present exemplary embodiment is not limited to the particular structure of the thin-film transistor. For example, a bottom-gate type, a top-gate type, a stagger type, or a reverse stagger type can be appropriately applied. Furthermore, display panels other than the liquid crystal type, such as an organic electroluminescence display panel, or a PALC (Plasma Address Liquid Crystal) can be appropriately applied.

In the present exemplary embodiment, a cellular phone is exemplified as the terminal device, but the present invention is not limited to this type of terminal device. For example, the present invention can be applied to various portable terminal devices, such as a PDA, a personal TV, a gaming machine, a digital camera, a digital video camera, and a laptop computer. Moreover, the present invention is not limited to the portable terminal device, but can be applied to various fixed-type terminal devices, such as a cash dispenser, an automatic vending machine, a monitor, and a television receiver.

In the present exemplary embodiment, the explanation was given of the case in which the pixel for the first view point is the left-eye pixel 4L and the pixel for the second view point is the right-eye pixel 4R, but the present invention is not limited to this configuration. For example, the present invention can be applied to a stereoscopic display panel having N number of view points in the unit of display. In the case of the stereoscopic display panel comprising N number of view points, a stereoscopic image can be displayed with stereoscopic information being added thereto appropriate at most for each view point, so that the range where a stereoscopic image can be viewed well can be expanded.

<Second Exemplary Embodiment>

Figure 23:
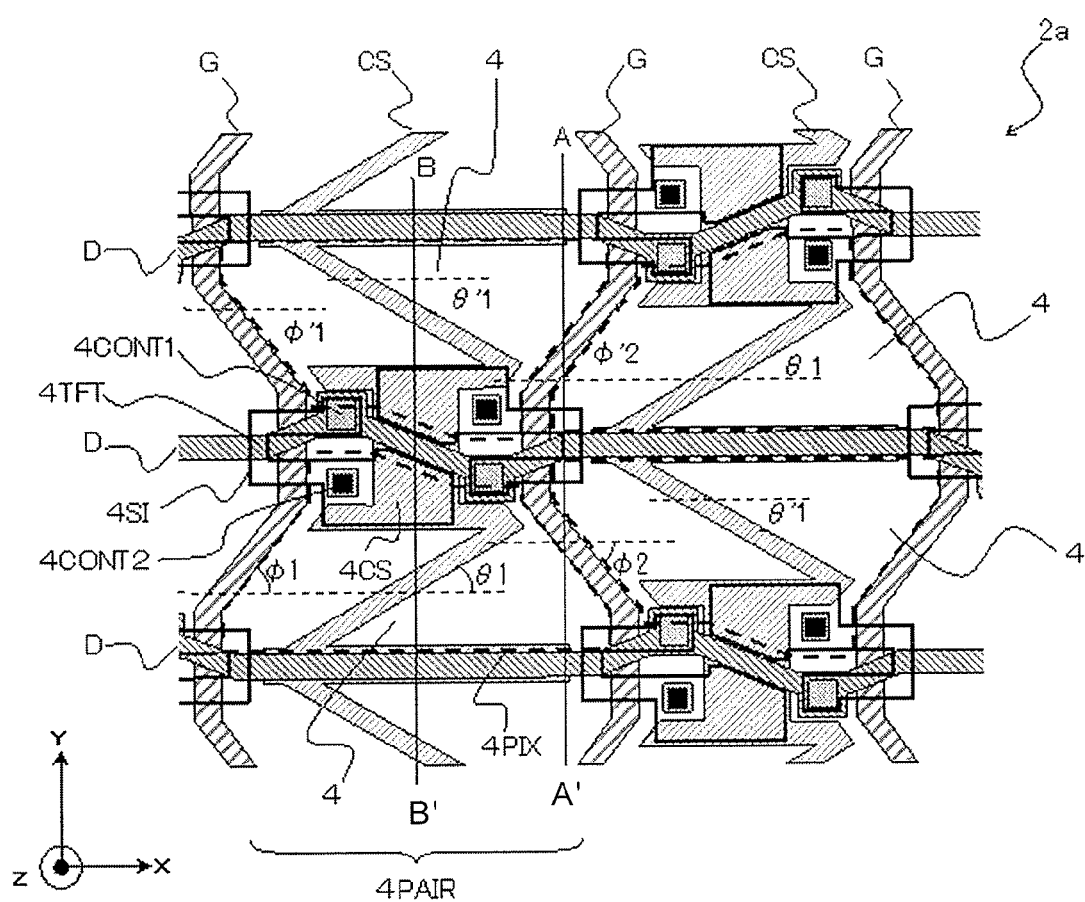
FIG. 23 is a plan view showing a pixel structure of an image display device according to a second exemplary embodiment of the present invention.
Figure 24:
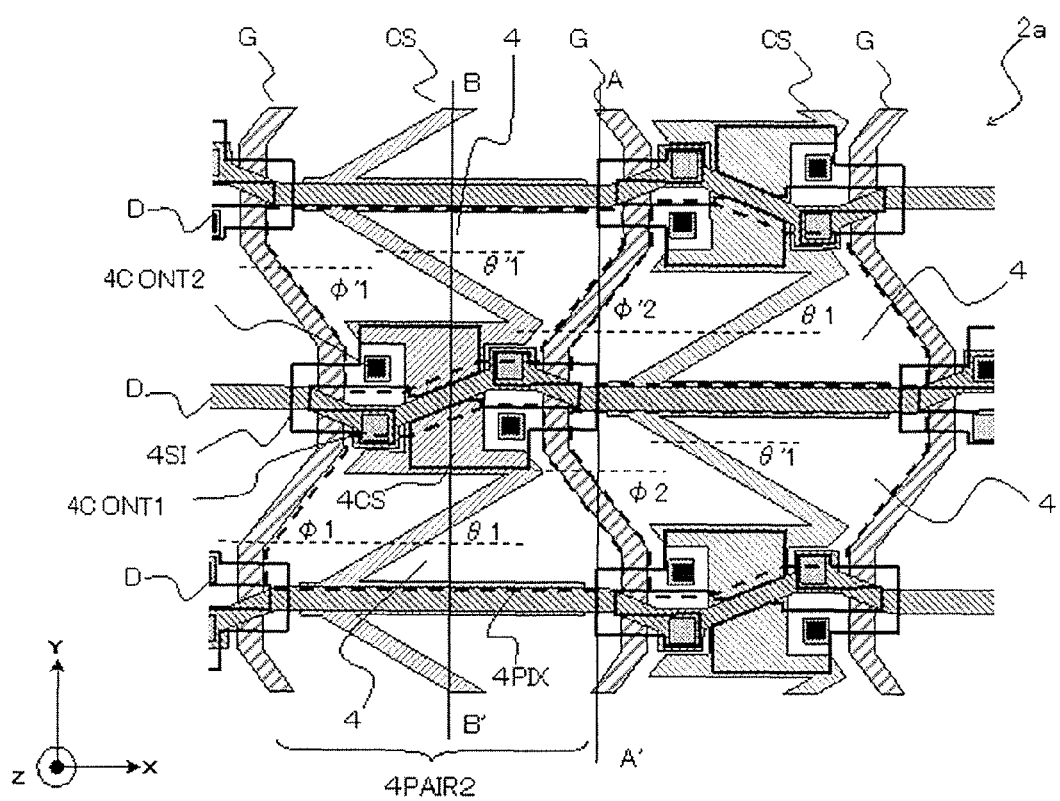
FIG. 24 is a plan view showing a pixel structure of the image display device according to the second exemplary embodiment of the present invention.

Next, an explanation will be given of a second exemplary embodiment of the present invention. FIGS. 23 and 24 are plan views showing an image display device according to the present exemplary embodiment. Regarding the pixels adjoining in the Y axis direction, i.e., the adjoining pixel pair in the present exemplary embodiment, in comparison with that of the first exemplary embodiment, the directions of respective storage capacitor lines CS passing all the way through the aperture are nonparallel, and are inclined in directions different from the image separating direction. Moreover, regarding the pixels adjoining in the X axis direction, i.e., the right and left pixels configuring a unit of display, the directions of respective storage capacitor lines CS passing all the way through the aperture are nonparallel, and are inclined in directions different from the image separating direction.

The pixel matrix of the present exemplary embodiment has the pixels shown in FIGS. 23 and 24 arranged side by side in the X direction and the Y direction. As shown in FIGS. 23 and 24, there are two types of inclination directions of the storage capacitor line CS, which are inclined in directions different from the image separating direction. The inclination portions of the storage capacitor lines CS are set to be different angles in the unit of display in the adjoining pixel pair. The storage capacitor lines CS in the present exemplary embodiment are arranged so as to be distributed in the X axis direction and in the Y axis direction.

The configuration and operation of the present exemplary embodiment other than the above-explained configuration and operation are same as those of the first exemplary embodiment.

Hence, the direction of the storage capacitor line CS and that of a moire stripe generated by the lenticular lens 3 are distributed in different directions, so that the moire stripes become unlikely to be visually recognized.

Meanwhile, 3D moire has a viewing field dependency. In particular, when it is viewed from a position out of the stereoscopic viewing region and in an oblique direction, there is a regional portion where the aperture becomes inconstant in the aperture region sandwiched between the upper bottom of the trapezoid and the lower bottom thereof. Hence, when it is viewed from this regional portion, the large brightness fluctuation is generated on the display panel 2, and the viewer feels strangeness.

In the present exemplary embodiment, the gate line G inclined in the different direction from the image separating direction and the storage capacitor line CS inclined in the different direction from the image separating direction are arranged in substantially succession in the X axis direction, hence the viewing field dependency of 3D moire when viewed from a region other than the stereoscopic viewing region can be suppressed.

Moreover, the pre-tilt direction of the liquid crystal molecules in the substrate boundary face generated due to the difference in level of the storage capacitor line CS depending on the film thickness can be distributed, so that coloring due to a change in retardation when viewed from an oblique direction can be suppressed.

<Third Exemplary Embodiment>

Figure 25:
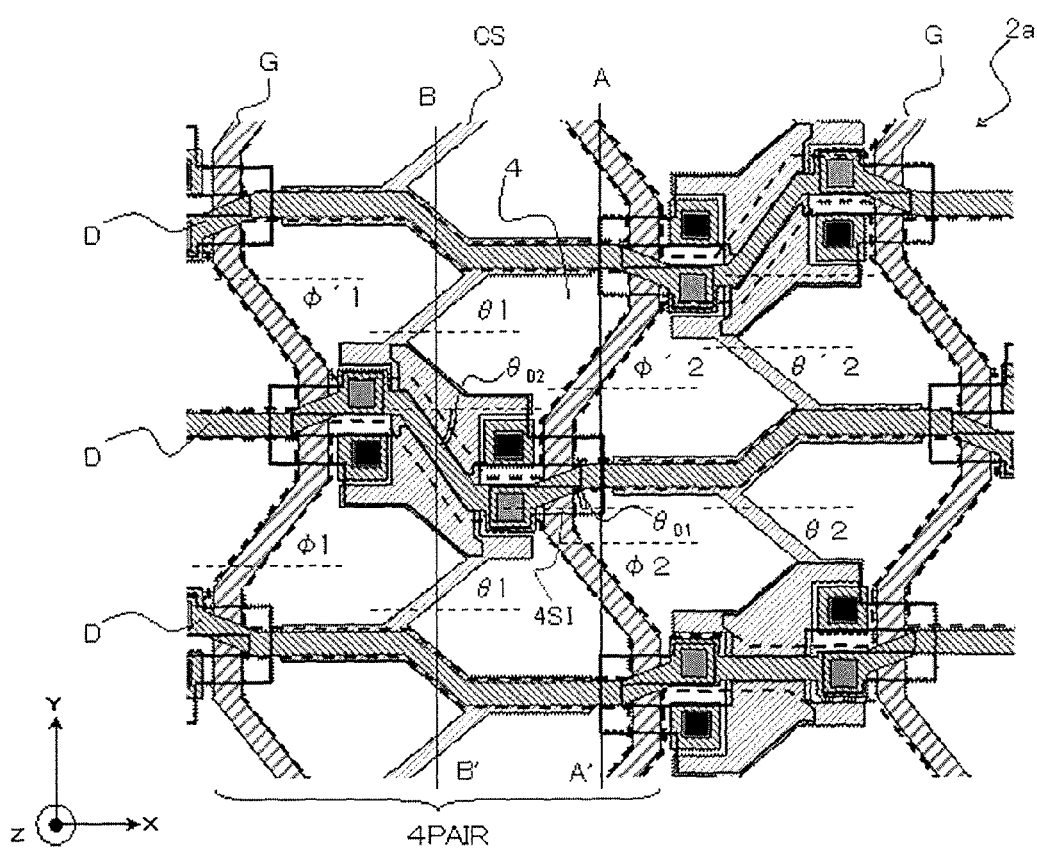
FIG. 25 is a plan view showing a pixel structure of an image display device according to a third exemplary embodiment of the present invention.
Figure 26:
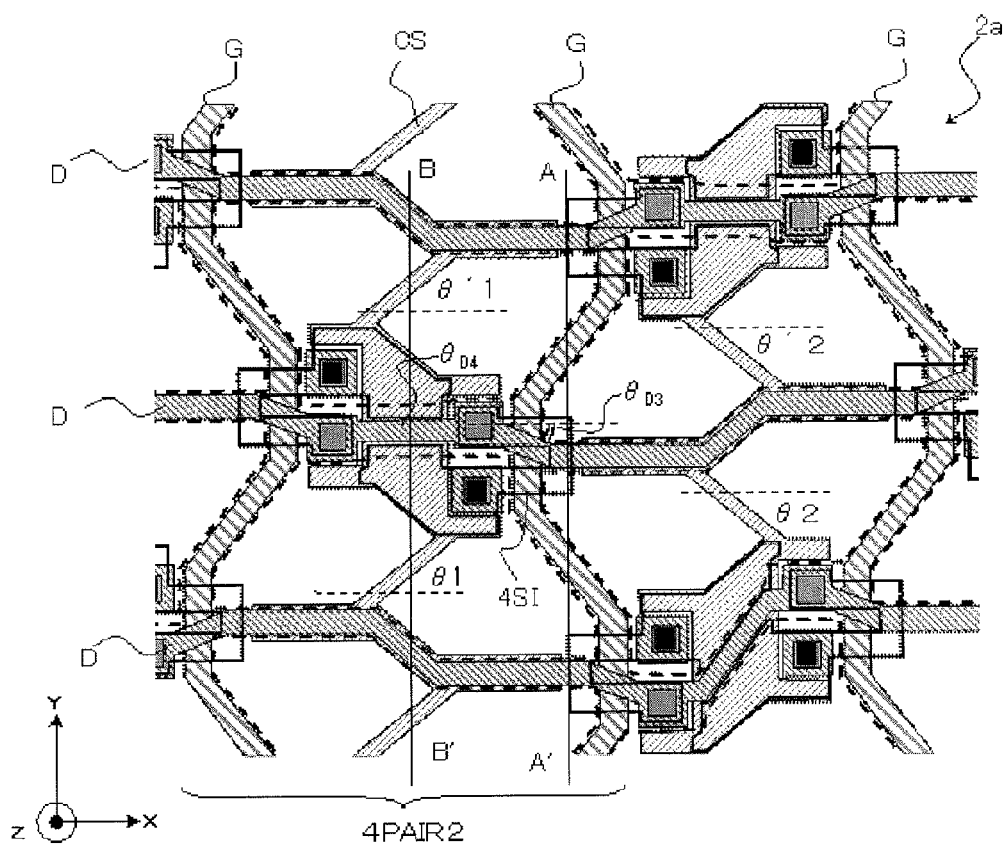
FIG. 26 is a plan view showing a pixel structure of the image display device according to the third exemplary embodiment of the present invention.
Figure 27:
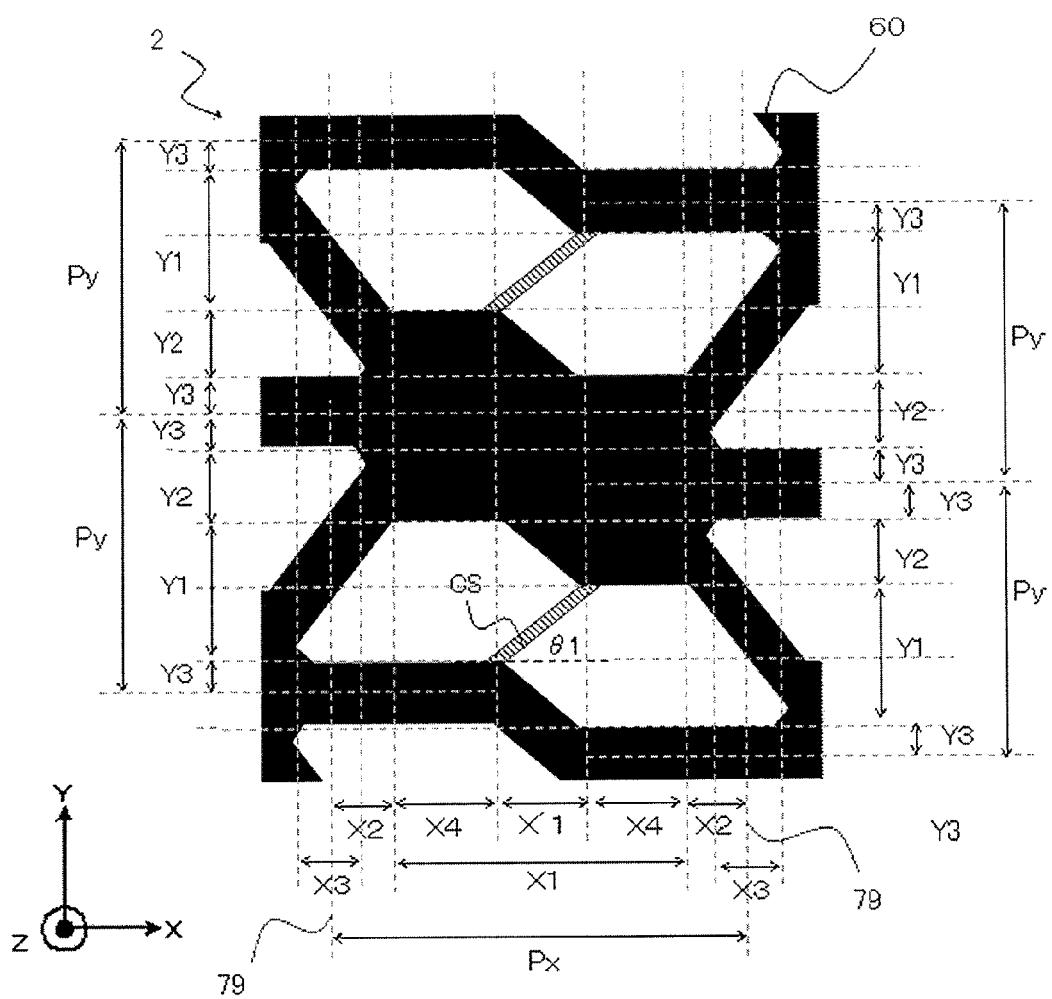
FIG. 27 is a plan view showing a pixel of a display panel according to the third exemplary embodiment of the present invention.

Next, an explanation will be given of a third exemplary embodiment of the present invention. FIGS. 25 and 26 are plan views showing a pixel structure of an image display device according to the present exemplary embodiment, and FIG. 27 is a plan view showing a display panel 2 according to the third exemplary embodiment.

In comparison with the first exemplary embodiment, in the present exemplary embodiment, a pixel shape is changed from a substantially trapezoidal shape to a substantially octagonal shape.

The pixel is formed in a substantially octagonal shape having a substantially trapezoidal pixel cut through a virtual section line interconnecting the upper bottom and the lower bottom and divided into two right trapezoids, each of the two right trapezoids is shifted in the +Y direction and in −Y direction by a predetermined size, and cut portions are connected together. As shown in FIG. 27, a region X 1 is divided into three regions so that X1=X'1+2×X4, and the storage capacitor line CS is arranged so as to diagonally traverse a center region X'1.

The storage capacitor line CS is arranged so as to traverse the section line of the substantially octagonal pixel, and the channel of the pixel thin-film transistor 4TFT provided in the adjoining pixel pair is not parallel to the image separating direction, and is shifted in an oblique direction. Moreover, the width of the storage capacitor line CS is smaller than the width of the gate line G.

Regarding a change in the shape of the light blocking portion at the upper bottom of the substantially trapezoidal pixel in the X axis direction, the light blocking portion has a width in the Y axis direction substantially constant, but changes its shape in the Y axis direction. Moreover, the vertical aperture ratio is substantially constant in the X axis direction.

The electrical connection relationship of the pixel in the present exemplary embodiment is same as that of the first exemplary embodiment. Hence, pixels shown in FIGS. 25 and 26 are alternately arranged in the X axis direction and in the Y axis direction, thereby configuring the pixel matrix.

As shown in FIG. 25, the silicon thin-film portion of the thin-film transistor and the data line D intersect with each other, and the data line D is arranged at the upper layer of the silicon thin-film portion so as to be inclined in a different direction from the image separating direction. The angle between the data line D and the X axis direction at the upper layer of the silicon thin-film portion is $\theta D1$. Moreover, the data line D inclined at the upper layer of the storage capacitor electrode CS2 is arranged at an angle θD2 from the image separating direction, and electrically connects the pixel thin-film transistors 4TFT for driving respective pixels of the adjoining pixel pair 4PAIR.

FIG. 25 shows the adjoining pixel pair 4PAIR and a sub pixel adjoining in the +X side. The pixel thin-film transistors 4TFT at the upper bottom of the substantially trapezoidal pixel control a pixel at +Y side and a pixel at the −Y side adjoining to each other in the Y axis direction, respectively, so that the data line D is inclined and arranged in a different direction from the image separating direction at the intersection between the storage capacitor electrode CS2 and the data line D. The pixel thin-film transistors 4TFT of the adjoining pixel pair 4PAIR are shifted in the +Y direction and in −Y direction, respectively, by a predetermined size, so that the angle between the image separating direction and the data line D becomes large. Accordingly, a following relationship is satisfied in the adjoining pixel pair 4PAIR.

$$|\theta D2|>|\theta D1| \quad (51)$$

FIG. 26 shows the adjoining pixel pair 4PAIR2 and a sub pixel adjoining in the +X side. Respective pixel thin-film transistors 4TFT of the adjoining pixel pair 4PAIR2 are shifted in the +Y direction and in the −Y direction, respectively, by a predetermined size, so that the angle between the image separating direction and the data line D becomes small. Accordingly, a following relationship is satisfied in the adjoining pixel pair 4PAIR2.

$$|\theta D4|<|\theta D3| \quad (52)$$

The configuration and operation of the present exemplary embodiment other than the above-explained configuration and operation are same as those of the first exemplary embodiment.

The width of the upper bottom of the substantially trapezoidal pixel in the Y axis direction depends on the area of the pixel thin-film transistor 4TFT, and cannot be reduced without changing the process rule, so that the width of the light blocking portion in the Y axis direction covering the upper bottom of the substantially trapezoidal pixel becomes large relative to the width of the aperture region in the Y axis direction in the case of a pixel with a small pitch. When the image of the light blocking portion covering the upper bottom of the substantially trapezoidal pixel is enlarged by the image separating unit, it may be visually recognized by the viewer as a bright and dark spot or stripe on the display unit, and thus the display quality may be deteriorated.

In comparison with the first exemplary embodiment, the pixel of the present exemplary embodiment employs a configuration in which the light blocking portion at the upper bottom of the trapezoid is shifted and deformed in the Y axis direction while maintaining the width thereof in the Y axis direction constant regardless of the X axis direction. At the same time, the aperture range has a width in the Y axis direction constant regardless of the X axis direction but deforms in the sub pixel, so that the vertical aperture ratio is substantially constant regardless of the X axis direction. As explained above, the shifted and deformed pixels are periodically arranged in the X axis direction, and the aperture region of the sub pixel is distributed and arranged in the Y axis direction in comparison with conventional technologies. Moreover, a period T in which the light blocking portion changes in the Y axis direction is same as the pixel pitch Pu, and changes at a period equal to or less than the resolution of the display panel 2. Accordingly, a bright and dark spot or stripe is not likely to be visually recognized. Hence, in comparison with the pixel of the first exemplary embodiment, the pixel of the present exemplary embodiment can reduce a bright and dark spot or stripe generated due to the image separating unit and the light blocking portion at the upper bottom of the trapezoid.

The upper bottom of the trapezoid before cut and the lower bottom thereof come close to each other at the center of the pixel according to the present exemplary embodiment, so that the distance of the storage capacitor line CS that passes all the way through the aperture can be shortened. This reduces a wiring resistance. Moreover, the width of the storage capacitor line CS can be reduced while ensuring a predetermined wiring resistance, so that the aperture ratio can be increased.

<Fourth Exemplary Embodiment>

Figure 28:
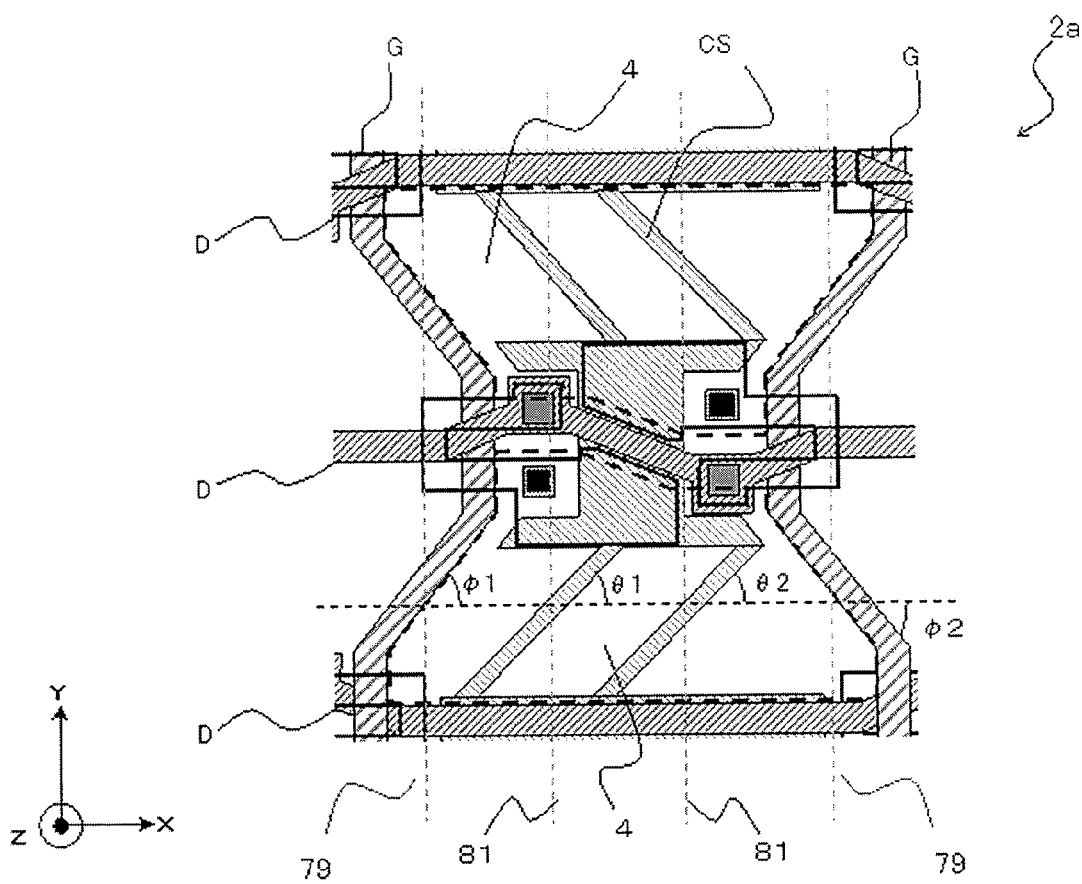
FIG. 28 is a plan view showing a pixel structure of an image display device according to a fourth exemplary embodiment of the present invention.

Next, an explanation will be given of a fourth exemplary embodiment of the present invention. FIG. 28 is a plan view showing an image display device according to the present exemplary embodiment. In comparison with the first exemplary embodiment, two storage capacitor lines CS are arranged so as to pass all the way through a pixel aperture region in the present exemplary embodiment. Each storage capacitor line CS is inclined in a different direction from the X axis direction so that the aperture in the image separating direction becomes substantially constant. Respective widths and inclination angles of the storage capacitor lines CS are set to be same. The two storage capacitor lines CS divide the aperture into three regions.

Moreover, two storage capacitor lines CS are arranged in a sub pixel so as to be parallel to the Y axis direction and to traverse a virtual line that evenly divides the sub pixel into three pieces in the X axis direction of the sub pixel.

The angle of an inclined wiring is defined so a clockwise direction is positive with the +X direction being as an axis at 0 degree. Gate lines G are inclined in a different direction from the image separating direction, and in a pixel in which the upper bottom side is directed to the +Y direction, the inclination angle of the gate line G at the −X side is φ1, and the inclination angle of the gate line G at the +X side is φ'1=−φ1. Moreover, in a pixel in which the upper bottom side is directed to the −Y direction, the inclination angle of the gate line G at the −X side is −φ1, and the inclination angle of the gate line G at the +X side is φ1.

In a pixel in which the upper bottom side is directed to the +Y direction, the inclination angle θ1 of the storage capacitor line CS and the inclination angle φ1 of the gate line G are set to be the same angle. Moreover, when respective inclination angles of the storage capacitor lines CS are compared with each other, θ1=θ2 is satisfied. That is, according to the present exemplary embodiment, the inclination angle of the storage capacitor line CS in the sub pixel is the same angle as that of the gate line G at a side of the sub pixel.

The configuration and operation of the present exemplary embodiment other than the above-explained configuration and operation are same as those of the first exemplary embodiment.

In the present exemplary embodiment, by arranging the two storage capacitor lines CS, a reduction of the yield due to breaking of the storage capacitor line CS can be suppressed. In particular, it is effective when the storage capacitor line CS is formed through a thinning process and the wiring area is reduced.

It is not necessary for each storage capacitor line CS to pass through the center of the pixel aperture, and it is also unnecessary to arrange a structural object at the aperture region of the center of the pixel, so that the brightness fluctuation originating from the forming precision around the center of the brightness distribution can be reduced.

Moreover, the cycle of the structural object arranged in the X axis direction can be made smaller, so that the varying in the brightness and darkness in the X axis direction originating from the lens enlargement effect can be reduced.

<Fifth Exemplary Embodiment>

Figure 29:
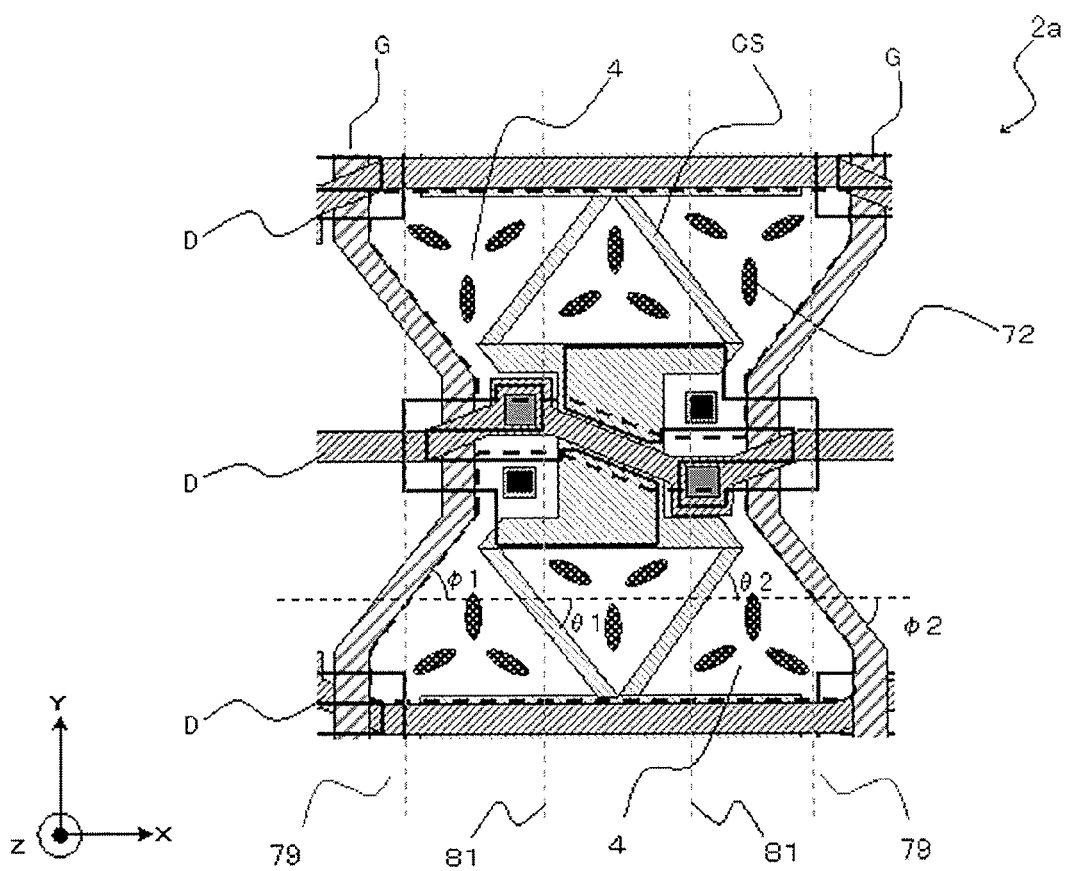
FIG. 29 is a plan view showing a pixel structure of an image display device according to a fifth exemplary embodiment of the present invention.

Next, an explanation will be given of a fifth exemplary embodiment of the present invention. FIG. 29 is a plan view showing an image display device according to the present exemplary embodiment.

In the present exemplary embodiment, two storage capacitor lines CS arranged so as to pass all the way through a pixel aperture are arranged in a sub pixel. Respective storage capacitor lines CS in the sub pixel are nonparallel, and are inclined in a different direction from the image separating direction so that the aperture in the image separating direction becomes substantially constant. Moreover, a gate line G inclined in a different direction from the image separating direction and the storage capacitor line CS inclined in a different direction from the image separating direction intersect in the vicinity of an end of a light blocking portion, and are arranged in substantially succession in the X axis direction.

A region divided by the storage capacitor lines CS is in a substantially triangular shape. It is desirable that regions each in a substantially triangular shape should have the same area, and in particular, it is desirable that each region should be an equilateral triangle having a high symmetry.

The configuration and operation of the present exemplary embodiment other than the above-explained configuration and operation are same as those of the first exemplary embodiment.

According to the present exemplary embodiment, the storage capacitor lines CS are nonparallel to each other, and the direction of moire stripes can be dispersed, so that the moire stripes are unlikely to be visually recognized. Moreover, the storage capacitor line CS is inclined in a different direction from the image separating direction, and the aperture in the image separating direction becomes substantially constant, so that the varying in brightness and darkness originating from the lens enlargement effect can be reduced.

A vertical orientation (VA) mode setting the initial orientation of the liquid crystal molecules 72 in the vertical direction to the substrate can be appropriately applied to the pixel of the present exemplary embodiment. A structural object that controls the orientation direction of the liquid crystal molecules may be provided at the center of the triangle and at the TFT-substrate-2a side. The region divided by the storage capacitor lines CS is a triangle having a high symmetry, so that the orientation direction of liquid crystal molecules 72 can be made as a multi-domain, so that the image quality can be improved.

A structural object that controls the orientation direction may be provided at the opposing-substrate-2b side. The structural object at the opposing-substrate-2b side may be a slit provided at an opposing electrode, and the structural object can be formed at a low cost without increasing the number of processes.

A configuration may be employed in which no pixel electrode 4PIX is provided at the upper layer of the storage capacitor line CS and the electric field from the storage capacitor line CS is applied to a liquid crystal layer 5LC. Such a configuration enables a stable control of the orientation of the liquid crystal molecules 72.

<Sixth Exemplary Embodiment>

Figure 30:
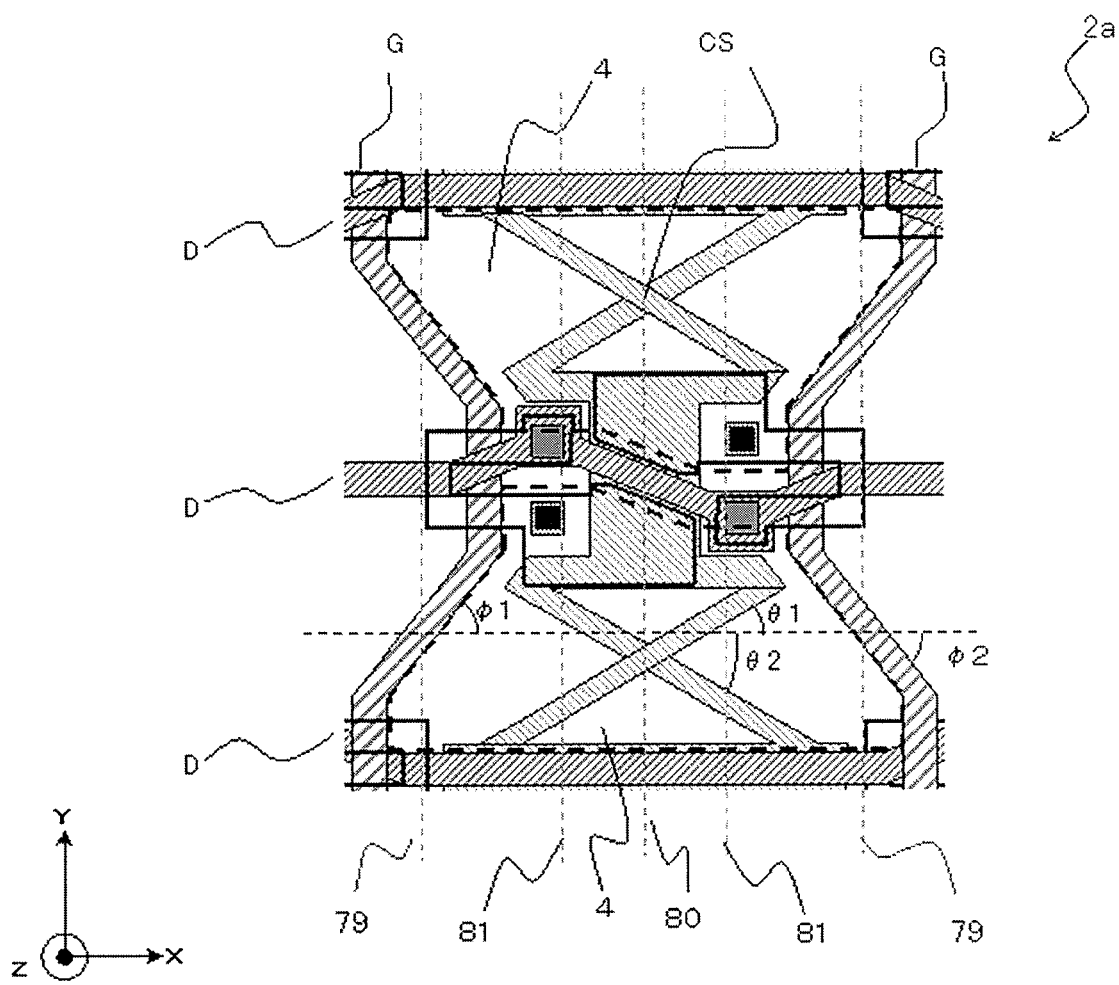
FIG. 30 is a plan view showing a pixel structure of an image display device according to a sixth exemplary embodiment of the present invention.

Next, an explanation will be given of a sixth exemplary embodiment of the present invention. FIG. 30 is a plan view showing an image display device according to the present exemplary embodiment.

In the present exemplary embodiment, two storage capacitor lines CS are arranged in an aperture, and intersect with each other at the center of the pixel aperture. Moreover, each storage capacitor line CS is inclined in a different direction from the X axis direction so that the aperture in the image separating direction becomes substantially constant. The aperture is divided into four regions by the two storage capacitor lines CS.

The configuration and operation of the present exemplary embodiment other than the above-explained configuration and operation are same as those of the first exemplary embodiment.

In the present exemplary embodiment, the storage capacitor lines CS are nonparallel to each other, and the directions of moire stripes can be dispersed, so that the moire stripes are unlikely to be visually recognized. Moreover, the storage capacitor lines CS are inclined in a different direction from the image separating direction, and the aperture in the image separating direction becomes substantially constant, so that the varying in brightness and darkness originating from the lens enlargement effect can be reduced.

<Seventh Exemplary Embodiment>

Figure 31:
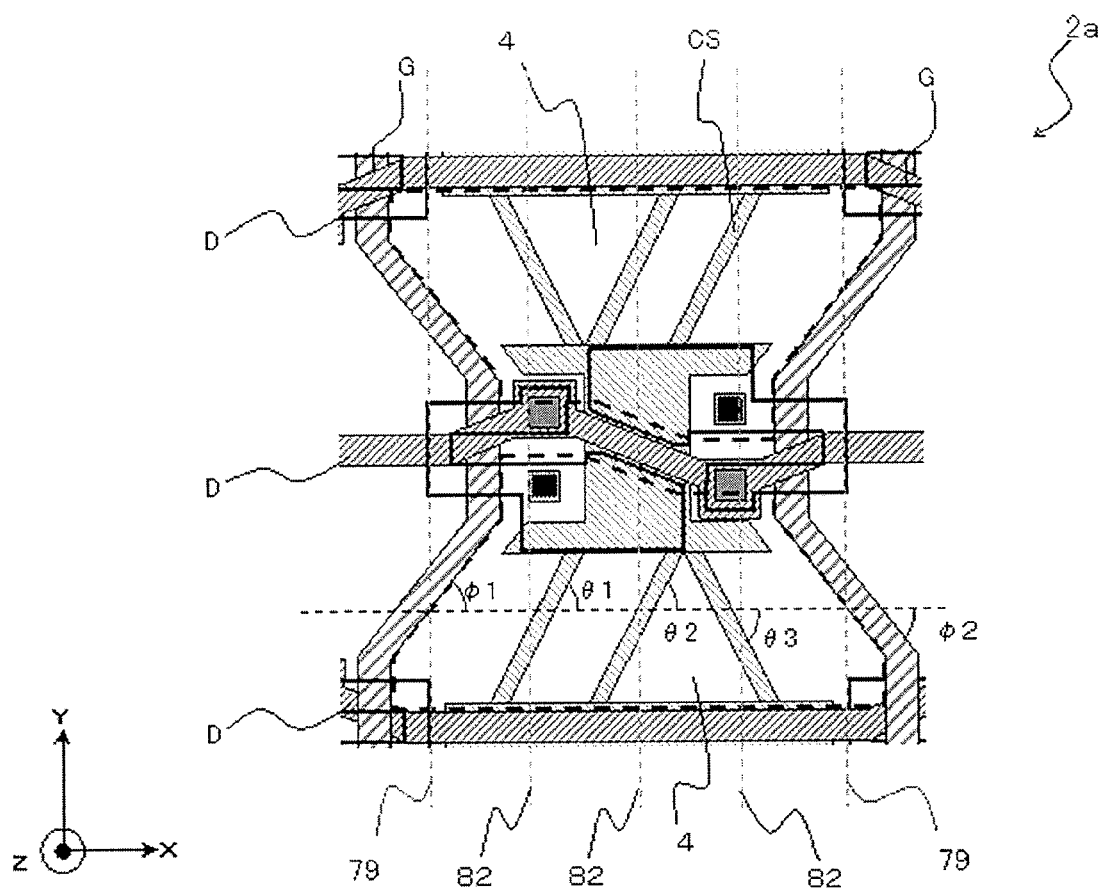
FIG. 31 is a plan view showing a pixel structure of an image display device according to a seventh exemplary embodiment of the present invention.

Next, an explanation will be given of a seventh exemplary embodiment of the present invention. FIG. 31 is a plan view showing an image display device according to the present exemplary embodiment.

In the present exemplary embodiment, three storage capacitor lines CS are arranged in an aperture, and at least one of those lines is inclined in a different direction from that of the other two lines. Moreover, each storage capacitor line CS is inclined in a different direction from the X axis direction so that the aperture in the image separating direction becomes substantially constant. The two storage capacitor lines CS divide the aperture into three regions.

Moreover, three storage capacitor lines CS are arranged in a sub pixel, parallel to the Y axis direction, and traverse a line segment 82 that evenly divides the sub pixel into four pieces in the X axis direction.

The angle of each inclined wiring is defined so that the clockwise direction is positive with the +X direction being as an axis at 0 degree. Gate lines G are inclined in a different direction from the image separating direction, and in a pixel in which the upper bottom side is directed to the +Y direction, the inclination angle of the gate line G at the −X side is $\phi 1$, and the inclination angle of the gate line G at the +X side is $\phi'1 = -\phi 1$. Moreover, in a pixel in which the upper bottom side is directed to the −Y direction, the inclination angle of the gate line G at the −X side is $-\phi 1$, and the inclination angle of the gate line G at the +X side is $\phi 1$.

In a pixel in which the upper bottom side is directed to the +Y direction, the inclination angle $\theta 1$ of the storage capacitor line CS is larger than the inclination angle $\phi 1$ of the gate line G. Moreover, when respective inclination angles of the storage capacitor lines CS are compared one another, $\theta 1 = \theta 2 = -\theta 3$ is satisfied. That is, according to the present exemplary embodiment, the inclination angle of each storage capacitor line CS is larger than that of the gate line G.

The configuration and operation of the present exemplary embodiment other than the above-explained configuration and operation are same as those of the first exemplary embodiment.

According to the present exemplary embodiment, because respective inclination angles of the gate line G and the storage capacitor line CS are different from each other, moire stripes originating from the lens and wirings can be dispersed, thereby improving the image quality. Moreover, because at least one of the storage capacitor lines CS is arranged in a different direction from that of the other storage capacitor lines CS, the dispersion effect of the moire stripes can be further improved. Furthermore, the structural cycle of the storage capacitor lines CS in the X axis direction is small, so that the pitch of moire stripes can be reduced, and the moire stripes are not likely to be visually recognized.

<Eighth Exemplary Embodiment>

Figure 32:
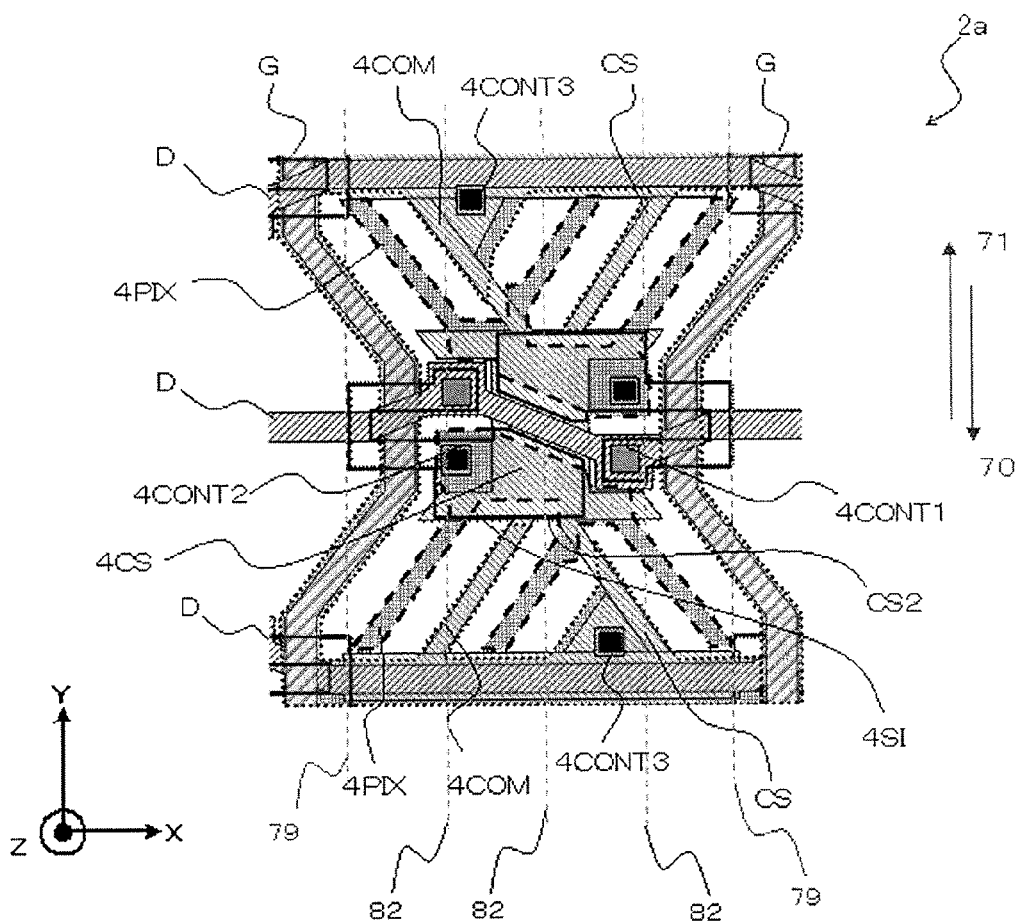
FIG. 32 is a plan view showing a pixel structure of an image display device according to an eighth exemplary embodiment of the present invention.

Next, an explanation will be given of an eighth exemplary embodiment of the present invention. FIG. 32 is a plan view showing an image display device according to the present exemplary embodiment.

In the present exemplary embodiment, three storage capacitor lines CS are arranged in an aperture, and at least one of those lines is inclined in a different direction from that of the other two lines. Moreover, each storage capacitor line CS is inclined in a different direction from the X axis direction so that the aperture in the image separating direction becomes substantially constant. The aperture is divided into three regions by the two storage capacitor lines CS.

Moreover, three storage capacitor lines CS are arranged in a sub pixel, parallel to the Y axis direction, and traverse a line segment 82 that evenly divides the sub pixel into four pieces in the X axis direction.

As shown in FIG. 32, a pixel of the present exemplary embodiment has opposing electrodes 4COM provided at the TFT-substrate-2a side and is arranged so as to cover the upper layer of a gate line G and that of the storage capacitor line CS. The opposing electrode 4COM is connected to the storage capacitor line CS through a contact hole 4CONT3.

A pixel thin-film transistor 4TFT is a MOS thin-film transistor, has either one of the source electrode or the drain electrode connected to a data line D through a contact hole 4CONT1, and has another electrode connected to either one of a pixel electrode 4PIX or a storage capacitor 4CS through a contact hole 4CONT2. The pixel thin-film transistor 4TFT further has the gate electrode connected to a gate line G. The storage capacitor 4CS has another electrode connected to a storage capacitor electrode CS2. A pixel electrode 4PIX is arranged between opposing electrodes 4COM with a space, and the pixel electrodes 4PIX and the opposing electrodes 4COM are arranged side by side in the X axis direction in a manner like a comb-teeth.

A pixel capacitor 4CLC is formed between the pixel electrodes 4PIX. The storage capacitor line CS and the storage capacitor electrode CS2 are formed on the same layer, and are electrically connected together.

A rubbing direction 70 at the TFT-substrate side and a rubbing direction 71 at the opposing-substrate side are parallel to the Y axis direction, i.e., a direction vertical to the image separating direction. Moreover, the polarization axis of a polarization plate 11 is arranged in a crossed nicols manner, and the display mode is a normally black mode. Because the display mode is a normally black mode, a region where a black matrix 60 is provided can be eliminated at a region other than the aperture which requires no electric field control on the liquid crystal molecules. Hence, the aperture can be opened wide without the black matrix 60 that covers the data line D or the gate line G. Moreover, complete elimination of the black matrix 60 simplifies the process.

The liquid crystal molecules are initially oriented in the Y axis direction, and are controlled by an electric field having an in-plane direction component generated between the pixel electrode 4PIX and the opposing electrode 4COM as a main component.

The configuration and operation of the present exemplary embodiment other than the above-explained configuration and operation are same as those of the first exemplary embodiment.

In the present exemplary embodiment, the orientation of the liquid crystal molecules is controlled by a horizontal electric field, so that no liquid crystal molecules incline in an oblique direction relative to the substrate even if a voltage is applied. Hence, a wide view angle can be obtained.

Moreover, the pixel of the present exemplary embodiment has extremely superior view angle characteristics, so that it is unnecessary to paste a compensation film for a film compensation TN mode and a multi-domain vertical orientation mode, etc., and thus the thickness of the display panel 2 can be reduced. Reduction of the thickness of the display panel 2 enables reduction of a distance between the vertex of a cylindrical lens 3a and a pixel, resulting in the improvement of the degree of freedom for designing.

According to the present exemplary embodiment, in a sub pixel, the gate line G and the storage capacitor line CS have two kinds of inclination angles, and a liquid crystal molecules 72 are divided into domains of two directions. Respective areas of the two domain regions are nonuniform in the sub pixel, but can be uniform by compensation of sub pixels adjoining to each other in the X axis direction. Hence, coloring when viewed from an oblique direction can be reduced. In particular, when a two-dimensional image is displayed, each sub pixel configuring the unit of display displays the same image, so that optical compensation is realized for each unit of display in a two-dimensional display.

Moreover, because the opposing electrodes 4COM are provided at the TFT-substrate-2a side, the opposing electrode 4COM at the opposing-substrate-2b side can be eliminated. Furthermore, the pixel electrode 4PIX and the opposing electrode 4COM can be formed of the same material of the same layer at the TFT-substrate-2a side. Hence, the process can be simplified and the cost can be reduced. The pixel electrode 4PIX and the opposing electrode 4COM may be formed via an insulation film at the TFT-substrate-2a side. Short-circuiting can be prevented by the intervening insulation film, thereby improving the yield.

<Ninth Exemplary Embodiment>

Figure 33:
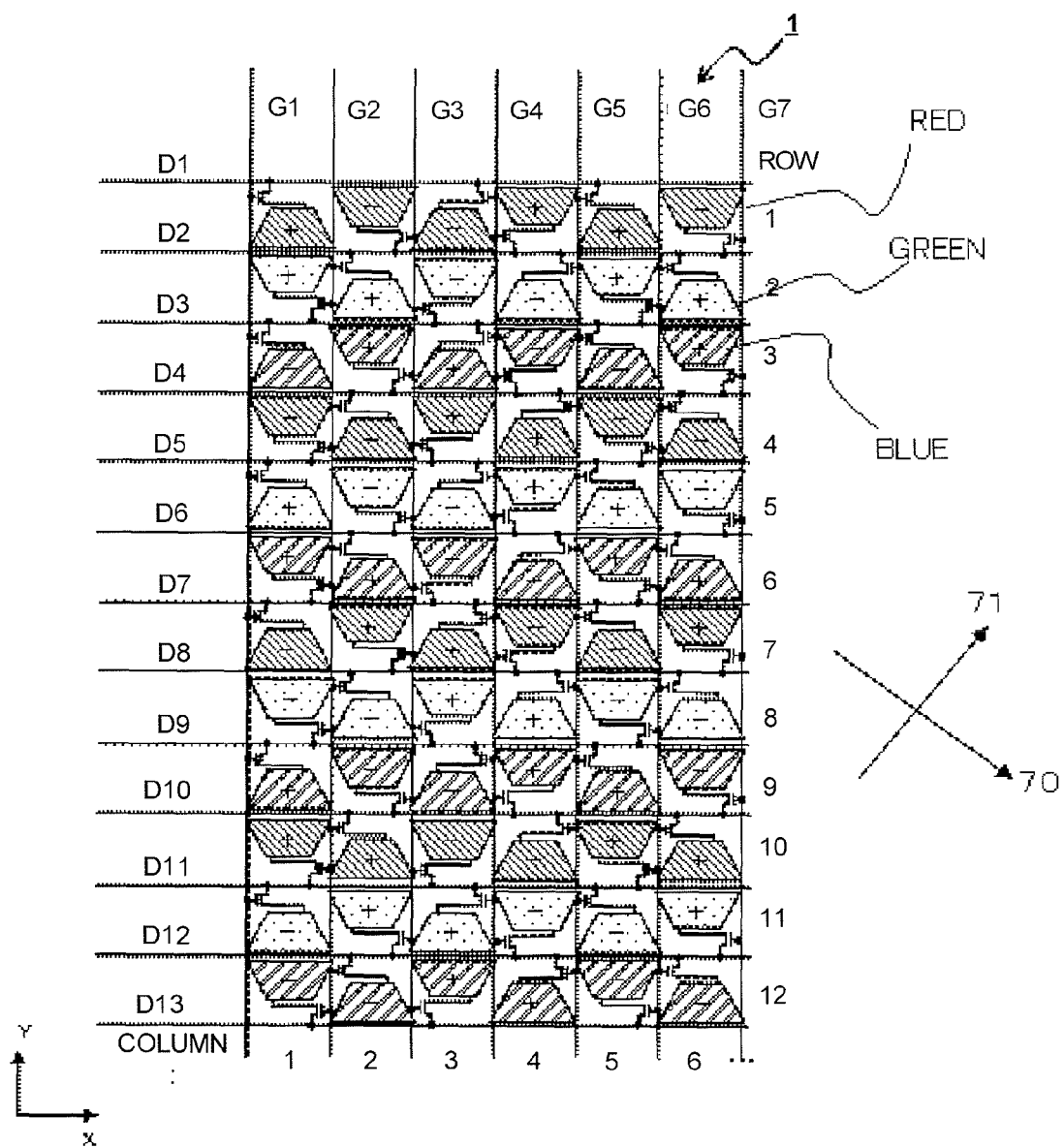
FIG. 33 is an exemplary diagram showing polarities of respective pixels in an image display device according to a ninth exemplary embodiment of the present invention.
Figure 35:
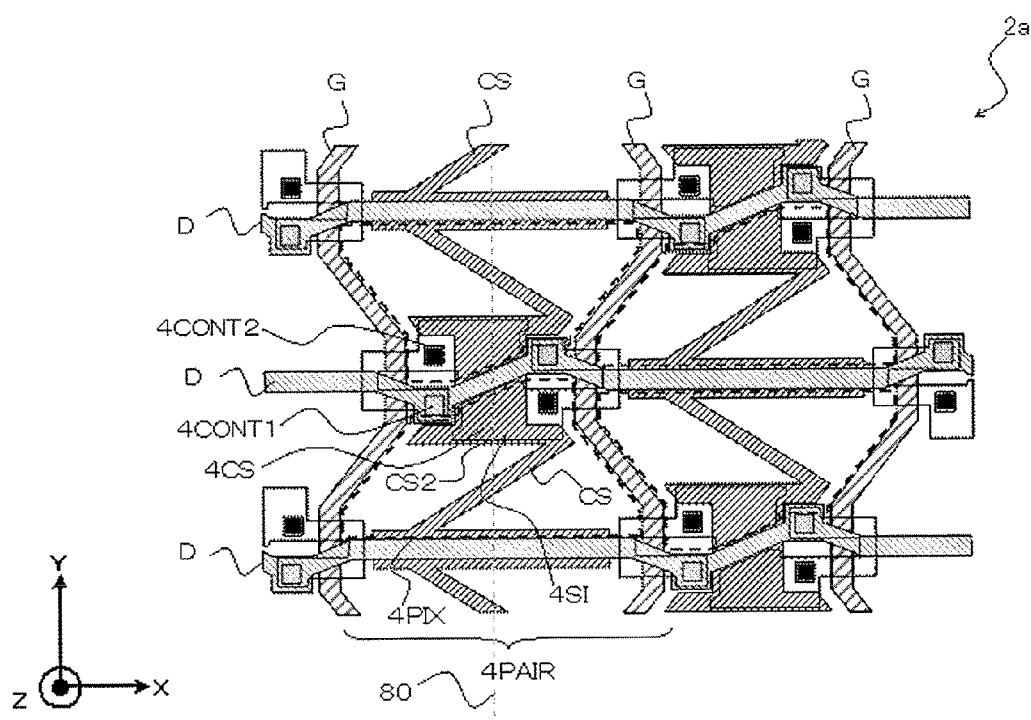
FIG. 35 is a plan view showing a pixel structure of the image display device according to the ninth exemplary embodiment of the present invention.
Figure 36:
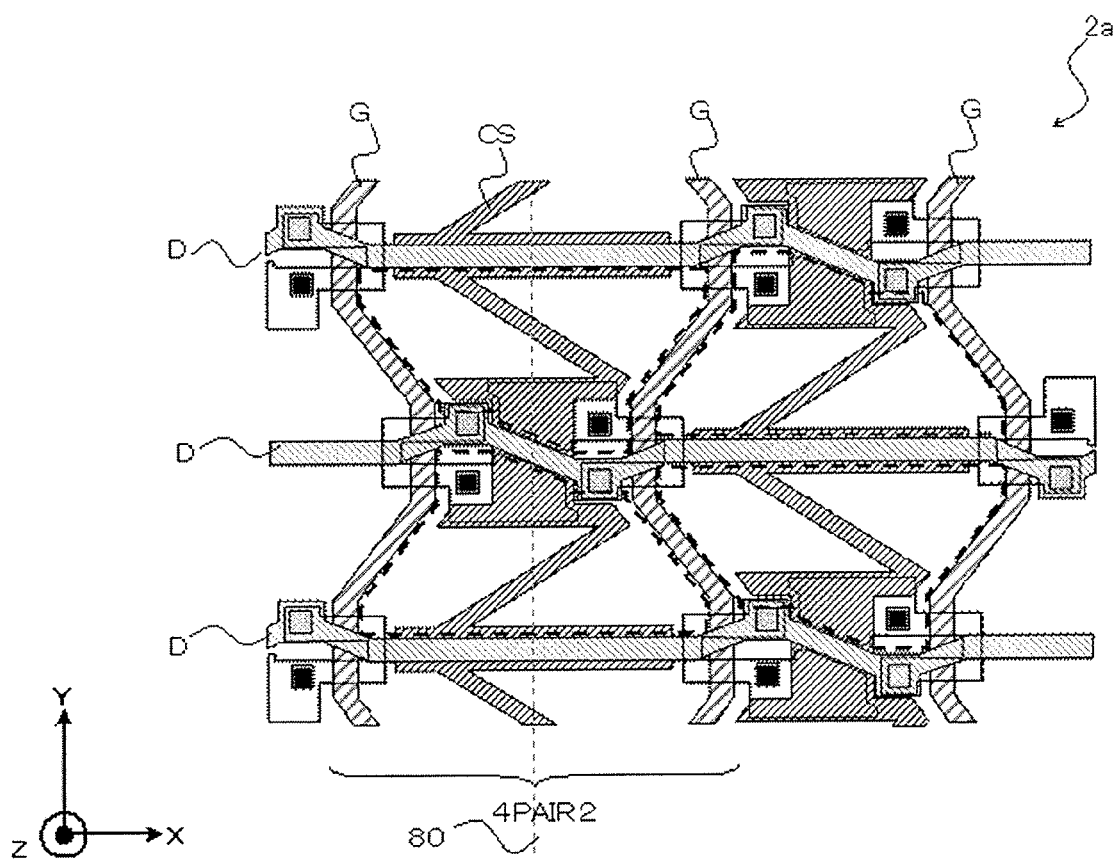
FIG. 36 is a plan view showing a pixel structure of the image display device according to the ninth exemplary embodiment of the present invention.

Next, an explanation will be given of a ninth exemplary embodiment of the present invention. FIG. 33 is a diagram exemplarily showing an electrical connection relationship among pixels of the present exemplary embodiment and a polarity distribution. FIG. 34 is a table showing a driving polarity input into a data line D in an image display device of the present exemplary embodiment. FIGS. 35 and 36 are plan views showing a pixel structure of the image display device according to the present exemplary embodiment.

The image display device of the present exemplary embodiment has pixels shown in FIGS. 35 and 36 arranged in a matrix manner and in a connection relationship shown in FIG. 33.

A driving method of the image display device 1 of the present exemplary embodiment inverts the polarity of display data transmitted for each two data lines relative to the reference potential as shown in FIG. 35, inverts the polarity of display data transmitted through each gate line for each gate line, and inverts such polarities for each frame. This dot inversion driving is called a 2H1V inversion driving. This is because the polarity is inverted for each two data lines arranged in the horizontal direction (the H direction) and for each gate line arranged in the vertical direction (the V direction).

A detailed explanation will be given with reference to FIG. 33 which shows polarities of respective pixels realized as a result of the above-explained 2H1V inversion driving in a frame. First, when a gate line G1 is selected, display data with a positive polarity is transmitted to a data line D1, and a voltage with a positive polarity is written in a pixel P11. Moreover, pieces of display data with a negative polarity are transmitted to data lines D2, D3, D6, D7, D10 and D11, respectively, and pieces of display data with a positive polarity are transmitted to data lines D4, D5, D8, D9, D12, and D13, respectively. Next, when a gate line G2 is selected, all polarities of data lines are inverted. That is, pieces of display data with a negative polarity are transmitted to the data lines D1, D4, D5, D8, D9, D12, and D13, respectively, and pieces of display data with a positive polarity are transmitted to the data lines D2, D3, D6, D7, D10, and D11, respectively. Thereafter, when gate lines G3, G5, and G7 are selected, respectively, the same state is applied like when the gate line G1 is selected, and when gate lines G4 and G6 are selected, respectively, the same state is applied like when the gate line G2 is selected. When this frame ends, in a next frame, polarity inversion is further performed. That is, when the gate lines G1, G3, G5, and G7 are selected, respectively, pieces of display data with a negative polarity are transmitted to the data lines D1, D4, D5, D8, D9, D12, and D13, respectively, and pieces of display data with a positive polarity are transmitted to the data lines D2, D3, D6, D7, D10, and D11, respectively. Moreover, when the gate lines G2, G4, and G6 are selected, respectively, pieces of display data with a positive polarity are transmitted to the data lines D1, D4, D5, D8, D9, D12, and D13, respectively, and pieces of display data with a negative polarity are transmitted to the data lines D2, D3, D6, D7, D10, and D11, respectively.

Electrically connected to a storage capacitor electrode CS2 through the storage capacitor lines CS are pixels P11, P32, P31, P52, P51, P72, P71, P92, P91, P112, P111, and P132.

Regarding such a pixel group, the written pixels when the gate line G1 is selected are the pixels P11, P31, P51, P71, P91, and P111, and in a frame in the selected pixels, pixels where display data with a positive polarity is written are P11, P51, and P91, and pixels where display data with a negative polarity is written are P31, P71, and P111. Thereafter, in a next frame period, the pixels selected by the gate line G1 invert respective polarities. Hence, regarding writing of display data to respective pixels in a period in which a gate line G is selected, the common storage capacitor electrode CS2 is connected to not only pixels where display data with a positive polarity is written but also pixels where display data with a negative polarity is written, and display data with a positive polarity and display data with a negative polarity are written uniformly in a balanced manner.

As shown in FIG. 33, the polarities of respective pixels are arranged like a stripe where the same polarities are directed in the same oblique direction. In the present exemplary embodiment, the rubbing treatment direction at the TFT-substrate side is substantially parallel to the direction in which the pixels with the same polarity are arranged obliquely. A TN mode is applied as the liquid crystal driving technique, and the rubbing direction 70 at the TFT-substrate side and the rubbing direction 71 at the opposing-substrate-side are substantially orthogonal to each other. The liquid crystal molecules at the substrate boundary face are oriented so as to traverse the inclined side of a substantially trapezoidal pixel at a substantially right angle where pixels having the same polarity adjoin in the X axis direction.

The configuration of the present exemplary embodiment other than the above-explained configuration is same as that of the first exemplary embodiment.

In the present exemplary embodiment, when display data is written in each pixel in a scan period, the fluctuation of the potential of the storage capacitor line CS can be suppressed. This is because each storage capacitor line CS is connected to not only pixels where display data with a positive polarity is written but also pixels where display data with a negative polarity is written. Accordingly, it is possible to prevent the potential of the storage capacitor line CS to fluctuate toward a polarity at one side, and crosstalk generated in a direction in which the storage capacitor line CS extends can be reduced, thereby realizing a high-quality display. The configuration of the present exemplary embodiment can realize the two-line dot inversion effect and the potential fluctuation suppressing effect of each storage capacitor line CS while utilizing a general inversion driving technique, and can cause the pixels adjoining at the bottom portion of the trapezoidal aperture to have the same polarity. Hence, a high-quality image display can be realized at a low cost.

In the present exemplary embodiment, a direction in which the pixels with the same polarity are arranged and the rubbing direction 70 at the TFT-substrate side are substantially parallel to each other, and the liquid crystal molecules anchored in the substrate boundary face by the rubbing process are oriented across the inclined side of the trapezoid between the pixels with the same polarity. In the present exemplary embodiment, because the liquid crystal molecules are oriented across the inclined side of the trapezoid between the pixels with the same polarity, in comparison with an orientation across the inclined side between the pixels with different polarities, the energy is stable. Hence, a disclination and an orientation defect generated along the inclined side of the substantially trapezoidal pixel can be reduced, and thus a stable liquid crystal orientation state can be realized. By reducing the disclination, the width of the light blocking portion at the inclined side of the trapezoid can be reduced, and thus 3D crosstalk can be suppressed. Moreover, because the liquid crystal orientation state is stabilized, the reliability is improved.

<Tenth Exemplary Embodiment>

Figure 37:
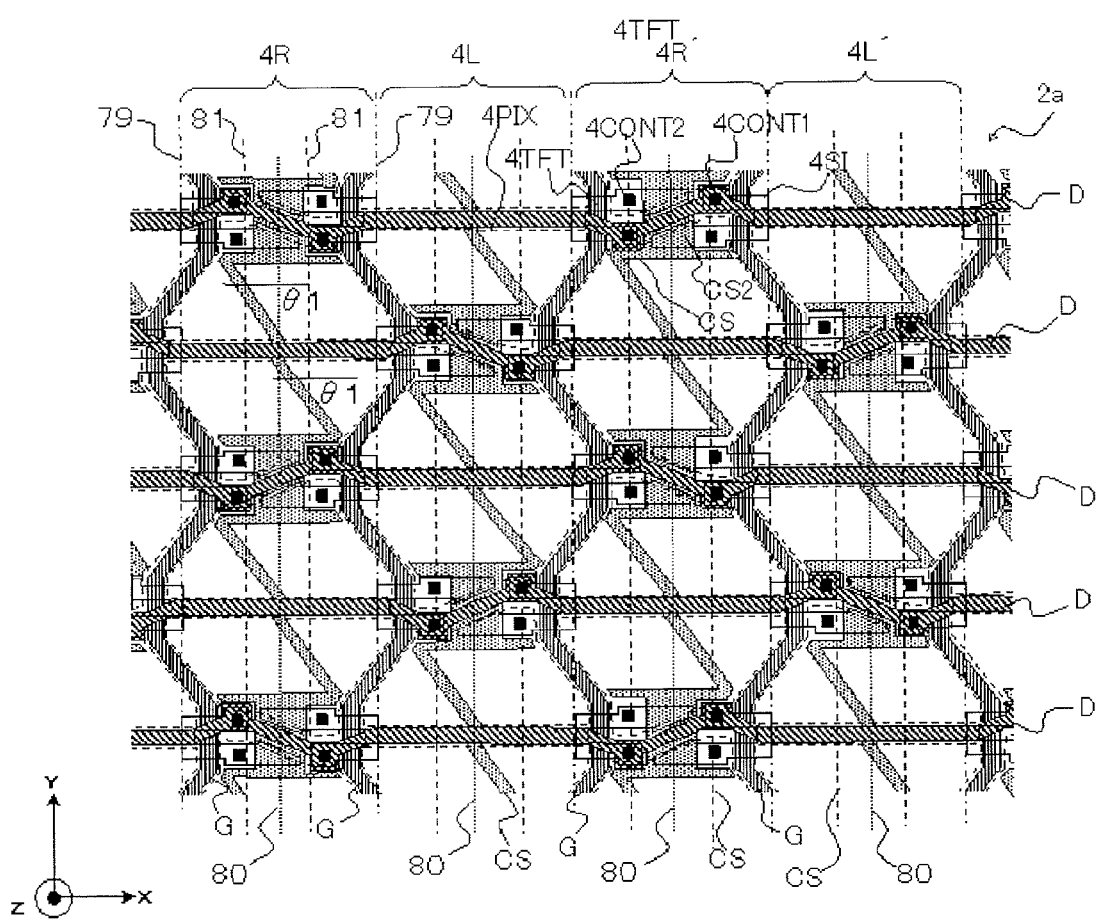
FIG. 37 is a plan view showing structures of some pixels on a TFT substrate side of an image display device according to a tenth exemplary embodiment of the present invention.
Figure 38:
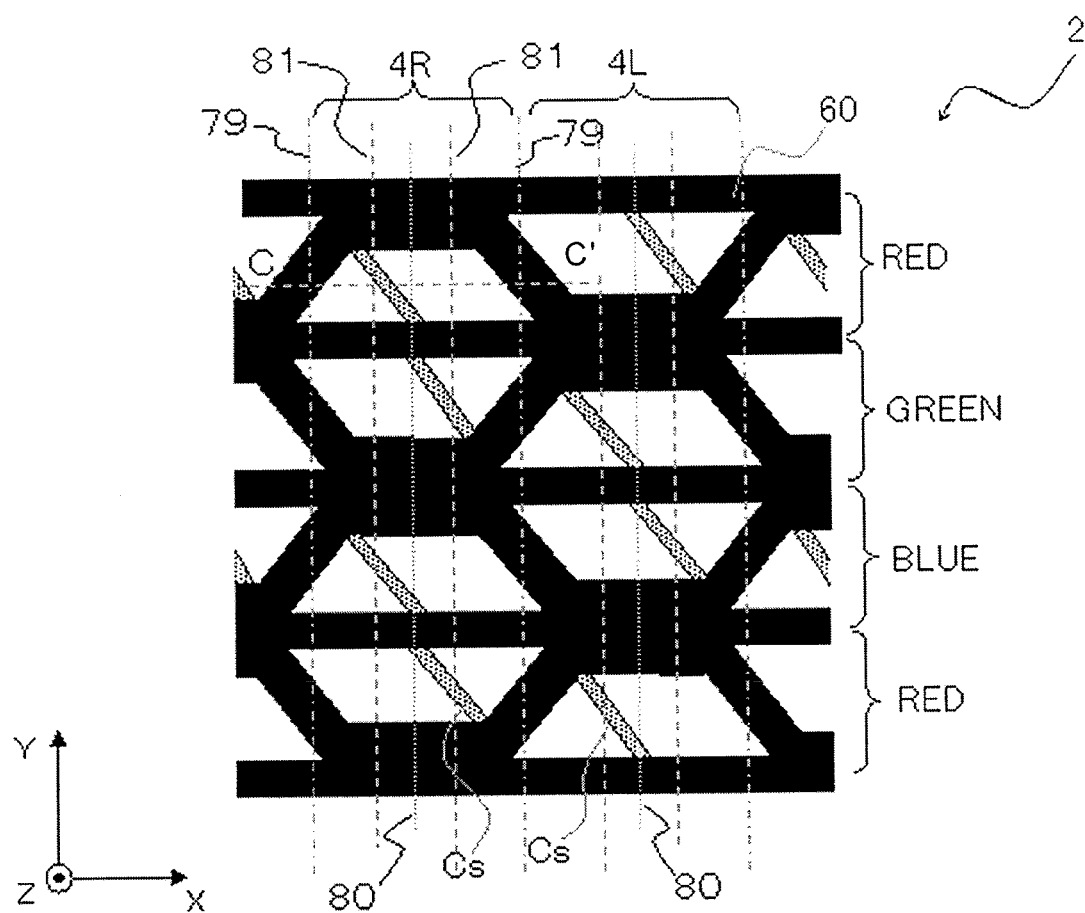
FIG. 38 is a plan view showing a pixel structure of the image display device according to the tenth exemplary embodiment of the present invention.
Figure 39:
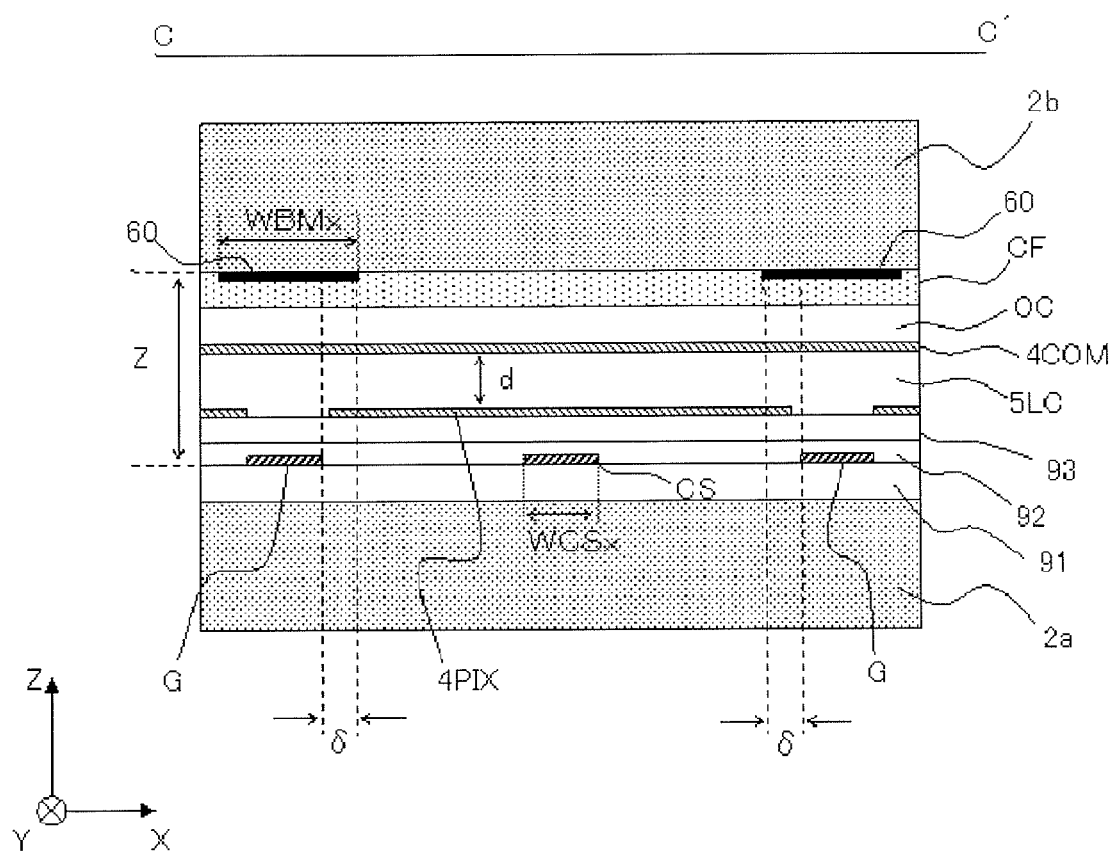
FIG. 39 is an exemplary diagram showing a cross section of the image display device according to the tenth exemplary embodiment of the present invention.
Figure 40:
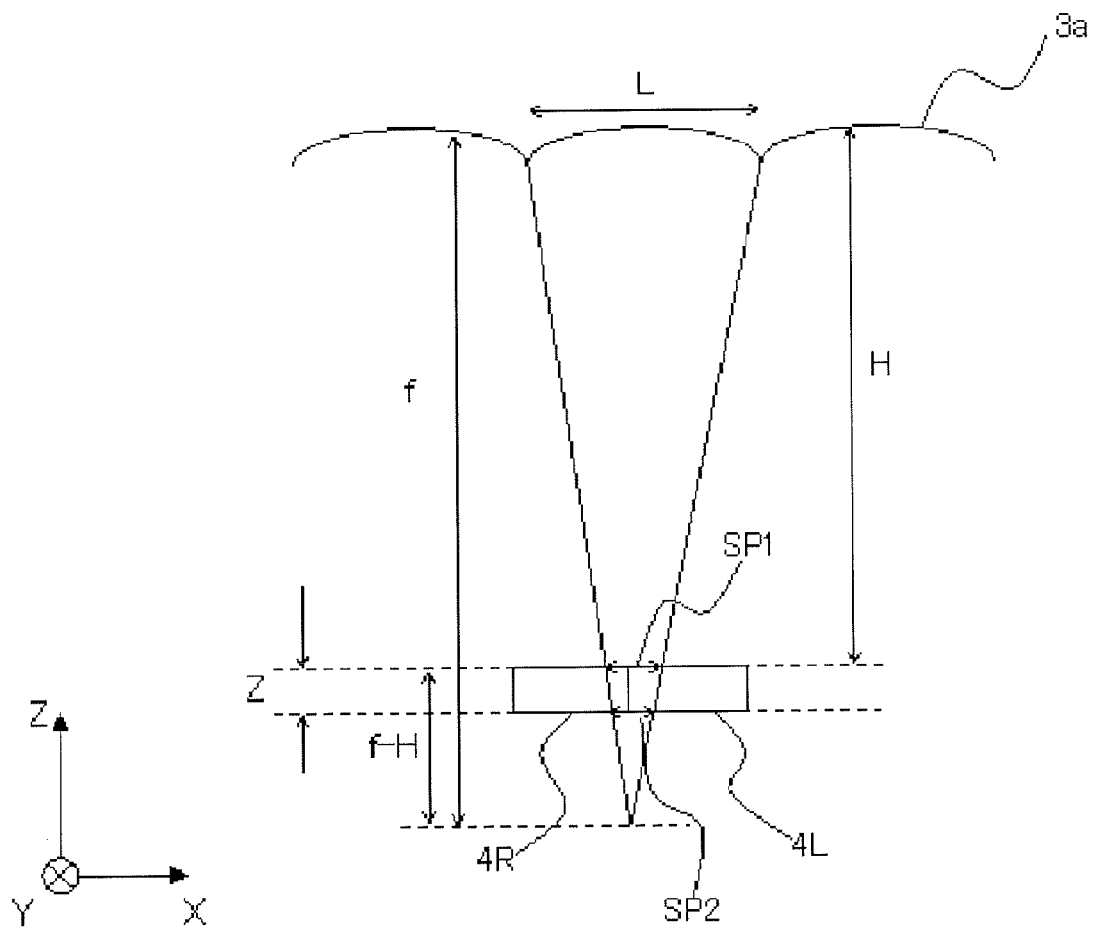
FIG. 40 is an exemplary diagram showing an optical model of the image display device according to the tenth exemplary embodiment of the present invention.

Next, a tenth exemplary embodiment of the present invention will be explained. FIG. 37 is a plan view showing a pixel structure of a part of an image display device at a TFT-substrate-2a side according to the present exemplary embodiment. FIG. 38 is a plan view showing a pixel of a display panel 2 according to the present exemplary embodiment. FIG. 39 is a cross-sectional view along a line C-C' in the plan view of FIG. 38. FIG. 40 is a cross-sectional view showing an optical model according to the present exemplary embodiment.

As shown in FIGS. 37 and 39, the display panel 2 has two visual points and has right-eye pixels 4R and left-eye pixels 4L alternately arranged in the image separating direction, i.e., the X axis direction. The aperture of a sub pixel is in a substantially trapezoidal shape, and sub pixels arranged side by side in the X axis direction have an aperture region where respective apertures of the sub pixels overlap in the Y axis direction and an aperture region where no aperture overlaps in the Y axis direction.

Virtual lines 79 each indicate a boundary between the sub pixels adjoining to each other in the image separating direction. With reference to this line segment, virtual lines 80 each of which evenly divides the sub pixel into two pieces in the image separating direction and virtual lines 81 each of which evenly divides the sub pixel into three pieces in the image separating direction are shown in the figure.

Gate lines G are arranged so as to be inclined in a different direction from the image separating direction across the virtual line 79. Moreover, storage capacitor electrode CS2 is arranged on the virtual line 80 and along it, and is symmetrical about a line relative to the virtual line 80. Storage capacitor lines CS of respective sub pixels configuring an adjoining pixel pair are electrically connected to the storage capacitor electrode CS2 at different regions having the virtual line 80 as a boundary.

A storage capacitor line CS is arranged at the aperture of each sub pixel, and is inclined in a different direction from the image separating direction. Moreover, the storage capacitor line CS is arranged so as to go over the two sub pixels adjoining to each other in the Y axis direction and across the virtual line 80 that evenly divides the sub pixel into two pieces in the X axis direction.

In respective apertures of the two sub pixels adjoining to each other in the Y axis direction, the storage capacitor line CS is arranged so as to selectively cross at least one virtual line 81 that evenly divides the sub pixel into three pieces in the X axis direction. In the sub pixels adjoining to each other in the Y axis direction, the storage capacitor line CS arranged at the aperture of each sub pixels is arranged so as to go over a different virtual line 81 between the two virtual lines 81 that evenly divide the sub pixel into three pieces in the X axis direction.

At a boundary between the sub pixels having the common trapezoid bottom, the storage capacitor line CS intersects with a data line D arranged at the bottom side of the trapezoid, and electrically connects adjoining pixel pairs together adjoining in the Y axis direction. The storage capacitor line CS is arranged so as to go over the virtual line 80 that evenly divides the sub pixel into two pieces in the image separating direction at the bottom side of the trapezoid, and is wired from a region between the two regions of the sub pixel divided in the image separating direction to another region with the data line D at the bottom side of the trapezoid being as a boundary. Moreover, the storage capacitor lines CS are successively arranged so that the vertical aperture ratio in the two sub pixels arranged side by side in the Y axis direction becomes substantially constant.

The storage capacitor line CS runs from the intersection between the upper bottom of the trapezoidal aperture and the inclined side thereof to the intersection between the lower bottom and the virtual line 80. Moreover, the storage capacitor line CS intersects, in a substantially linear manner, with the data line D running in the X axis direction.

In the aperture of the sub pixel, an angle between the direction in which the storage capacitor line CS runs and the X axis direction is set to be 81. The inclination direction of the storage capacitor line CS remains same between sub pixels each configuring the unit of display, and remains same between sub pixels configuring the adjoining pixel pair. That is, the storage capacitor line CS has an angle relative to the image separating direction which is the same angle at all in each sub pixel arranged in the X axis direction and in the Y axis direction.

In the two sub pixels configuring the adjoining pixel pair, storage capacitor lines CS arranged in respective sub pixels have the same angle relative to the image separating direction, and are arranged so as to go over respective virtual lines 81 different from each other between the two virtual lines 81 each dividing the sub pixel into three pieces in the image separating direction.

There are two kinds of adjoining pixel pairs due to a connection relationship of the pixel thin-film transistor 4TFT, and each adjoining pixel pair has a rotation symmetry axis equivalent relative to a rotation by 180 degrees around the Z axis.

Respective storage capacitor lines CS arranged in the right-eye pixel 4R and the left-eye pixel 4L configuring the unit of display are arranged so as to go over respective virtual lines 81 different from each other between the two virtual lines 81 each dividing the sub pixel into three pieces in the X axis direction. That is, in sub pixels configuring the unit of display, the storage capacitor lines CS arranged in respective sub pixels are inclined in the same direction, and arranged so as to go over respective virtual lines 81 relatively different from each other in respective sub pixels.

The storage capacitor lines CS arranged in two pixels adjoining to each other side by side in the Y axis direction are arranged so as to alternately go over virtual lines 81 different from each other between the two virtual lines 81 each dividing the sub pixel into three pieces in the X axis direction. The storage capacitor lines CS running across the common virtual line 81 are repeatedly arranged for each two sub pixels in the Y axis direction.

Pixels arranged in the X axis direction are arranged so as to alternately go over the virtual lines 81 at respective positions different from each other in the sub pixel between the two virtual lines 81 each dividing the sub pixel into three pieces in the X axis direction. The sub pixels which have the storage capacitor line CS going over the virtual line 81 at the relatively same position in the sub pixel are repeatedly arranged for each two sub pixels in the X axis direction.

As shown in FIG. 38, color filters of respective colors: red; blue; and green, run in the X axis direction, and are repeatedly arranged in the Y axis direction like stripes in the order of red, blue, and green.

The cycle of the pattern of a black matrix 60 and the cycle of the pattern of the storage capacitor line CS are repeated structural cycles for each two sub pixels. The color filter arrangement has color stripes of RGB arranged in a cycle of each three sub pixels. Hence, sub pixels arranged in the Y axis direction have the storage capacitor line CS and the black matrix 60 having the same structural cycle, and the color filter has a different structural cycle from those of the storage capacitor line CS and the black matrix 60.

As shown in FIG. 39, regarding the TFT substrate 2a, the gate line G and the storage capacitor line CS are formed of the metal material of the same layer provided on a first insulation film 91. Moreover, a pixel electrode 4PIX is formed of a transparent conductive material provided on a third insulation film 93. A second insulation film 92 is for electrically isolating the gate line G from the data line D, and a third insulation film 93 has the flat effect.

Regarding an opposing substrate 2b, the black matrix 60 is provided on the opposing substrate 2b at the liquid-crystal-layer-5LC side, and a color filter layer is provided at a further liquid-crystal-layer-5LC side from the black matrix 60. An overcoat OC is provided at a further liquid-crystal-layer-5LC side from the color filter layer, and the opposing electrode 4COM is provided at a further liquid-crystal-layer-5LC side from the overcoat OC.

As viewed from a viewer, the gate line G is covered by the black matrix 60. The inclined side of the substantially trapezoidal pixel is subjected to light blocking by the black matrix 60 and light emitted in the vicinity thereof is observed by the viewer. Moreover, the aperture is subjected to light blocking by the storage capacitor line CS and light emitted in the vicinity thereof is observed by the viewer.

Hence, the storage capacitor line CS arranged at the aperture and the black matrix 60 at the inclined side of the trapezoid function as different light blocking layers.

The covering level 67 of the gate line G and that of the black matrix 60 are set in accordance with the overlapping precision between the TFT substrate 2a and the opposing substrate 2b.

As shown in FIG. 40, the focal point of a lens 3a is located behind the light blocking portion formed by the storage capacitor line CS at the viewer side. In the vicinity of the black matrix 60, defocusing is performed at a spot size SP1, and in the vicinity of the storage capacitor line CS, defocusing is performed at a spot size SP2. The spot size SP1 is set to be larger than the spot size SP2.

The configuration and operation of the present exemplary embodiment other than the above-explained configuration and operation are same as those of the first exemplary embodiment.

According to the present exemplary embodiment, in comparison with the first exemplary embodiment, the area of wirings can be reduced by setting the angle θ1 between the storage capacitor line CS and the image separating direction to be large as explained above, so that the aperture ratio can be increased. Moreover, it is unnecessary to arrange the major part 10 of the storage capacitor line CS across the aperture and the area of an excess light blocking object can be reduced, so that the aperture ratio is further increased. Furthermore, the wiring length between the storage capacitor electrodes CS2 can be shortened, so that the wiring resistance can be reduced.

Moreover, according to the present exemplary embodiment, the storage capacitor lines CS are arranged so as to go over respective different virtual lines among the plurality of virtual lines each evenly dividing the sub pixel in the X axis direction, so the vertical aperture ratio is compensated among the plurality of sub pixels arranged in the Y axis direction and is made substantially constant in the image separating direction.

Furthermore, according to the present exemplary embodiment, the storage capacitor line CS is arranged so that the vertical aperture ratio becomes substantially constant between the two sub pixels adjoining to each other in the Y axis direction. Therefore, the aperture ratio can be increased while suppressing a fluctuation of the vertical aperture ratio. At the boundary between the sub pixels commonly arranged on the bottom side of the trapezoid in the Y axis direction, the data line D running substantially parallel to the image separating direction and the storage capacitor line CS inclined in a different direction from the image separating direction intersect with each other substantially linearly, so that the fluctuation of the vertical aperture originating from the pattern precision can be suppressed. Since the data line D and the storage capacitor line CS intersect with each other substantially linearly, the wiring capacitance can be reduced, and the load at the time of image data writing can be reduced.

As shown in FIG. 37, regarding the column of the right-eye pixels 4R and the column of the right-eye pixels 4W, sub pixels having the storage capacitor line CS arranged at relatively same position among the sub pixels are arranged side by side in the X axis direction. Moreover, regarding the column of the left-eye pixels 4L and the column of left-eye pixels 4L', the storage capacitor lines CS arranged at relatively same position among the sub pixels are arranged side by side in the X axis direction. That is, in each view point, the sub pixels arranged side by side in the X axis direction always have the same storage capacitor line CS shape repeatedly. Hence, the image quality in the image separating direction can be uniform on an image displayed on each view-point region.

It is difficult regarding a high-definition pixel to make the vertical aperture ratio substantially constant in the image separating direction because of the width of the inclined side of the trapezoid. Moreover, it is difficult for a high-definition pixel to increase a width WBMx of the black matrix 60 in the X axis direction, and when engagement of the TFT substrate 2a and the opposing substrate 2b is slightly misaligned, the gate line G goes out, resulting in a fluctuation of the vertical aperture ratio at the inclined side of the trapezoid. Moreover, in the vicinity of the boundary between the black matrix 60 and the sub pixel aperture, it is difficult to control orientation of the liquid crystal molecules because of an electric field generated between the pixel electrode 4PIX and the gate line G, so that light leakage often occurs, and when such leaked light is enlarged by the lens, it is visually recognized as a brightness fluctuation, and thus the image quality is deteriorated. Hence, 3D moire originating from light leakage and the fluctuation of the vertical aperture ratio is likely to occur in the vicinity of the black matrix 60.

The spot size SP2 is larger than the spot size SP1, so that the brightness fluctuation of light distributed in the image separating direction by the image separating unit can be made more uniform. As explained above, 3D moire originating from the production process is likely to occur in the vicinity of the black matrix 60, so that if the proximity of the black matrix 60 is defocused effectively, the production margin can be increased. This results in improvement of the yield and reduction of cost. As explained above, the image display device of the present exemplary embodiment is especially effective to high-definition pixels.

<Modified Example of Tenth Exemplary Embodiment>

Figure 41:
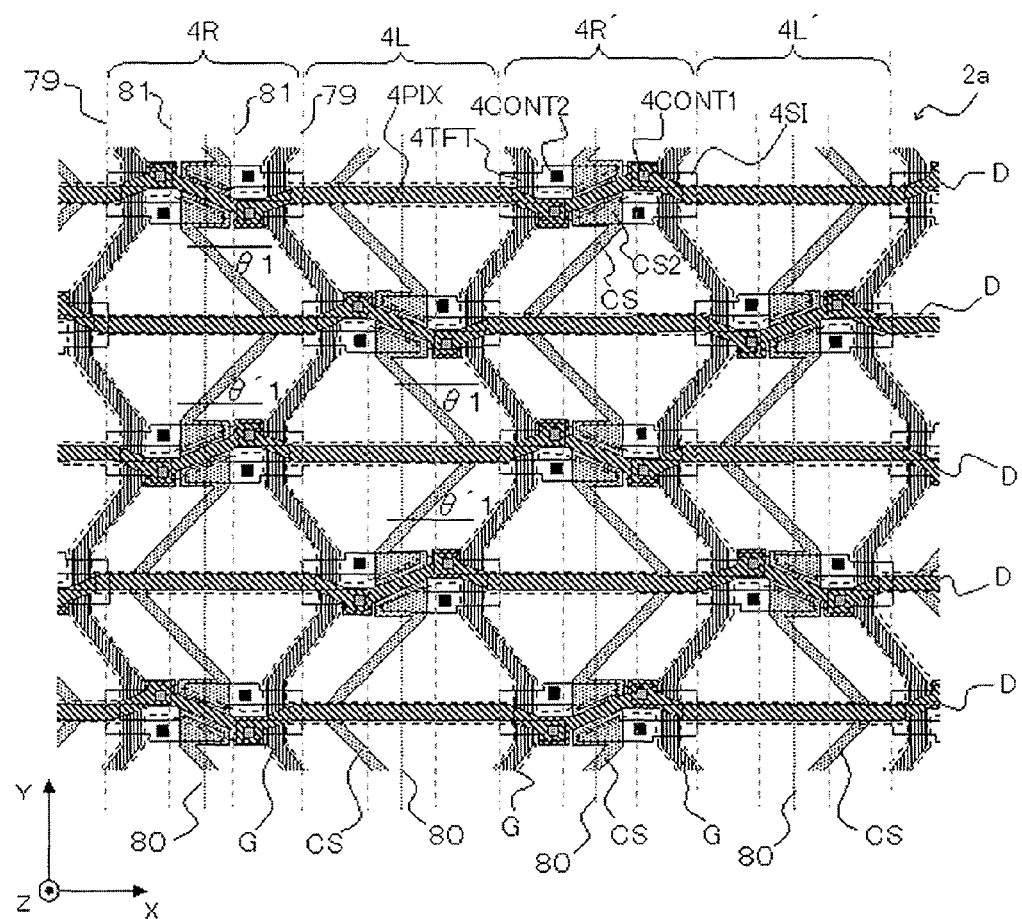
FIG. 41 is a plan view showing structures of some pixels on a TFT substrate side of an image display device according to a first modified example of the tenth exemplary embodiment of the present invention.
Figure 42:
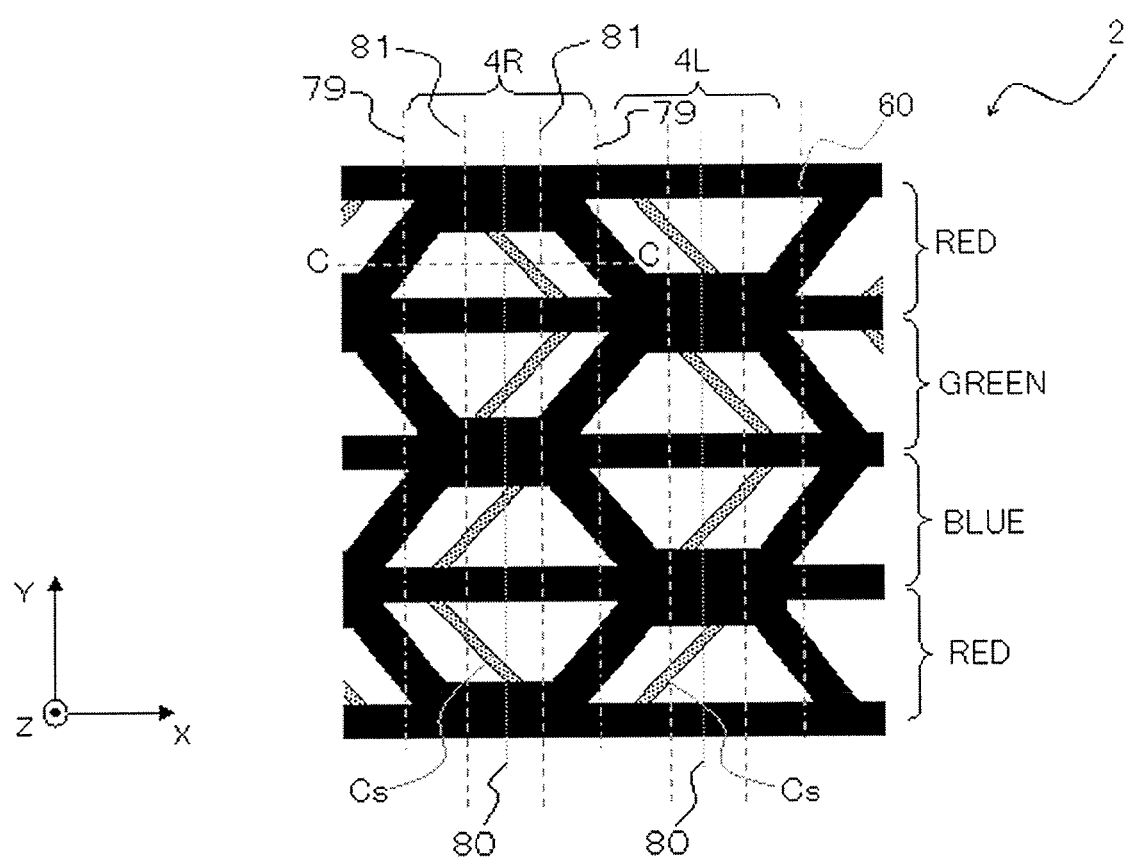
FIG. 42 is a plan view showing a pixel structure of an image display device according to the first modified example of the tenth exemplary embodiment of the present invention.
Figure 43:
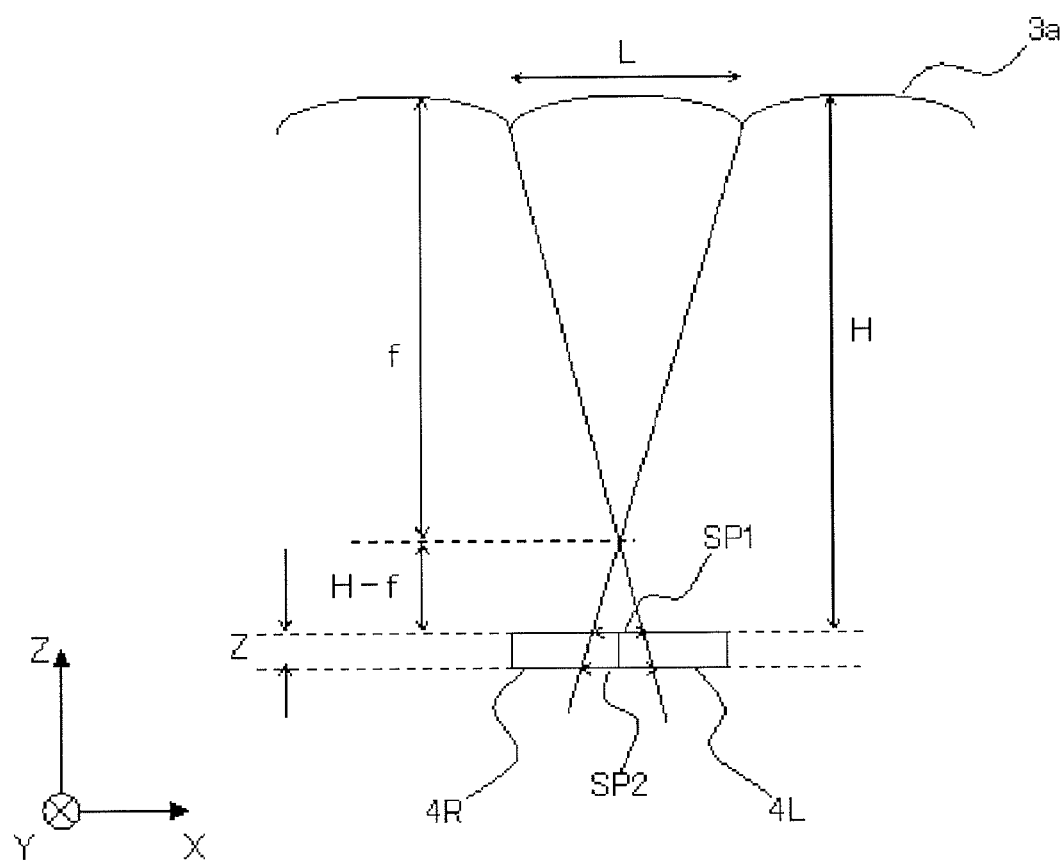
FIG. 43 is an exemplary diagram showing an optical model of the image display device according to the first modified example of the tenth exemplary embodiment of the present invention.

Next, a first modified example of the tenth exemplary embodiment of the present invention will be explained. FIG. 41 is a plan view showing a pixel structure of a part of an image display device at a TFT-substrate-2a side according to this modified example. FIG. 42 is a plan view showing a pixel of a display panel according to this modified example. FIG. 39 is a cross-sectional view along a line C-C' in the pixel plan view of FIG. 42. FIG. 43 is a cross-sectional view showing an optical model according to this modified example.

As shown in FIG. 41, a storage capacitor line CS is wired so as to run from the center of the upper bottom of the trapezoid to a region other than the center of the lower bottom of the trapezoid. The storage capacitor line CS is bent at a location other than the center of the bottom of the trapezoid, and intersects with a data line D. Storage capacitor electrodes CS2 are arranged along a virtual line 80 that is a center line of a sub pixel and each are in a rectangular shape axisymmetrical relative to the virtual line 80.

The storage capacitor line CS has at least two kinds of inclination angles that are set to be θ1, θ'1 relative to the X axis direction. The storage capacitor lines CS of sub pixels arranged in the Y axis direction have a different inclination direction for each two pixels, and the storage capacitor lines CS of sub pixels arranged in the X axis direction have a different inclination direction for each two pixels.

In sub pixels configuring an adjoining pixel pair, the storage capacitor lines CS arranged in respective sub pixels incline in the same directions from each other, and go over respective virtual lines 81 different from each other. There are two kinds of adjoining pixel pairs having different inclination directions of the storage capacitor lines CS, and respective adjoining pixel pairs are alternately arranged in the Y axis direction. As a result, sub pixels having the same inclination direction and having the storage capacitor lines CS going over the common virtual line 81 are arranged repeatedly for each four sub pixels.

Adjoining pixel pairs having different inclination directions of the storage capacitor line CS each have a rotation symmetry axis equivalent to a rotation by 180 degrees around the Z axis, and are axisymmetrical relative to the virtual line 80.

In sub pixels configuring the unit of display, the storage capacitor lines CS arranged in respective sub pixels are arranged so as to go over respective different virtual lines 81 between the two virtual lines 81 each evenly dividing the sub pixel into three pieces in the X axis direction. That is, sub pixels having the storage capacitor line CS going over relatively same virtual line 81 through the sub pixels are repeatedly arranged in the X axis direction for each two sub pixels.

In the present modified example, as shown in FIG. 43, the focal point of a cylindrical lens 3a is located at the viewer side relative to a left-eye pixel 4L and a right-eye pixel 4R. A spot size SP2 is set to be larger than a spot size SP1. Defocusing is performed at the spot size SP1 in the vicinity of a black matrix 60, and defocusing is performed at the spot size SP2 in the vicinity of the storage capacitor line CS. That is, it is configured that a region where the storage capacitor line CS is arranged is largely blurred than a region where the black matrix 60 is arranged.

The configuration and operation of the present modified embodiment other than the above-explained configuration and operation are same as those of the tenth exemplary embodiment.

In the present modified example, the storage capacitor line CS is connected to the storage capacitor electrode CS2 at substantially center of the upper bottom of the trapezoid, and runs from substantially center of the upper bottom to an intersection between the lower bottom and an inclined side. As a result, the area of the storage capacitor line CS arranged so as to surround two pixel thin-film transistors 4TFT forming the adjoining pixel pair can be reduced, and thus the aperture ratio can be increased by what corresponds to such area reduction.

At the upper bottom of the substantially trapezoidal pixel, a region where the storage capacitor line CS and the storage capacitor electrode CS2 intersect with each other at a sharp angle has a small space for a sharp-angle portion, so that the fluctuation of the vertical aperture ratio originating from the forming precision of the wiring patterns occurs and is likely to cause 3D moire. At a region where the storage capacitor line CS is arranged, the defocusing effect largely acts, and the brightness distribution in a direction in which light is distributed can be made more uniform.

The proximity of the center of the sub pixel is a region where the view point of the viewer is very likely to be arranged when it is enlarged and projected on a viewing plane by the image separating unit like a lens. Hence, by making the brightness distribution corresponding to this region blurred effectively and by making the blurred brightness distribution uniform, the image quality can be improved.

Since the spot size SP2 is larger than the spot size SP1, the defocusing effect is large. Hence, the defocus effect largely acts at the storage capacitor-line-CS portion, and thus the brightness distribution in the image separating direction is made more uniform. Accordingly, it is possible to reduce occurrence of 3D moire originating from the shape of the storage capacitor line CS. In particular, when the vertical aperture width is compensated for each two pixels like the present modified example, it is noticeably effective since the vertical aperture at the center of the sub pixel is likely to fluctuate due to the forming precision of the production process.

When it is viewed at the optimum viewing distance OD, the storage capacitor line CS is largely defocused, and the brightness distribution of light distributed by the image separating unit is made uniform. Conversely, the defocusing effect is small at the inclined side of the trapezoid subjected to light blocking by the black matrix 60, i.e., a boundary region between the sub pixels, and the separating performance by a lenticular lens 3 is good. Hence, a crosstalk between view points can be reduced, while at the same time, the brightness fluctuation originating from the storage capacitor line CS is effectively reduced, and thus the stereoscopic image quality is improved.

The black matrix 60 may be provided on the opposing substrate 2b at the viewer side. By increasing the distance between the storage capacitor line CS and the black matrix 60, the difference between the spot size SP1 in the vicinity of the black matrix 60 and the spot size SP2 in the vicinity of the storage capacitor line CS can be increased, so that the difference in the defocusing level can be increased.

The number of storage capacitor line CS arranged in a sub pixel is not limited to one, and K number of storage capacitor line CS may be arranged in a sub pixel. The K number of storage capacitor lines CS inclined in different directions from the image separating direction may be arranged at the aperture of each sub pixel. The storage capacitor lines CS are arranged at respective apertures of L number of sub pixels arranged in the direction orthogonal to the image separating direction so as to selectively go over at least one virtual line among the virtual lines each evenly dividing the aperture into (K+L) number of pieces in the image separating direction. In the K number of sub pixels arranged in the Y axis direction, the storage capacitor lines CS at respective apertures are arranged so as to go over respective different virtual lines, so that it is apparent that the same effect as one explained above can be obtained.

<Eleventh Exemplary Embodiment>

Figure 44:
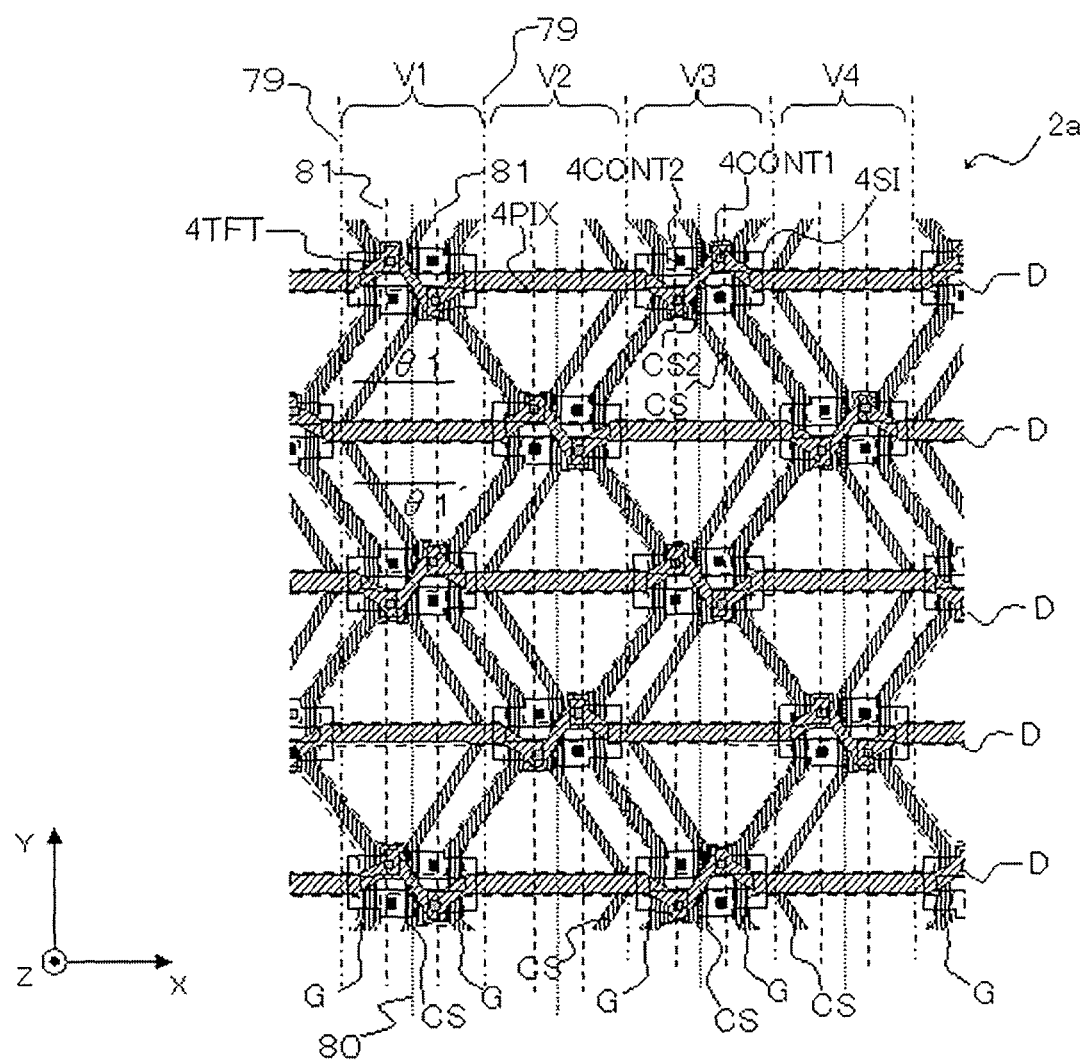
FIG. 44 is a plan view showing structures of some pixels on a TFT substrate side of an image display device according to an eleventh exemplary embodiment of the present invention.
Figure 45:
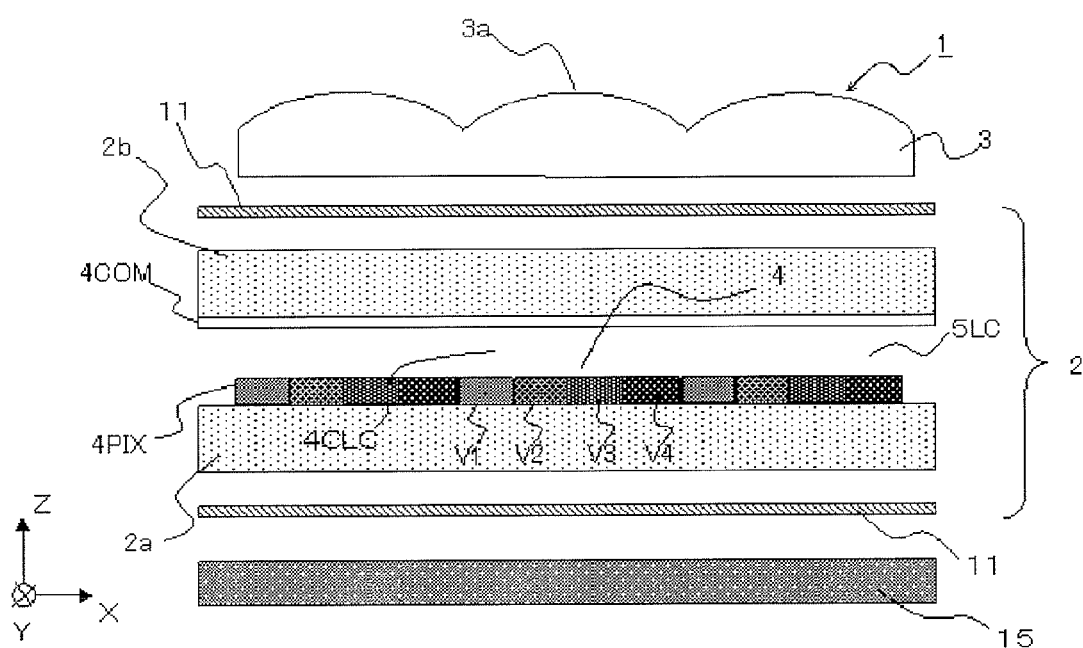
FIG. 45 is an exemplary diagram showing a cross section of the image display device according to the eleventh exemplary embodiment of the present invention.
Figure 46:
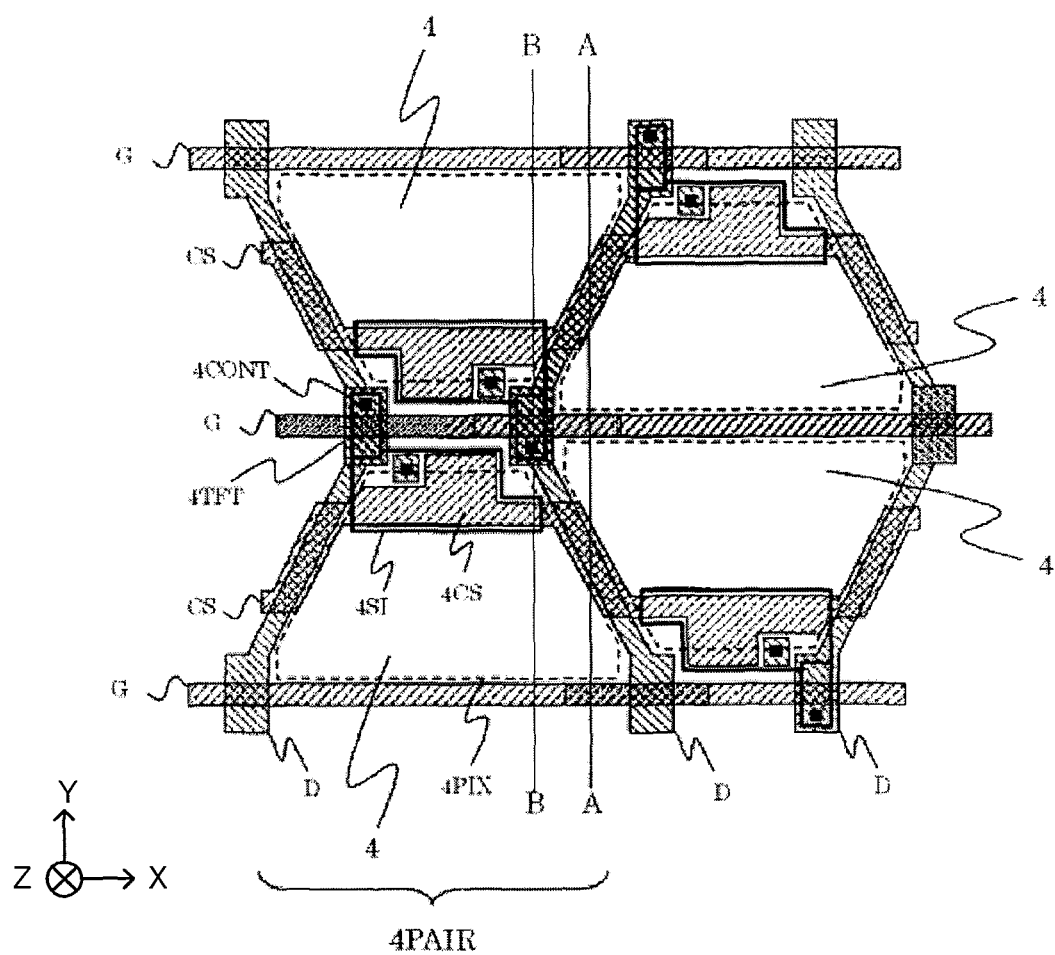
FIG. 46 is a plan view showing a display panel of a conventional image display device.
Figure 47:
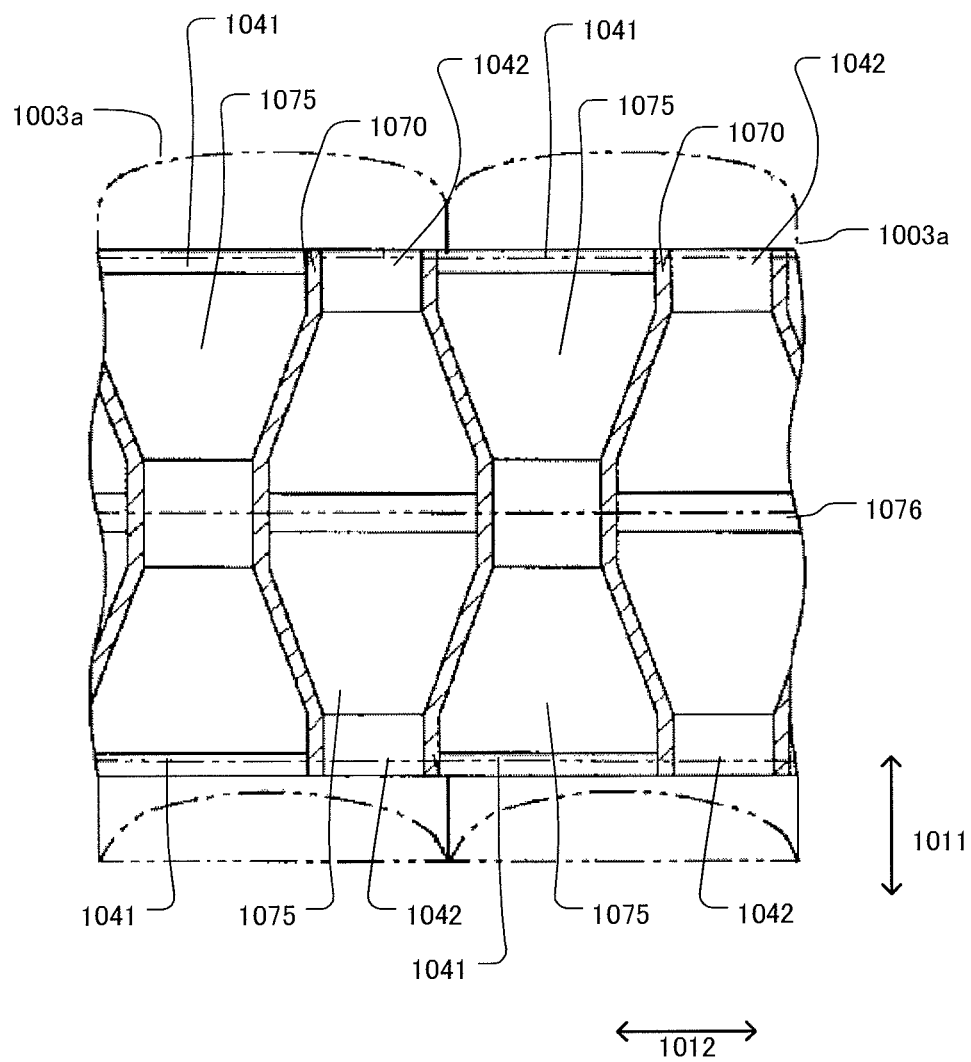
FIG. 47 is a plan view showing a display panel of a conventional image display device.

Next, an explanation will be given of an eleventh exemplary embodiment of the present invention. FIG. 44 is a plan view showing a pixel structure of a part of an image display device at a TFT-substrate-2a side according to the present exemplary embodiment of the present invention. FIG. 45 is a cross-sectional view showing the image display device according to the present exemplary embodiment.

As shown in FIG. 44, a display panel 2 is a stereoscopic display panel having four view points and including a pixel for displaying an image for a first view point, a pixel for displaying an image for a second view point, a pixel for displaying an image for a third view point, and a pixel for displaying an image for a fourth view point. As shown in FIG. 44, a first-view-point pixel V1, a second-view-point pixel V2, a third-view-point pixel V3, and a fourth-view-point pixel V4 are arranged in the X axis direction, and four sub pixels configure the "unit of display".

As shown in FIG. 45, a lenticular lens 3 that is the image separating unit is arranged in accordance with unit of display, i.e., the first-view-point pixel V1, the second-view-point pixel V2, the third-view-point pixel V3, and the fourth-view-point pixel V4. The pixel aperture has a shape such that the width of the upper bottom in the X direction becomes small, and such a shape is a trapezoid close to a triangle.

Storage capacitor electrodes CS2 are arranged along a virtual line 80 that is a center line of a sub pixel, and each are in a rectangular shape axisymmetric relative to the virtual line 80. A storage capacitor line CS runs from the center of the upper bottom of the trapezoid to a region other than the center of the lower bottom of the trapezoid. The storage capacitor electrode CS2 and the storage capacitor line CS are bent and connected together at the upper bottom of the substantially trapezoidal pixel. In the vicinity of the lower bottom side of the substantially trapezoidal pixel, i.e., in the vicinity of a data line D running in the X axis direction, the storage capacitor line CS is bent and connected to an adjoining pixel in the Y axis direction.

The storage capacitor lines CS in respective sub pixels of an adjoining pixel pair are inclined in the same directions, respectively, and arranged so as to go over respective different virtual lines 81. There are two kinds of adjoining pixel pairs having different inclination directions of the storage capacitor line CS, and respective kinds are alternately arranged in the Y axis direction. As a result, in the sub pixels arranged in the X axis direction and in the Y axis direction, the sub pixels having the same inclination direction and having the storage capacitor line CS going over the common virtual line 81 are repeatedly arranged for each four sub pixels.

The display panel 2 employs a configuration in which the storage capacitor lines CS in respective sub pixels of an adjoining pixel pair are inclined in the same direction and the adjoining pixel pairs adjoining to each other in the Y axis direction have different inclination directions of the storage capacitor lines CS.

The sub pixels arranged in the X axis direction are arranged so as to go over respective virtual lines 81 relatively different from each other through the sub pixels between the two virtual lines 81 each evenly dividing the sub pixel into three pieces in the X axis direction. The sub pixels having the storage capacitor line CS going over the same virtual line 81 through the sub pixels are repeatedly arranged in the X axis direction for each two sub pixels.

In the sub pixels each configuring the unit of display, the sub pixels corresponding to respective view points have four kinds of patterns which are different from one another and are combinations of two kinds of inclination directions of the storage capacitor lines CS relative to the image separating direction and two kinds of arrangements of the storage capacitor lines CS going over any one of the two virtual lines 81 in the sub pixel.

The sub pixel, the first-view-point pixel V1, the second-view-point pixel V2, the third-view-point pixel V3, and the fourth-view-point pixel V4 configuring the unit of display have respective arrangements of the storage capacitor line CS different from one another. Moreover, the units of display adjoining in the Y axis direction have the sub pixels having the same storage capacitor-line-CS pattern and arranged for each sub pixel in the X axis direction. As a result, the four sub pixels successively arranged in the Y axis direction have arrangement patterns of the storage capacitor line CS different from one another.

The configuration and operation of the present exemplary embodiment other than the above-explained configuration and operation are same as those of the first exemplary embodiment.

In the present exemplary embodiment, parallax images corresponding to four view points are displayed for respective view points, so that an image having a better realistic sensation can be displayed. Moreover, since it is possible to display a stereoscopic image with stereoscopic information optimized for each view point being added to such an image, in comparison with the above-explained image display devices with two view points, the range where a stereoscopic image can be visually recognized can be expanded.

Moreover, in the present exemplary embodiment, in the sub pixels for respective view points configuring the unit of display, the arrangements of the storage capacitor line CS have different patterns, and are dispersed relative to the image separating direction in which cylindrical lenses 3a are arranged side by side. Accordingly, the frequency of the storage capacitor line CS in a pixel can be reduced, and thus moire interference stripes originating from the arrangement cycle of the image separating unit can be suppressed.

Furthermore, in the present exemplary embodiment, the four sub pixels successively arranged in the Y axis direction have arrangements of the storage capacitor line CS different from one another, and dispersed in the direction vertical to the image separating direction. Hence, emitted light scattered by the storage capacitor line CS can be dispersed, and brightness varying and moire interference stripes can be reduced. In particular, the boundary between respective sub pixels is a region which is very likely to cause the viewer to feel strangeness when enlarged and projected on a viewing plane by the image separating unit like a lens. Accordingly, the arrangement pattern of the storage capacitor line CS corresponding to this region is dispersed in order to improve the image quality.

According to the multi-view-point scheme having view points equal to or greater than three like the present exemplary embodiment, when an image of a view point leaks in an image of an adjoining view point, it may be defined as a crosstalk prescribed between the images in some cases, and this is referred to as an "inter-image crosstalk". In the case of the two view points as explained in the first exemplary embodiment, a "3D crosstalk" and an "inter-image crosstalk" prescribed by both eyes are same, and it is desirable that both should be reduced as much as possible. Conversely, in the case of the multi view points equal to or greater than three, the presence of an "inter-image crosstalk" brings about duplication of images, but can give a smooth motional parallax, so that it is not always true that such a phenomenon is reduced as much as possible.

The display panel 2 can be applied to not only an image display device with four view points but also image display devices with equal to or greater three view points, N number of view points. By displaying parallax images corresponding to N number of view points on respective view points, an image with a better realistic sensation can be displayed. Moreover, in the case of a stereoscopic display panel with N number of view points, a stereoscopic image can be displayed with stereoscopic information optimized for each view point being added to such an image, so that a range where a stereoscopic image can be visually recognized can be expanded.

In the sub pixels of respective view points configuring the unit of display for N number of view points, respective arrangement patterns of the storage capacitor line CS are different from one another and the combination of such different patterns is arranged in the unit of display adjoining in the Y axis direction and is shifted in the X axis direction by a sub pixel.

The image display device with N number of view points may employ a configuration in which K number of storage capacitor lines CS are arranged in a sub pixel. Moreover, those storage capacitor lines CS may have at least two kinds of inclination direction different from the image separating direction, and the storage capacitor line CS may be arranged in respective apertures of L number of sub pixels arranged in the direction vertical to the image separating direction so as to selectively go over at least one of a plurality of virtual lines each evenly dividing the aperture into (K+L) pieces in the image separating direction. Furthermore, N kinds of arrangement patterns of the storage capacitor line CS may be configured by combining the storage capacitor line CS selectively going over a virtual line and the inclination direction of the storage capacitor line CS, and respective sub pixels corresponding to respective view points in the unit of display may have arrangement patterns of the storage capacitor line CS different from one another.

The present invention can be changed and modified in various forms without departing from the broad scope and spirit of the present invention. Moreover, the above-explained exemplary embodiments are for explaining the present invention and not for limiting the scope and spirit of the present invention. That is, the scope and spirit of the present invention are indicated by appended claims rather than the exemplary embodiments. Various changes and modifications within the scope and spirit of the present invention and equivalent thereto should be within the scope and spirit of the present invention.

Some of or all of the above-explained exemplary embodiments can be expressed like following supplementary notes, but the present invention is not limited to the following supplementary notes.

<Supplementary Note 1>

An image display device comprises: a display element including a plurality of units of display each comprising at least a sub pixel that displays an image for a first view point and a sub pixel that displays an image for a second view point; and an optical unit that distributes lights emitted from respective sub pixels of the display element into different directions, in which when it is defined that a direction in which light is distributed is a first direction, a direction orthogonal to the first direction is a second direction, and a region surrounded by a data line, a gate line and a storage capacitor electrode in the sub pixel is an aperture, an arrangement of the sub pixels in the display element is formed by a base unit that is an adjoining pixel pair including two sub pixels arranged with a data line being present therebetween, the adjoining pixel pairs are arranged along the second direction so as to adjoin to each other, the two sub pixels have respective switching elements commonly connected to the data line present between the two sub pixels and controlled by different gate lines, one electrode of the switching element forms the storage capacitor electrode and a capacitor, the storage capacitor electrode is arranged at least at a boundary region between the sub pixels of the adjoining pixel pair, and when it is presumed that there are virtual lines each parallel to the second direction and evenly dividing a width of the sub pixel in the first direction into K+1 pieces, K number of storage capacitor lines electrically connected to the storage capacitor electrode are each arranged so as to go over at least one of the virtual lines.

<Supplementary Note 2>

According to the image display device of the supplementary note 1, the storage capacitor line is inclined in a different direction from the first direction and is arranged so as to divide the aperture into K+1 regions.

<Supplementary Note 3>

According to the image display device of the supplementary note 2, the storage capacitor line arranged in the aperture is inclined in a different direction from the first and second directions and traverses a center line passing through a center of the aperture and parallel to the second direction.

<Supplemental Note 4>

According to the image display device of any one of the supplementary notes 1 to 3, the storage capacitor electrode is arranged across a boundary region between the sub pixels of the adjoining pixel pair, and is formed of a same metal film of the storage capacitor line and at a same layer thereof.

<Supplemental Note 5>

According to the image display device of the supplementary note 4, the adjoining pixel pairs adjoining to each other in a direction in which the data line runs are arranged so as to be connected to respective data lines different from each other.

<Supplemental note 6>

According to the image display device of the supplementary note 5, an inclination angle of the storage capacitor line relative to the first direction is an angle which makes a ratio of an aperture in the first direction substantially constant.

<Supplemental Note 7>

According to the image display device of the supplementary note 6, an inclination angle of the gate line in the sub pixel and an inclination angle of the storage capacitor line therein are different from each other.

<Supplemental note 8>

According to the image display device of the supplementary note 7, the gate line and the storage capacitor line are formed of a same material, and are formed through a same process.

<Supplemental note 9>

According to the image display device of the supplementary note 6, the switching elements in the adjoining pixel pair and for operating respective pixels of the adjoining pixel pair are arranged in a direction parallel to the first direction.

<Supplemental Note 10>

According to the image display device of the supplementary note 7, the data line is arranged at an upper layer of the storage capacitor electrode so as to be inclined in a different direction from the first direction, and the data line is arranged at an upper layer of the switching element so as to be inclined in a different direction from the first direction.

<Supplemental note 11>

According to the image display device of the supplementary note 10, respective pixels of the adjoining pixel pair are arranged so as to be symmetric around a point in the adjoining pixel pair.

<Supplemental note 12>

According to the image display device of the supplementary note 11, a region of the aperture of the pixel is in a substantially trapezoidal shape, and the switching element of the pixel is arranged at an upper bottom of a substantially trapezoidal display region of the pixel.

<Supplemental note 13>

According to the image display device of the supplementary note 5, the sub pixel is a pixel in a substantially octagonal shape, that octagonal shape being defined by cutting and dividing a substantially trapezoidal pixel by a virtual section line interconnecting an upper bottom of a trapezoid and a lower bottom thereof into two right trapezoids, and by joining cut portions of the two right trapezoids with the two right trapezoids being shifted relative to each other in the first direction and in the second direction by a predetermined size, the storage capacitor line is arranged so as to traverse the section line of the substantially octagonal pixel, the switching elements of the adjoining pixel pair are arranged in a different direction from the first direction so as to adjoin to each other, and a width of the storage capacitor line is smaller than a width of the gate line.

<Supplemental note 14>

According to the image display device of the supplementary note 12 or 13, a pixel electrode that is electrically connected to the switching element is formed at an upper layer of the storage capacitor line.

<Supplemental note 15>

An image display device comprises: a display element including a plurality of units of display each comprising at least a sub pixel that displays an image for a first view point and a sub pixel that displays an image for a second view point; and an optical unit that distributes lights emitted from respective sub pixels of the display element into different directions, in which when it is defined that a direction in which light is distributed is a first direction, a direction orthogonal to the first direction is a second direction, and a region surrounded by a black matrix in the sub pixel is an aperture, an arrangement of the sub pixels in the display element is formed by a base unit that is an adjoining pixel pair including two sub pixels arranged with a data line being present therebetween, the adjoining pixel pairs are arranged along the second direction so as to adjoin to each other, the two sub pixels have respective switching elements commonly connected to the data line present between the two sub pixels and controlled by different gate lines, one electrode of the switching element forms a storage capacitor electrode and a capacitor, the storage capacitor electrode being arranged at least at a boundary region between the sub pixels of the adjoining pixel pair, and when it is presumed that there are virtual lines each parallel to the second direction and evenly dividing a width of the sub pixel in the first direction into K+1 pieces, K number of storage capacitor lines electrically connected to the storage capacitor electrode are each arranged so as to go over at least one of the virtual lines.

<Supplemental note 16>

According to the image display device of the supplementary note 15, the storage capacitor line is inclined in a different direction from the first direction and is arranged so as to divide the aperture into K+1 regions.

<Supplemental note 17>

According to the image display device of the supplementary note 16, the storage capacitor line arranged in the aperture is inclined in a different direction from the first and second directions and traverses a center line passing through a center of the aperture and parallel to the second direction.

<Supplemental note 18>

According to the image display device of the supplementary note 15, the storage capacitor electrode is arranged across a boundary region of the sub pixels of the adjoining pixel pair, and is formed of a same metal film as a metal film of the storage capacitor line and at a same layer thereof.

<Supplemental note 19>

According to the image display device of the supplementary note 15, the black matrix is arranged so as to cover at least a part of the gate line, and an inclination angle of the black matrix in the sub pixel and an inclination angle of the storage capacitor line are different from each other.

<Supplemental note 20>

According to the image display device of the supplementary note 15, the storage capacitor line runs across the sub pixels adjoining to each other in the second direction, and is arranged so as to go over a virtual line which is parallel to the first direction and which passes through the center of the sub pixel.

<Supplemental note 21>

According to the image display device of the supplementary note 20, the inclination angle of the storage capacitor line relative to the first direction is equal in each of the sub pixels.

<Supplemental note 22>

According to the image display device of the supplementary note 20 or 21, the sub pixels having the storage capacitor line arranged therein and going over the common virtual line are repeatedly arranged in the second direction for each two sub pixels.

<Supplemental note 23>

According to the image display device of any one of the supplementary notes 1 to 22, the display element further includes a sub pixel for a third view point and a sub pixel for a fourth view point, the storage capacitor lines arranged in the sub pixels configuring the adjoining pixel pair are inclined in the same direction relative to the second direction, go over respective virtual lines different from each other, and have a different inclination direction from the inclination direction of the storage capacitor line arranged in the sub pixel configuring another adjoining pixel pair adjoining in the second direction, and the sub pixels having the storage capacitor line arranged therein and going over the common virtual line are repeatedly arranged in the first direction and in the second direction for each four sub pixels.

<Supplemental note 24>

According to the image display device of any one of the supplementary notes 1 to 23, the focal point of the optical unit is set to be shifted from the upper layer of the display element.

<Supplemental note 25>

According to the image display device of any one of the supplementary notes 1 to 23, the focal point of the optical unit is set to be shifted from the lower layer of the display element.

<Supplemental note 26>

A terminal device comprises the image display device of any one of the supplementary notes 1 to 25.

<Supplemental note 27>

A driving method of an image display device of any one of the supplementary notes 1 to 25, comprises steps of: scanning the gate line one by one; inverting a voltage polarity of each pixel for each gate line; and inverting the polarity of display data transmitted through each data line for each data line.

<Supplemental note 28>

According to the driving method of the image display device of the supplementary note 27, an inclination direction of the storage capacitor line is set in accordance with a period of inversion of the voltage polarity.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. An image display device comprising:
    a display element including a plurality of units of display each comprising at least a sub pixel that displays an image for a first view point and a sub pixel that displays an image for a second view point; and an optical unit that distributes light emitted from respective sub pixels of the display element into different directions, wherein
when it is defined that a direction in which light is distributed is a first direction, a direction orthogonal to the first direction is a second direction, and a region surrounded by a black matrix in the sub pixel is an aperture,
an arrangement of the sub pixels in the display element is formed by a base unit that is an adjoining pixel pair including two sub pixels arranged with a data line being present therebetween,
the adjoining pixel pairs are arranged along the second direction so as to adjoin to each other,
the two sub pixels of the adjoining pixel pair have respective switching elements commonly connected to the data line present between the two sub pixels and controlled by different gate lines,
one electrode of the respective switching elements and a storage capacitor electrode form a storage capacitor, the storage capacitor electrode being arranged at least at a boundary region between the sub pixels of the adjoining pixel pair,
when it is presumed that there are virtual lines each parallel to the second direction and evenly dividing a width of the sub pixel in the first direction into K+1 pieces, K number of storage capacitor lines electrically connected to the storage capacitor each, in the aperture, are inclined relative to the first direction, and are arranged so as to go over at least one virtual line of the virtual lines from one piece to another piece, both pieces being divided by the at least one virtual line, and the K number of storage capacitor lines divide the aperture into K+1 regions,
in the sub pixels of the adjoining pixel pair, the K number of storage capacitor lines of one sub pixel are nonparallel to the K number of storage capacitor lines of the other sub pixel, and
in the sub pixels of the plurality of units of display, the K number of storage capacitor lines of one sub pixel are nonparallel to the K number of storage capacitor lines of another sub pixel.

2. The image display device according to claim 1, wherein at least one of the K number of storage capacitor lines arranged in the aperture is inclined relative to the second direction and traverses a center line passing through a center of the aperture and parallel to the second direction.

3. The image display device according to claim 1, wherein the storage capacitor electrode is arranged across a boundary region of the sub pixels of the adjoining pixel pair, and is formed of a same metal film as a metal film of the storage capacitor line and at a same layer thereof.

4. The image display device according to claim 1, wherein the black matrix is arranged so as to cover at least a part of one of the different gate lines, and an inclination angle of the black matrix in the sub pixel and an inclination angle of the storage capacitor line are different from each other.

5. The image display device according to claim 1, wherein one storage capacitor line of the K number of storage capacitor lines of the sub pixel go over a virtual line of the virtual lines from one sub pixel to another sub pixel, both the sub pixels adjoining in the second direction with the data line being present therebetween, the virtual line passing through the center of the sub pixel and parallel to the second direction.

6. The image display device according to claim 1, wherein the K number of storage capacitor lines of one sub pixel are arranged at a same angle in the first direction in the aperture of the sub pixel.

7. The image display device according to claim 1, wherein in the apertures of the sub pixels arranged in the second direction, the storage capacitor lines in every other sub pixel go over a common virtual line.

8. The image display device according to claim 1, wherein
one of the plurality of the units of display further comprises a sub pixel that has a switching element and displays an image for a third view point and a sub pixel that has a switching element and displays an image for a fourth view point,
in each aperture of the adjoining pixel pair, each of the K number of storage capacitor lines go over different virtual lines,
an inclination direction of the K number of storage capacitor lines relative to the second direction in each aperture of one adjoining pixel pair is different from an inclination direction of the K number of storage capacitor lines relative to the second direction in each aperture of another adjoining pixel pair, the adjoining pixel pairs adjoining in the second direction,
in the apertures of the sub pixels arranged in the second direction, the storage capacitor lines in every fourth sub pixel go over a common virtual line, and
in the apertures of the sub pixels arranged in the first direction, the K number of storage capacitor lines in every fourth sub pixel go over virtual lines located in same positions in each of the sub pixels.

9. The image display device according to claim 1, wherein the optical unit has a focal point shifted from a pixel surface of the sub pixel.

10. A terminal device comprising the image display device according to claim 1.

* * * * *